US012592810B2

(12) United States Patent
Ashworth et al.

(10) Patent No.: US 12,592,810 B2
(45) Date of Patent: Mar. 31, 2026

(54) TIME DIVISION DUPLEX (TDD) NETWORK REPEATER

(71) Applicant: Wilson Electronics, LLC, St. George, UT (US)

(72) Inventors: Christopher Ken Ashworth, Toquerville, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 381 days.

(21) Appl. No.: 18/372,078

(22) Filed: Sep. 23, 2023

(65) Prior Publication Data

US 2024/0106618 A1    Mar. 28, 2024

Related U.S. Application Data

(60) Provisional application No. 63/409,552, filed on Sep. 23, 2022.

(51) Int. Cl.
 H04L 5/14 (2006.01)
 H04B 7/155 (2006.01)
 H04W 52/52 (2009.01)

(52) U.S. Cl.
 CPC ....... H04L 5/1469 (2013.01); H04B 7/15535 (2013.01); H04W 52/52 (2013.01)

(58) Field of Classification Search
None
See application file for complete search history.

(56) References Cited

U.S. PATENT DOCUMENTS

| | | | |
|---|---|---|---|
| 2017/0126270 A1* | 5/2017 | Su | H04B 1/56 |
| 2018/0034486 A1* | 2/2018 | Pham | H04B 1/005 |
| 2020/0106541 A1* | 4/2020 | Ashworth | H04B 7/15528 |
| 2020/0373995 A1* | 11/2020 | Ashworth | H04B 1/1607 |
| 2020/0383075 A1 | 12/2020 | Ashworth et al. | |
| 2020/0389228 A1* | 12/2020 | Ashworth | H04B 7/15535 |
| 2021/0409104 A1 | 12/2021 | Ashworth et al. | |
| 2022/0014257 A1 | 1/2022 | Anderson et al. | |
| 2023/0145768 A1* | 5/2023 | Schwab | H04B 1/525 455/552.1 |

* cited by examiner

*Primary Examiner* — Saumit Shah
(74) *Attorney, Agent, or Firm* — Thorpe North & Western, LLP.

(57) ABSTRACT

A technology is described for a time division duplex (TDD) repeater with circulators. The TDD repeater can comprise a first port, a second port, a first circulator, a second circulator, and first and second amplification paths coupled between the first circulator and first port and the second circulator and second port. The TDD repeater can comprise a software defined filter (SDF) on each of the first and second amplification paths to filter selected symbols of TDD signals on the first and second amplification paths.

35 Claims, 26 Drawing Sheets

FDD (Full Duplex)

TDD (Half Duplex)

TDD (HD) with FDD
Sub Band Half Duplex

Full Duplex
(Max Data Rate/Hz)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 3a

TDD

SBHD

Time (symbols)

TIME DIVISION DUPLEX (TDD) NETWORK REPEATER

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3a illustrates UL/DL configurations for 3GPP E-UTRA in accordance with an example;

Figure 1A:
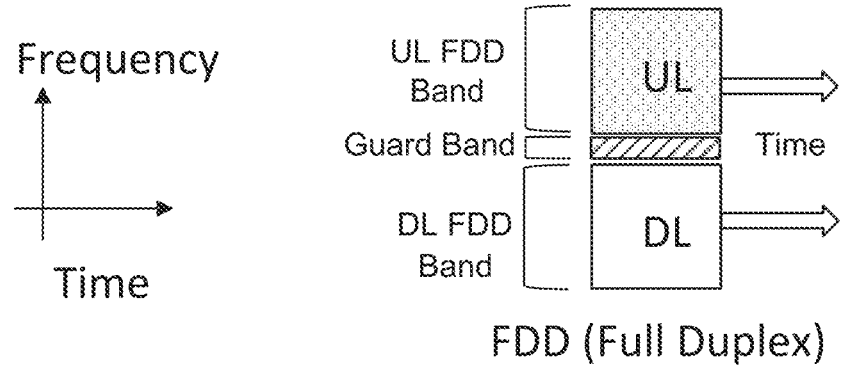
FIG. 1a illustrates a frequency division duplex (FDD) full duplexing scheme in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless communication standards use duplexing schemes to separate the transmission and reception of wireless communication signals. Transmission of a wireless communication signal from a wireless communication access point, such as a base station (BS), to a wireless device, such as a user equipment (UE) is typically referred to as a downlink (DL) transmission. Reception of a wireless communication signal at a BS that was sent from a UE is typically referred to as an uplink (UL) transmission. Typical duplexing schemes include Frequency Division Duplex (FDD) and Time Division Duplex (TDD).

FIGS. 1a-1d provide graphical examples of different types of duplexing schemes. FIG. 1a illustrates a typical FDD duplexing scheme. In this example, an UL FDD band is allocated and is used to continuously transmit an uplink signal over the UL FDD band. Similarly, a DL FDD band is allocated to continuously transmit a downlink signal over the DL FDD band. Because the UL and DL signals can be transmitted continuously and simultaneously, the FDD duplexing scheme is referred to as full duplex.

The UL FDD band and DL FDD band in FIG. 1a are separated by a guard band. The guard band is used to enable a receiver to receive the UL and DL signals without interference from the adjacent signal.

Figure 1B:
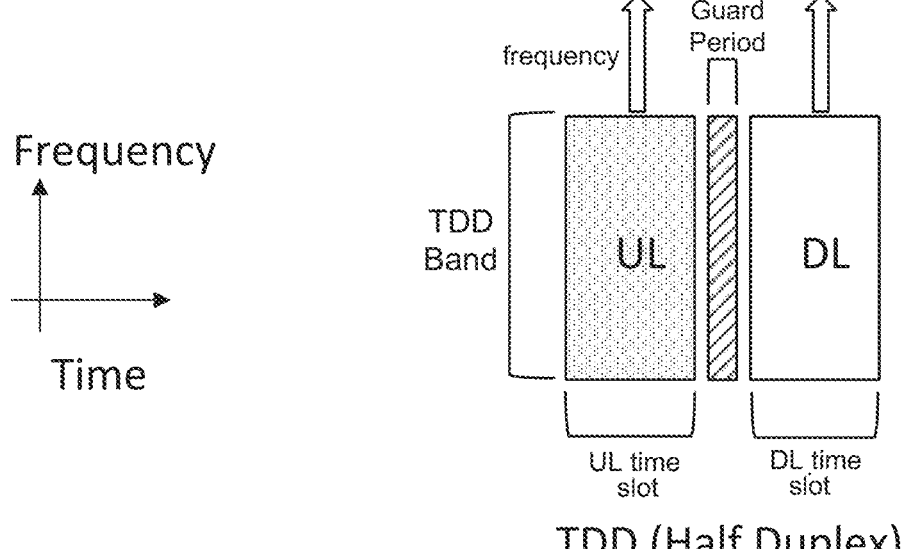
FIG. 1b illustrates a time division duplex (TDD) half duplexing scheme in accordance with an example.

FIG. 1b illustrates a typical TDD duplexing scheme. In this example, a TDD band is used to transmit an UL signal for the duration of an UL time slot. In contrast with the FDD scheme, the bandwidth for the UL signal does not have to be shared with a bandwidth for a DL signal. Rather, the TDD band can comprise the full frequency allocation for the selected TDD band. A DL signal can be transmitted over the full TDD band for the duration of the DL time slot. Because transmission of the UL signal and DL signal is not simultaneous, and is shared in time, the TDD duplexing scheme is referred to as half duplex.

A guard period is designated in FIG. 1B between the UL time slot and the DL time slot. The guard period is used to allow a transceiver time to switch between transmission and reception modes. In addition, the guard period is selected based on the time of flight for the UL or DL signal between the BS and the UE.

Figure 1C:
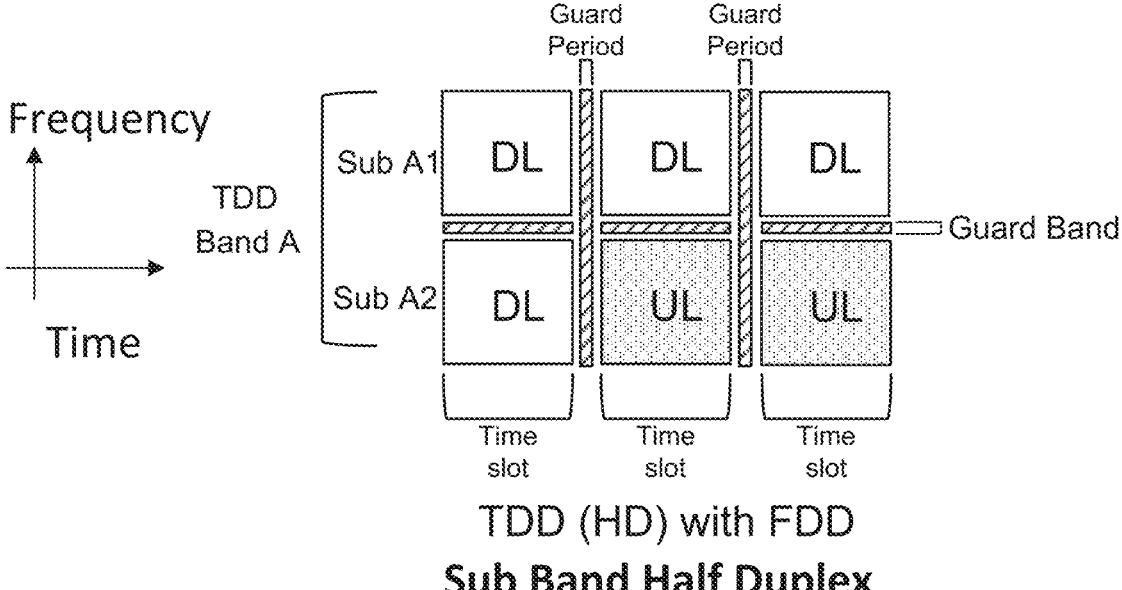
FIG. 1c illustrates a TDD sub-band half duplexing scheme in accordance with an example.

FIG. 1c illustrates a hybrid duplexing scheme, referred to as sub band half-duplex (SBHD). A sub band A1, comprising a portion of a TDD band A in this example, is used to transmit a TDD signal A1, over the sub band A1, in a half-duplex transmission. As with TDD, a guard period, comprising a selected time period, is present between each time slot. A second sub band, designated sub band A2, is used to transmit a signal A2 over the sub band A2 in a half-duplex transmission. A guard period, comprising a selected time period, is present between each time slot. A guard band, comprising a selected bandwidth, is provided between each sub band, as illustrated in FIG. 1c. An UL signal or a DL signal can be transmitted or received for the duration of each time slot in each of the sub bands.

The signal A1 may be transmitted by the same BS as the signal A2. Alternatively, a different base station may transmit signal A1 than the BS that is used to transmit signal A2. The use of SBHD can provide dynamic TDD operation and allows for more flexible service multiplexing as well as improved latency and coverage relative to the use of TDD or FDD.

Figure 1D:
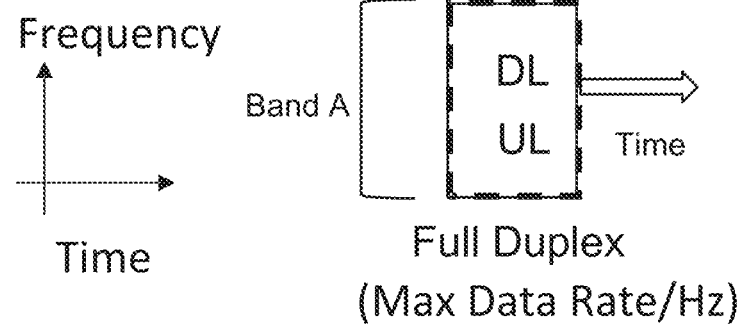
FIG. 1d illustrates a TDD full duplexing scheme in accordance with an example.

FIG. 1d illustrates a full duplex scheme, in which an UL signal and a DL signal are each transmitted over the entire band (i.e. Band A) for the full time. Because there is no guard band or guard period in the example full duplex scheme, a signal can be transmitted with a maximum data rate per Hertz of bandwidth. However, full duplex can be challenging to implement in real use situations due to interference between the DL signal and the UL signal. Variations of full duplex can involve a portion of the bandwidth being used by the UL or the DL signal over the full time.

Repeaters can increase the quality of wireless communication between a wireless device, such as a UE and a wireless communication access point, such as a BS, by amplifying, filtering, or applying other processing techniques to uplink and downlink signals communicated between the wireless device and the wireless communication access point.

Figure 2:
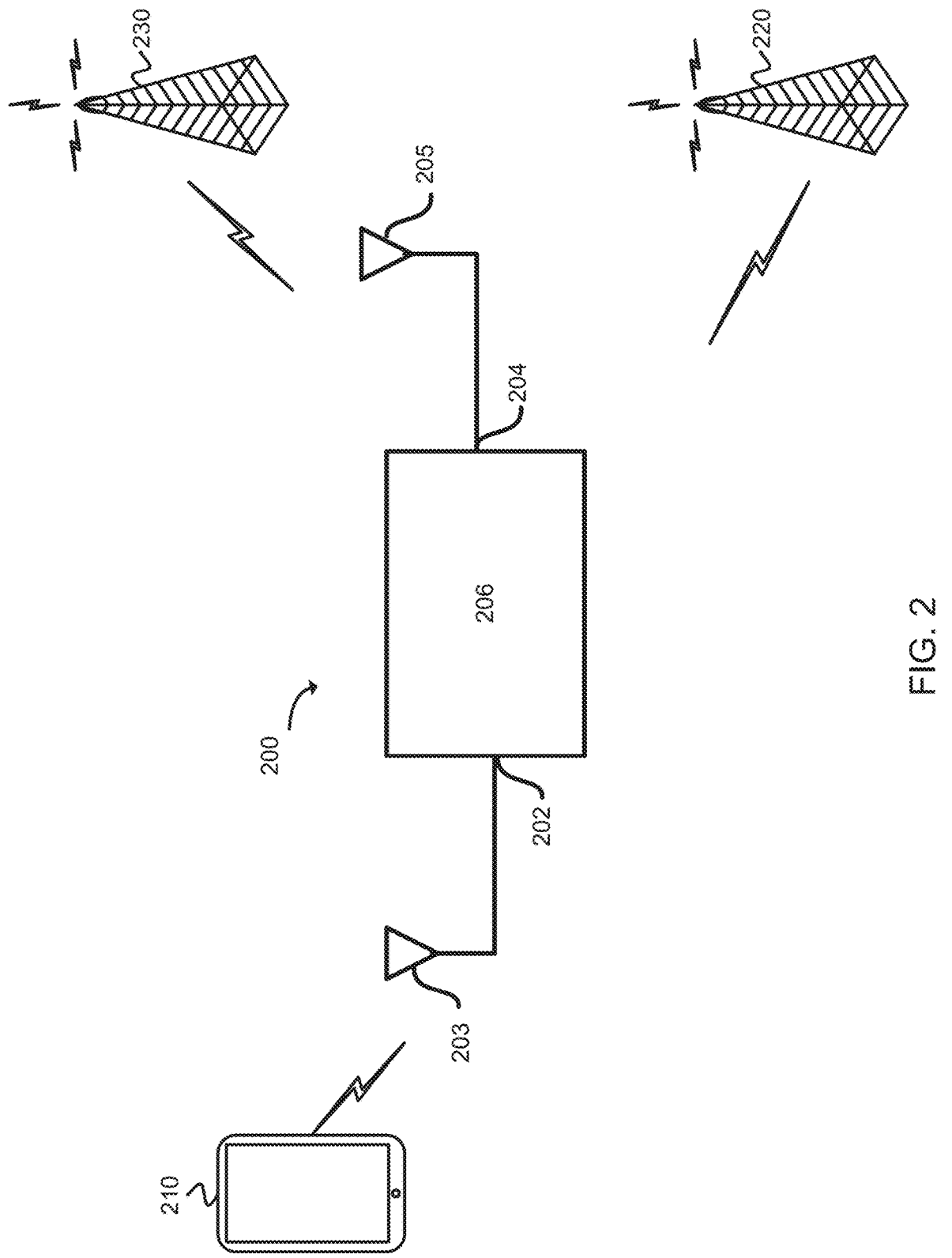
FIG. 2 illustrates a TDD repeater in a wireless communication system in accordance with an example.

In one example, as illustrated in FIG. 2, a time division duplex (TDD) repeater 200 can include a first port 202 (e.g., a server port), a second port 204 (e.g., a donor port), and one or more amplification paths (not shown) coupled between the first port 202 and the second port 204. The TDD repeater is configured to be connected to a donor antenna 205 and a server antenna 203 via the second port 204 and the first port 202, respectively. The TDD repeater 200 can be configured to receive a TDD UL signal from a UE 210 and send the TDD UL signal to a node 220 and/or a node 230. The TDD UL signal can be communicated on two or more sub-bands (i.e. sub-band channels) using TDD communicated with SBHD. The TDD repeater 200 can be configured to receive a TDD DL signal from the node 220 and/or node 230 at the second port 204 and send the TDD DL signal to the UE 210. The TDD DL signal can be transmitted and/or received on two or more sub-band channels using TDD communicated with SBHD. The node 220 and the node 230 can each send a separate sub-band TDD signal from the node to the port 204 of the amplifier 206 of the repeater 200. The node 220 and/or node 230 can also be configured to send multiple sub-band TDD signals simultaneously on separate sub-bands (i.e. sub-band channels) to the UE 210 using TDD communicated with SBHD.

As used herein, the term sub-band or sub-band channel is a portion of a predetermined TDD band. The same sub-bands (i.e. frequency range) may be used for both half duplex (HD) UL and DL signal transmission. Alternatively, different sub-bands within TDD band may be used for UL and for DL.

The repeater 200 can boost signals configured based on selected wireless standards, such as the Third Generation Partnership Project (3GPP) Evolved Universal Terrestrial Radio Access (E-UTRA) Release 8, 9, 10, 11, 12, 13, 14, 15, 16, or 17 standards or Institute of Electronics and Electrical Engineers (IEEE) 802.16. The E-UTRA standards were previously referred to as fourth generation (4G) standards, with Releases 10-17 also referred to as 4G Long Term Evolution (LTE) standards. The terms E-UTRA, 4G, and LTE are used synonymously in this document, unless otherwise noted. In one configuration, the repeater 200 can boost signals for 3GPP LTE Release 17.4.0 (January 2022) or other desired releases.

The repeater 200 can boost signals from the 3GPP Technical Specification (TS) 36.101 (Release 17 Jan. 2021) Evolved Universal Terrestrial Radio Access (E-UTRA) TDD frequency bands. The repeater 200 may also be configured to boost E-UTRA FDD frequency bands. In addition, the repeater 200 can boost selected frequency bands based on the country or region in which the repeater is used, including any of TDD bands 33-53, or other bands, as disclosed in 3GPP TS 36.104 V17.4.0 (January 2022), and depicted in Table 1.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24[9] | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

(NOTE[1]):
Band 6, 23 are not applicable.
(NOTE 2):
Restricted to E-UTRA operation when carrier aggregation is configured. The downlink operating band is paired with the uplink operating band (external) of the carrier aggregation configuration that is supporting the configured Pcell.
(NOTE 3):
This band is an unlicensed band restricted to licensed-assisted operation using Frame Structure Type 3.
(NOTE 4):
Band 46 is divided into four sub-bands as in Table 5.5-1A.
(NOTE 5):
The range 2180-2200 MHz of the DL operating band is restricted to E-UTRA operation when carrier aggregation is configured.
NOTE[6]:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7):
Void
(NOTE 8):
This band is restricted to licensed-assisted operation using Frame Structure Type 3.
NOTE[9]:
DL operation is restricted to 1526-1536 MHz frequency range. UL operation is restricted to 1627.5-1637.5 MHz and 1646.5-1656.5 MHz per FCC Order DA 20-48.

In another configuration, the repeater 200 can boost TDD signals from the 3GPP Technical Specification (TS) 38.104 (Release 17 Jan. 2021) bands or 5G frequency bands, referred to as new radio operating bands. These bands typically begin with the prefix "n". In addition, the repeater 200 can boost selected frequency bands based on the country or region in which the repeater is used, including any of TDD bands n34-n53, n77-n79, n90, or n96 in frequency range 1 (FR1), n257-n262 in frequency range 2 (FR2), or other bands, as disclosed in 3GPP TS 38.104 V17.4.0 (January 2022), and depicted in Table 2 and Table 3:

TABLE 2

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24[7] | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |

TABLE 2-continued

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex mode |
|---|---|---|---|
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD[3] |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n67 | N/A | 738 MHz-758 MHz | SDL |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |
| n96[4] | 5925 MHz-7125 MHz | 5925 MHz-7125 MHz | TDD[3] |
| n97[5] | 2300 MHz-2400 MHz | N/A | SUL |
| n98[5] | 1880 MHz-1920 MHz | N/A | SUL |
| n99[6] | 1626.5 MHz-1660.5 MHz | N/A | SUL |

NOTE[1]:
This band is applicable in China only.
NOTE[2]:
Variable duplex operation does not enable dynamic variable duplex configuration by the network, and is used such that DL and UL frequency ranges are supported independently in any valid frequency range for the band.
NOTE[3]:
This band is restricted to operation with shared spectrum channel access as defined in [20].
NOTE[4]:
This band is applicable in the USA only subject to FCC Report and Order [FCC 20-51].
NOTE[5]:
The requirements for this band are applicable only where no other NR or E-UTRA TDD operating band(s) are used within the frequency range of this band in the same geographical area. For scenarios where other NR or E-UTRA TDD operating band(s) are used within the frequency range of this band in the same geographical area, special co-existence requirements may apply that are not covered by the 3GPP specifications.
NOTE[6]:
UL operation is restricted to 1627.5-1637.5 MHz and 1646.5-1656.5 MHz per FCC Order DA 20-48.
NOTE[7]:
DL operation is restricted to 1526-1536 MHz frequency range. UL operation is restricted to 1627.5-1637.5 MHz and 1646.5-1656.5 MHz per FCC Order DA 20-48.

TABLE 3

| NR operating band | Uplink (UL) and Downlink (DL) operating band BS transmit/receive UE transmit/receive $F_{UL, low}$-$F_{UL, high}$ $F_{DL, low}$-$F_{DL, high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |
| n261 | 27500 MHz-28350 MHz | TDD |
| n262 | 47200 MHz-48200 MHz | TDD |

For E-UTRA, each operating band can be divided into different channel bandwidths, depending on the size of the operating band. The channel bandwidths are disclosed in 3GPP TS 36.104 V17.4.0 (January 2022), and depicted in Table 4. The table shows the number of physical resource blocks ($N_{RB}$) in each channel. The definition of a physical resource block (PRB) for EUTRA, also called a resource block (RB) is well known and is defined in 3GPP TS 36.211 V 17.4.0 (January 2022).

TABLE 4

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

For 5G, the New Radio (NR) operating bands can also be divided into different channel bandwidths. 5G was designed to have more flexibility, allowing for a number of different modalities than previous generations of cellular communication. Each NR operating band has different channel bandwidths that can be used. Each channel can include different subcarrier spacing (SCS). Table 5, shown below, provides an example of channel bandwidths for the NR operating bands in FR 1 and the available SCS for each NR operating band. The channel bandwidths are disclosed in 3GPP TS 36.101-1 V17.4.0 (January 2022). Table 6 shows the NR operating bands in FR 2, as disclosed in 3GPP TS 36.101-2 V17.4.0 (January 2022)

TABLE 5

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n1 | 15 | 5 | 10 | 15 | 20 | 25 | 30 | | 40 | 45[4] | 50 | | | | | |
| | 30 | | 10 | 15 | 20 | 25 | 30 | | 40 | 45[4] | 50 | | | | | |
| | 60 | | 10 | 15 | 20 | 25 | 30 | | 40 | 45[4] | 50 | | | | | |
| n2 | 15 | 5 | 10 | 15 | 20 | 25 | 30 | 35[4] | 40 | | | | | | | |
| | 30 | | 10 | 15 | 20 | 25 | 30 | 35[4] | 40 | | | | | | | |
| | 60 | | 10 | 15 | 20 | 25 | 30 | 35[4] | 40 | | | | | | | |
| n3 | 15 | 5 | 10 | 15 | 20 | 25 | 30 | 35[4] | 40 | 45[4] | 50 | | | | | |
| | 30 | | 10 | 15 | 20 | 25 | 30 | 35[4] | 40 | 45[4] | 50 | | | | | |
| | 60 | | 10 | 15 | 20 | 25 | 30 | 35[4] | 40 | 45[4] | 50 | | | | | |
| n5 | 15 | 5 | 10 | 15 | 20 | 25[3] | | | | | | | | | | |
| | 30 | | 10 | 15 | 20 | 25[3] | | | | | | | | | | |
| | 60 | | | | | | | | | | | | | | | |
| n7 | 15 | 5 | 10 | 15 | 20 | 25 | 30 | 35[4] | 40 | | 50 | | | | | |
| | 30 | | 10 | 15 | 20 | 25 | 30 | 35[4] | 40 | | 50 | | | | | |
| | 60 | | 10 | 15 | 20 | 25 | 30 | 35[4] | 40 | | 50 | | | | | |
| n8 | 15 | 5 | 10 | 15 | 20 | | | 35[3,4] | | | | | | | | |
| | 30 | | 10 | 15 | 20 | | | 35[3,4] | | | | | | | | |
| | 60 | | | | | | | | | | | | | | | |
| n12 | 15 | 5 | 10 | 15 | | | | | | | | | | | | |
| | 30 | | 10 | 15 | | | | | | | | | | | | |
| | 60 | | | | | | | | | | | | | | | |
| n13 | 15 | 5 | 10 | | | | | | | | | | | | | |
| | 30 | | 10 | | | | | | | | | | | | | |
| | 60 | | | | | | | | | | | | | | | |
| n14 | 15 | 5 | 10 | | | | | | | | | | | | | |
| | 30 | | 10 | | | | | | | | | | | | | |
| | 60 | | | | | | | | | | | | | | | |
| n18 | 15 | 5 | 10 | 15 | | | | | | | | | | | | |
| | 30 | | 10 | 15 | | | | | | | | | | | | |
| | 60 | | | | | | | | | | | | | | | |
| n20 | 15 | 5 | 10 | 15 | 20 | | | | | | | | | | | |
| | 30 | | 10 | 15 | 20 | | | | | | | | | | | |
| | 60 | | | | | | | | | | | | | | | |
| n24 | 15 | 5 | 10 | | | | | | | | | | | | | |
| | 30 | | 10 | | | | | | | | | | | | | |
| | 60 | | 10 | | | | | | | | | | | | | |
| n25 | 15 | 5 | 10 | 15 | 20 | 25 | 30 | 35[4] | 40 | 45[3,4] | | | | | | |
| | 30 | | 10 | 15 | 20 | 25 | 30 | 35[4] | 40 | 45[3,4] | | | | | | |
| | 60 | | 10 | 15 | 20 | 25 | 30 | 35[4] | 40 | 45[3,4] | | | | | | |
| n26 | 15 | 5 | 10 | 15 | 20 | | | | | | | | | | | |
| | 30 | | 10 | 15 | 20 | | | | | | | | | | | |
| n28 | 15 | 5 | 10 | 15 | 20[7] | | 30[7] | | | | | | | | | |
| | 30 | | 10 | 15 | 20[7] | | 30[7] | | | | | | | | | |
| | 60 | | | | | | | | | | | | | | | |
| n29 | 15 | 5 | 10 | | | | | | | | | | | | | |
| | 30 | | 10 | | | | | | | | | | | | | |
| | 60 | | | | | | | | | | | | | | | |
| n30 | 15 | 5 | 10 | | | | | | | | | | | | | |
| | 30 | | 10 | | | | | | | | | | | | | |
| | 60 | | | | | | | | | | | | | | | |

TABLE 5-continued

| NR Band | SCS (kHz) | 5 | 10 | 15 | 20 | 25 | 30 | 35 | 40 | 45 | 50 | 60 | 70 | 80 | 90 | 100 |
|---|---|---|---|---|---|---|---|---|---|---|---|---|---|---|---|---|
| | | | | | | | | UE Channel bandwidth (MHz) | | | | | | | | |
| n34 | 15 | 5 | 10 | 15 | | | | | | | | | | | | |
| | 30 | | 10 | 15 | | | | | | | | | | | | |
| | 60 | | 10 | 15 | | | | | | | | | | | | |
| n38 | 15 | 5 | $10^{10}$ | 15 | $20^{10}$ | 25 | $30^{10}$ | | $40^{10}$ | | | | | | | |
| | 30 | | $10^{10}$ | 15 | $20^{10}$ | 25 | $30^{10}$ | | $40^{10}$ | | | | | | | |
| | 60 | | $10^{10}$ | 15 | $20^{10}$ | 25 | $30^{10}$ | | $40^{10}$ | | | | | | | |
| n39 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n40 | 15 | $5^5$ | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |
| n41 | 15 | | 10 | 15 | 20 | | 30 | | 40 | | 50 | | | | | |
| | 30 | | 10 | 15 | 20 | | 30 | | 40 | | 50 | 60 | 70 | 80 | 90 | 100 |
| | 60 | | 10 | 15 | 20 | | 30 | | 40 | | 50 | 60 | 70 | 80 | 90 | 100 |
| n46 | 15 | | $10^5$ | | 20 | | | | 40 | | | | | | | |
| | 30 | | $10^5$ | | 20 | | | | 40 | | | 60 | | 80 | | |
| | 60 | | $10^5$ | | 20 | | | | 40 | | | 60 | | 80 | | |
| n47 | 15 | | $10^{10}$ | | $20^{10}$ | | $30^{10}$ | | $40^{10}$ | | | | | | | |
| | 30 | | $10^{10}$ | | $20^{10}$ | | $30^{10}$ | | $40^{10}$ | | | | | | | |
| | 60 | | $10^{10}$ | | $20^{10}$ | | $30^{10}$ | | $40^{10}$ | | | | | | | |
| n48 | 15 | $5^5$ | 10 | 15 | 20 | | 30 | | 40 | | $50^6$ | | | | | |
| | 30 | | 10 | 15 | 20 | | 30 | | 40 | | $50^6$ | $60^6$ | $70^6$ | $80^6$ | $90^{6,4}$ | $100^6$ |
| | 60 | | 10 | 15 | 20 | | 30 | | 40 | | $50^6$ | $60^6$ | $70^6$ | $80^6$ | $90^{6,4}$ | $100^6$ |
| n50 | 15 | $5^5$ | 10 | 15 | 20 | | 30 | | 40 | | 50 | | | | | |
| | 30 | | 10 | 15 | 20 | | 30 | | 40 | | 50 | 60 | | $80^3$ | | |
| | 60 | | 10 | 15 | 20 | | 30 | | 40 | | 50 | 60 | | $80^3$ | | |
| n51 | 15 | 5 | | | | | | | | | | | | | | |
| | 30 | | | | | | | | | | | | | | | |
| | 60 | | | | | | | | | | | | | | | |
| n53 | 15 | 5 | 10 | | | | | | | | | | | | | |
| | 30 | | 10 | | | | | | | | | | | | | |
| | 60 | | 10 | | | | | | | | | | | | | |
| n65 | 15 | 5 | 10 | 15 | 20 | | | | | | 50 | | | | | |
| | 30 | | 10 | 15 | 20 | | | | | | 50 | | | | | |
| | 60 | | 10 | 15 | 20 | | | | | | 50 | | | | | |
| n66 | 15 | 5 | 10 | 15 | 20 | 25 | 30 | $35^4$ | 40 | $45^4$ | | | | | | |
| | 30 | | 10 | 15 | 20 | 25 | 30 | $35^4$ | 40 | $45^4$ | | | | | | |
| | 60 | | 10 | 15 | 20 | 25 | 30 | $35^4$ | 40 | $45^4$ | | | | | | |
| n67 | 15 | 5 | 10 | 15 | 20 | | | | | | | | | | | |
| | 30 | | 10 | 15 | 20 | | | | | | | | | | | |
| | 60 | | | | | | | | | | | | | | | |
| n70 | 15 | 5 | 10 | 15 | $20^3$ | $25^3$ | | | | | | | | | | |
| | 30 | | 10 | 15 | $20^3$ | $25^3$ | | | | | | | | | | |
| | 60 | | 10 | 15 | $20^3$ | $25^3$ | | | | | | | | | | |
| n71 | 15 | 5 | 10 | 15 | 20 | $25^3$ | $30^3$ | $35^{3,4}$ | | | | | | | | |
| | 30 | | 10 | 15 | 20 | $25^3$ | $30^3$ | $35^{3,4}$ | | | | | | | | |
| | 60 | | | | | | | | | | | | | | | |
| n74 | 15 | 5 | 10 | 15 | 20 | | | | | | | | | | | |
| | 30 | | 10 | 15 | 20 | | | | | | | | | | | |
| | 60 | | 10 | 15 | 20 | | | | | | | | | | | |
| n75 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n76 | 15 | 5 | | | | | | | | | | | | | | |
| | 30 | | | | | | | | | | | | | | | |
| | 60 | | | | | | | | | | | | | | | |
| n77 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | $90^4$ | 100 |
| | 60 | | 10 | 15 | 20 | 25 | 30 | | 40 | | 50 | 60 | $70^4$ | 80 | $90^4$ | 100 |
| n78 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | 90 | 100 |
| | 60 | | 10 | 15 | 20 | 25 | 30 | | 40 | | 50 | 60 | $70^4$ | 80 | 90 | 100 |
| n79 | 15 | | 10 | | 20 | | 30 | | 40 | | 50 | | | | | |
| | 30 | | 10 | | 20 | | 30 | | 40 | | 50 | 60 | $70^4$ | 80 | 90 | 100 |
| | 60 | | 10 | | 20 | | 30 | | 40 | | 50 | 60 | $70^4$ | 80 | 90 | 100 |
| n80 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n81 | 15 | 5 | 10 | 15 | 20 | | | | | | | | | | | |
| | 30 | | 10 | 15 | 20 | | | | | | | | | | | |
| | 60 | | | | | | | | | | | | | | | |
| n82 | 15 | 5 | 10 | 15 | 20 | | | | | | | | | | | |
| | 30 | | 10 | 15 | 20 | | | | | | | | | | | |
| | 60 | | | | | | | | | | | | | | | |

TABLE 5-continued

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n83 | 15 | 5 | 10 | 15 | 20 | | 30[7] | | | | | | | | | |
| | 30 | | 10 | 15 | 20 | | 30[7] | | | | | | | | | |
| | 60 | | | | | | | | | | | | | | | |
| n84 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n85 | 15 | 5 | 10 | 15 | | | | | | | | | | | | |
| | 30 | | 10 | 15 | | | | | | | | | | | | |
| | 60 | | | | | | | | | | | | | | | |
| n86 | 15 | 5 | 10 | 15 | 20 | | | | 40 | | | | | | | |
| | 30 | | 10 | 15 | 20 | | | | 40 | | | | | | | |
| | 60 | | 10 | 15 | 20 | | | | 40 | | | | | | | |
| n89 | 15 | 5 | 10 | 15 | 20 | | | | | | | | | | | |
| | 30 | | 10 | 15 | 20 | | | | | | | | | | | |
| | 60 | | | | | | | | | | 50 | | | | | |
| n90 | 15 | | 10 | 15 | 20 | | 30 | | 40 | | 50 | | | | | |
| | 30 | | 10 | 15 | 20 | | 30 | | 40 | | 50 | 60 | | 80 | 90 | 100 |
| | 60 | | 10 | 15 | 20 | | 30 | | 40 | | 50 | 60 | | 80 | 90 | 100 |
| n91 | 15 | 5 | 10[8] | | | | | | | | | | | | | |
| | 30 | | | | | | | | | | | | | | | |
| | 60 | | | | | | | | | | | | | | | |
| n92 | 15 | 5 | 10 | 15 | 20 | | | | | | | | | | | |
| | 30 | | 10 | 15 | 20 | | | | | | | | | | | |
| | 60 | | | | | | | | | | | | | | | |
| n93 | 15 | 5 | 10[8] | | | | | | | | | | | | | |
| | 30 | | | | | | | | | | | | | | | |
| | 60 | | | | | | | | | | | | | | | |
| n94 | 15 | 5 | 10 | 15 | 20 | | | | | | | | | | | |
| | 30 | | 10 | 15 | 20 | | | | | | | | | | | |
| | 60 | | | | | | | | | | | | | | | |
| n95 | 15 | 5 | 10 | 15 | | | | | | | | | | | | |
| | 30 | | 10 | 15 | | | | | | | | | | | | |
| | 60 | | 10 | 15 | | | | | | | | | | | | |
| n96 | 15 | | | | 20 | | | | 40 | | | | | | | |
| | 30 | | | | 20 | | | | 40 | | | 60 | | 80 | | |
| | 60 | | | | 20 | | | | 40 | | | 60 | | 80 | | |
| n97 | 15 | 5 | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |
| n98 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n99 | 15 | 5 | 10 | | | | | | | | | | | | | |
| | 30 | | 10 | | | | | | | | | | | | | |
| | 60 | | 10 | | | | | | | | | | | | | |

NOTE 1:
Void.
NOTE 2:
Void.
NOTE 3:
This UE channel bandwidth is applicable only to downlink.
NOTE 4:
This UE channel bandwidth is optional in this release of the specification.
NOTE 5:
For this bandwidth, the minimum requirements are restricted to operation when carrier is configured as an SCell part of DC or Carrier Aggregation (CA) configuration.
NOTE 6:
For this bandwidth, the minimum requirements are restricted to operation when carrier is configured as a downlink Secondary Cell (SCell) part of CA configuration.
NOTE 7:
For the 20 MHz bandwidth, the minimum requirements are specified for NR UL carrier frequencies confined to either 713-723 MHz or 728-738 MHz. For the 30 MHz bandwidth, the minimum requirements are specified for NR UL transmission bandwidth configuration confined to either 703-733 or 718-748 MHz.
NOTE 8:
This UE channel bandwidth is applicable only to uplink.
NOTE 9:
Void.
NOTE 10:
These UE channel bandwidths are applicable to sidelink operation

TABLE 6

| Operating band | SCS (kHz) | UE channel bandwidth (MHz) | | | |
|---|---|---|---|---|---|
| | | 50 | 100 | 200 | 400[1] |
| n257 | 60 | 50 | 100 | 200 | |
| | 120 | 50 | 100 | 200 | 400 |
| n258 | 60 | 50 | 100 | 200 | |
| | 120 | 50 | 100 | 200 | 400 |
| n259 | 60 | 50 | 100 | 200 | |
| | 120 | 50 | 100 | 200 | 400 |
| n260 | 60 | 50 | 100 | 200 | |
| | 120 | 50 | 100 | 200 | 400 |
| n261 | 60 | 50 | 100 | 200 | |
| | 120 | 50 | 100 | 200 | 400 |
| n262 | 60 | 50 | 100 | 200 | |
| | 120 | 50 | 100 | 200 | 400 |

NOTE[1]:
This UE channel bandwidth is optional in this release of the specification.

The 3GPP E-UTRA standard (Rel. 8-17) is configured to transmit and receive TDD signals based on a subframe granularity. A predetermined uplink-downlink configuration (UL/DL Config) can be used to determine which subframes are used for uplink and which subframes are used for downlink. In an example, the 3GPP E-UTRA frame structure is configured with a radio frame of length 10 milliseconds (ms) that can include two half-frames of length 5 ms each. Each half-frame can include 5 subframes of length 1 ms. Each subframe can include two slots of length 0.5 ms each. The uplink-downlink configuration in a cell can vary between frames and controls in which a subframes uplink or downlink transmission can take place in the current frame. The supported uplink-downlink configurations can be configured as listed in FIG. 3a where, for each subframe in a radio frame, "D" can denote a downlink subframe reserved for downlink transmissions, "U" can denote an uplink subframe reserved for uplink transmissions, and "S" can denote a special subframe. The special subframes are used to communicate control information. Uplink-downlink configurations with both 5 ms and 10 ms downlink-to-uplink switch-point periodicity can be supported. In the case of 5 ms downlink-to-uplink switch-point periodicity, the special subframe can exist in both half-frames (slots). In the case of 10 ms downlink-to-uplink switch-point periodicity, the special subframe can exist in the first half-frame only. In the 3GPP E-UTRA Version 8 standard, there are seven different preconfigured uplink-downlink configurations, numbered between 0 and 6, as illustrated in FIG. 3a.

A 3GPP E-UTRA base station can be configured to transmit which of the seven UL/DL configurations will be used. In another example, a repeater can be configured to receive the UL/DL configuration indication from the base station. The configuration information is typically transmitted from the base station via higher layer signaling, such as radio resource control (RRC) signaling. In another example, for each radio frame, the repeater can demodulate and/or decode control information in a physical downlink control channel (PDCCH) or physical downlink shared channel (PDSCH) using a downlink control information (DCI) format type to receive UL/DL configuration. In one example, a repeater can be coupled to a TDD switch controller, such as a TDD sync detection module (SDM) or a modem that can be used to receive the 3GPP LTE UL/DL configuration information from a base station for a cellular signal associated with the base station. Alternatively, a UE can receive and decode the UL/DL configuration information from the base station (i.e. evolved Node B or eNB or next generation Node B or gNB) and communicate the UL/DL configuration information to the repeater via a wireless transmission using a predetermined wireless standard, such as Bluetooth or Wi-Fi (IEEE 802.11).

Figure 3B:
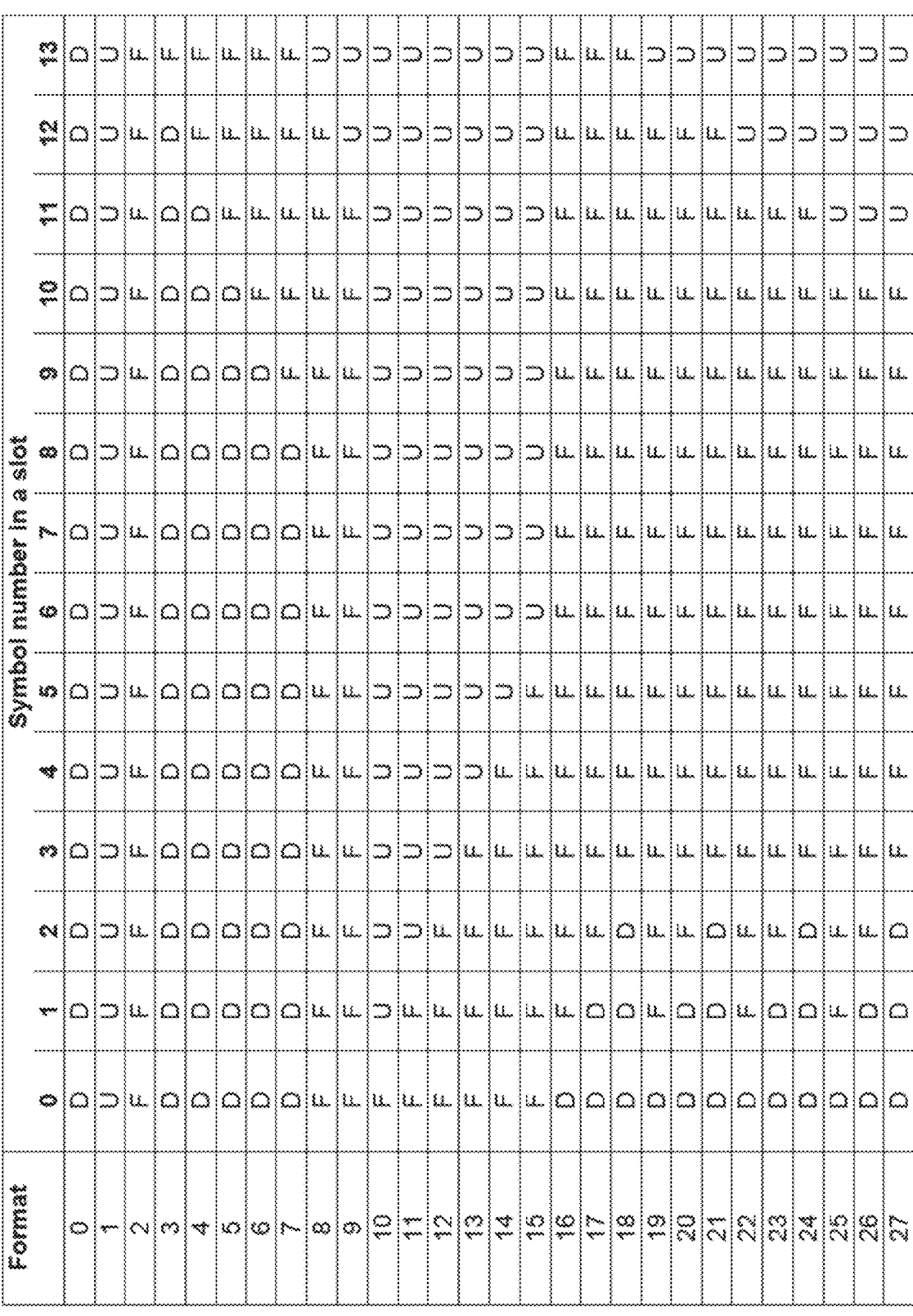
FIG. 3b-3c illustrates UL/DL configurations for 3GPP 5G NR in accordance with an example.
Figure 3C:
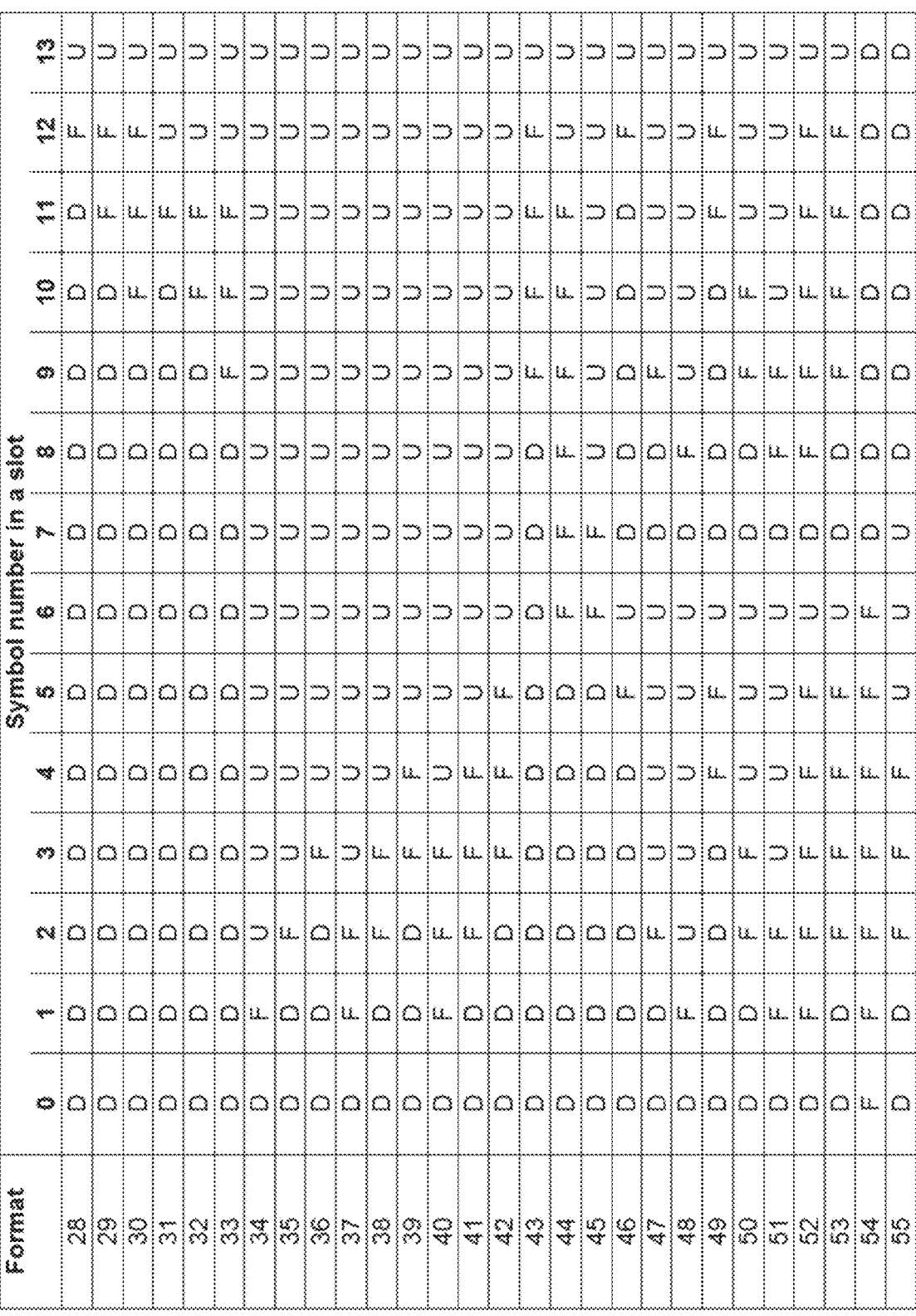

FIGS. 3b and 3c provide example UL/DL configurations for 3GPP 5G communication, as described in 3GPP 38.213 V 17.0.0 (December 2021). In 5G NR communication systems, a frame of 10 ms duration can include ten subframes of 1 ms duration, as in the E-UTRA standard. However, in the NR standard, each frame can comprise $2^U$ slots, where U is 1, 2, 3 or 4 and is a multiple of the SCS of 15 kilohertz (kHz). Each slot can include 14 orthogonal frequency division multiplexing (OFDM) symbols. The OFDM symbols in each slot can be classified as downlink 'D', flexible 'F', or uplink 'U'. In a slot in a downlink frame, downlink transmissions can only occur in 'downlink' or 'flexible' symbols. In a slot in an uplink frame, the uplink transmission can only occur in 'uplink' or 'flexible' symbols.

The UL/DL slot configurations for 5G NR are illustrated in FIGS. 3b and 3c. A slot format can be identified by a corresponding format index ranging from 0 to 55 where 'D' can denote a symbol for downlink transmission, 'U' can a symbol for uplink transmission, and 'F' can denote a flexible symbol. In another example, a slot format index 255 can have a slot format as disclosed in 3GPP TS 38.213 V17.0.0 (2021-12). Slot index formats 56-254 are currently reserved.

In another example, a repeater can be configured to receive the UL/DL configuration for the slot format per slot in one or more higher layer parameters via higher layer signaling (such as RRC signaling). The higher layer parameters can provide a reference subcarrier spacing, a slot configuration period, a number of downlink symbols, or a number of uplink symbols. In another example, the repeater can be configured to receive a higher layer parameter that can override only the flexible symbols per slot over a number of slots as provided by another higher layer parameter.

In another example, a repeater can be configured to receive a higher layer parameter that includes a set of slot format combinations, in which each slot format combination can include one or more slot formats as illustrated in FIGS. 3b and 3c. In another example, a repeater can be configured to demodulate and/or decode control information on a physical control channel or physical shared channel that includes a slot format. In one example, async detection module (SDM) or modem can be used to receive the 3GPP 5G UL/DL configuration information from a base station for a cellular signal associated with the base station. The SDM/ modem is discussed near the end of the specification.

A repeater, can be configured to amplify and filter a time division duplex (TDD) frequency band in a wireless communications system for transmission from a wireless device, such as a UE, to a base station, such as a gNode B (gNB) and for transmission from a base station to the wireless device. The repeater can be coupled to a TDD sync detection module (SDM) or a modem that is configured to receive an UL/DL configuration and timing information for a TDD signal received at the repeater. A TDD repeater can use a TDD SDM to control switching and filtering of the TDD signals between transmission from a wireless device to a base station (e.g., an uplink (UL) transmission) and transmission from a base station to a wireless device (e.g., a downlink (DL) transmission). An SDM may be configured to identify the UL/DL configuration for multiple signals. Alternatively, a repeater can include multiple SDMs, with each SDM configured to determine the UL/DL configuration for a single TDD signal in a single TDD operating band.

Figure 4:
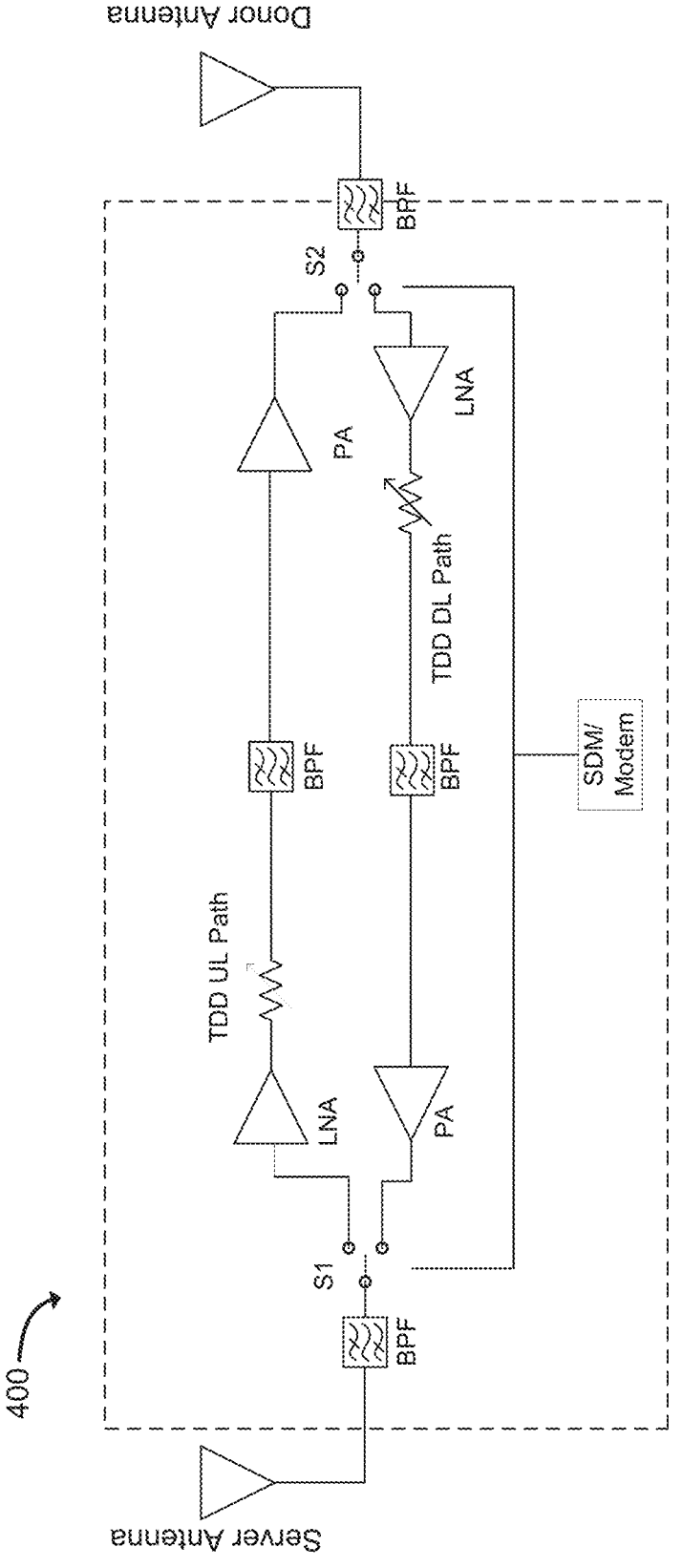
FIG. 4 illustrates a TDD repeater in accordance with an example.

FIG. 4 provides an example of a TDD repeater 400 that can use an SDM or modem to switch a first switch, such as a single pull double throw switch (S1) between a TDD UL path and a TDD DL path. The SDM or modem can also switch a second switch, such as S2 between the TDD UL path and the TDD DL path. Each path can include a low noise amplifier (LNA), a variable attenuator, a TDD bandpass filter (BPF) configured for the TDD operating band, and a power amplifier (PA). In one example, a TDD UL signal can be received from the UE at the server antenna, filtered by the BPF, and switched to the TDD UL path for amplification and filtering, then switched for additional bandpass filtering and transmitted from the donor antenna to a base station. Similarly, a TDD DL signal transmitted from a base station, such as an eNB for E-UTRA or a gNB for 5G, and received at the donor antenna, filtered in the bandpass filter, switched at S2 to the TDD DL path for amplification and filtering, then switched using S1 for additional bandpass filtering and directed to the server antenna for transmission to a UE.

Figure 5A:
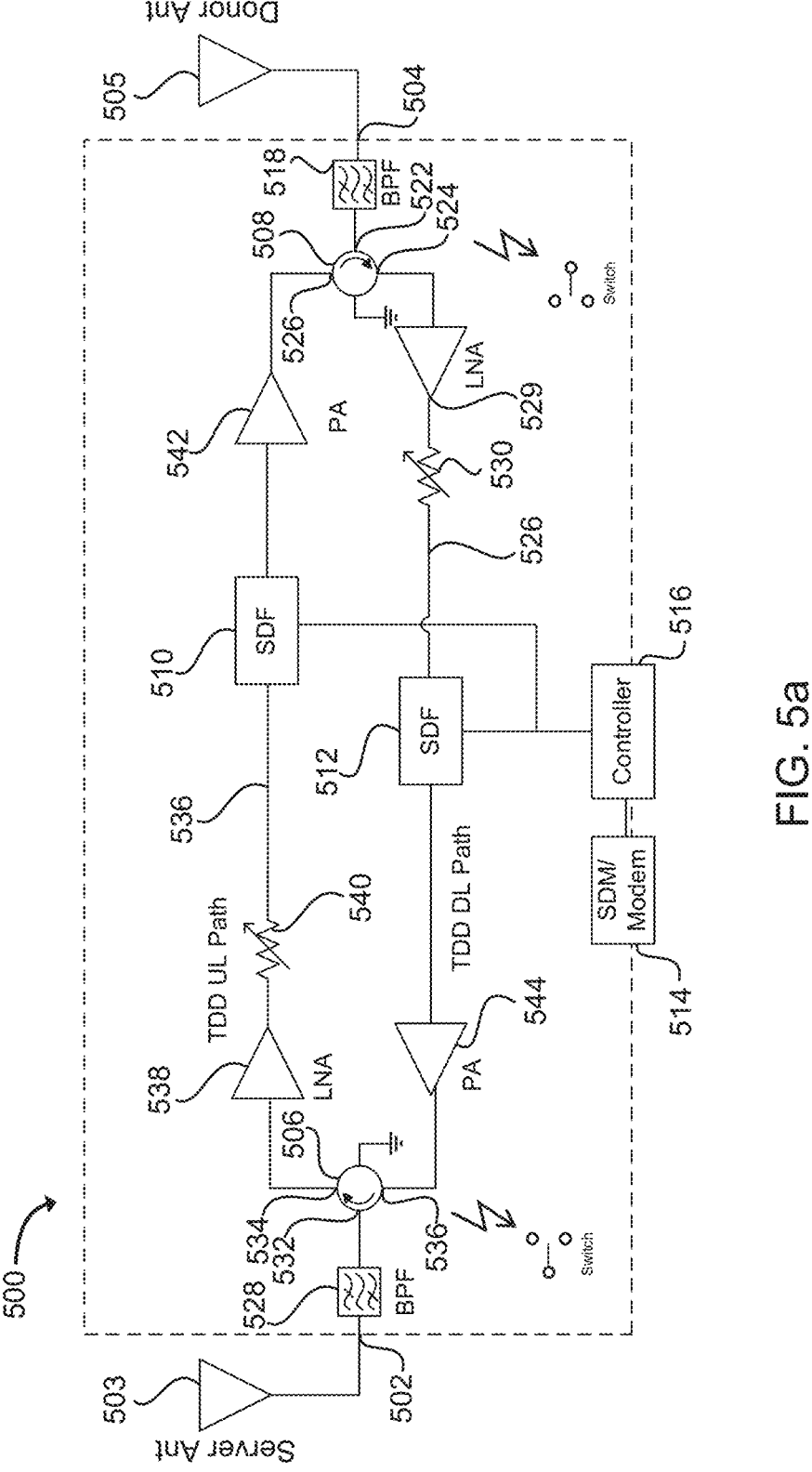
FIG. 5a illustrates a TDD repeater with circulators in accordance with an example.

FIG. 5*a* provides an example of an alternative embodiment of a TDD repeater 500. In this example, the repeater 500 includes circulators 506, 508 instead of using switches, such as the S1 and S2 of the repeater of FIG. 4. In addition, software defined filters (SDF) 510, 512 are configured to filter the TDD signals received at the donor port 504 from the donor antenna 505 and at the server port 502 from the server antenna 503. The SDFs 510, 512 can be communicatively coupled to an SDM/modem 514 via a controller 516. The SDM/modem can provide an UL/DL configuration and timing information to the SDF 510, 512. In one embodiment, a single SDM/modem 514 can provide the UL/DL configuration and timing to both SDFs 510, 512. Alternatively, separate SDMs or modems (i.e. two SDMs, two modems, or one SDM and one modem) can provide the UL/DL configuration and timing to the SDFs 510, 512.

In the example illustrated in FIG. 4, the switches S1 and S2 are configured with the SDM so that the TDD UL signals are routed along the TDD UL path, and the TDD DL signals are routed along the TDD DL path. In contrast, in the example of FIG. 5*a*, the circulators 506, 508 operate differently than the switches. A circulator is a radio frequency device with 3 or 4 ports. A signal entering a port in the circulator will exit at the next port. In this example, the fourth port is set to ground.

A circulator can provide about 16 to 25 dB of isolation between each port in the circulator. A repeater typically requires a greater level of total loop isolation/attenuation than the total amount of loop gain of the repeater. If the loop gain (as measured in decibels) is greater than the loop isolation/attenuation (as measured in decibels), then the repeater can destructively resonate or oscillate and cause problems in the communication network.

A switched TDD repeater 400, as illustrated in FIG. 4, has the advantage of being able to disable components in the 'off' path. This allows the repeater to operate without the need for the switches to provide all of the necessary isolation. Disabling components reduces the overall loop gain and increases the attenuation.

In contrast, a bi-directional always-on TDD repeater, such as the TDD repeater 500 illustrated in the example of FIG. 5*a*, is designed to obtain substantially all of the isolation/attenuation from the circulators 506, 508 and SDF(s) 510, 512. The SDF(s) 510, 512 can provide filters with a sufficiently sharp roll-off to effectively create a guard band between the UL and DL channels of TDD signals with different frequencies.

Accordingly, a TDD signal can be received at the donor port 504 of the repeater 500. The TDD signal received at the donor port can include both DL signals received from one or more base stations, and UL signals received from one or more UEs. The received TDD signals will be half-duplexed (HD) such that the UL signals and DL signals will be separated into UL time slots and DL time slots, as shown in FIG. 1*b*. The TDD signal will be filtered using a bandpass filter (BPF) 518 that is configured to allow the TDD signal of a selected operating band, such as a 3GPP E-UTRA TDD band or a 3GPP NR TDD band, to pass to a first port 522 of the circulator 508 and exit at the second port 524 of the circulator 508 along the TDD DL path 526. At this point, the TDD signal will include both UL signals in UL time slots, and DL signals in DL time slots, as shown in FIG. 1*b*. The received TDD signal can be amplified with a low noise amplifier (LNA) 529 and attenuated a selected amount, if desired using a variable attenuator 530. The TDD signal is then directed from the variable attenuator 530 to the SDF 512, where the TDD signal can be digitized and filtered. The TDD signal output from the SDF 512 can be amplified with a power amplifier (PA) 544 and directed to the fourth port 536 of the circulator 506, where the TDD signal will exit the first port 532, pass through the BPF 528, and be directed to the server port 502 for transmission at the server antenna 503.

Similarly, a TDD signal received at the server port 502 of the repeater 500 will be filtered using the BPF 528 that is configured to allow the TDD signal of the selected TDD operating band to pass to a first port 532 of a second circulator 506 and exit at the circulator's 506 second port 534 along a TDD UL path 536 for amplification with an LNA 538 and attenuation, if needed, using an attenuator, such as a variable attenuator 540. The TDD signal is then directed from the variable attenuator 540 to the SDF 510, where the TDD signal can be digitized, filtered, and output with a predetermined gain. The TDD signal output from the SDF 510 can be amplified with a power amplifier (PA) 542 and directed to the fourth port 526 of the circulator 508, where the TDD signal will exit the first port 522, pass through the BPF 518, and be directed to the donor port 504 for transmission at the donor antenna 505.

In one alternative, a switch, such as a SPDT can be used in place of each circulator 506, 508 as shown in FIG. 4. The SPDT can be switched by the controller 516 that is in communication with the SDM/modem 514 based on the UL/DL configuration and signal timing of the TDD signal that is received by the SDM/modem 514.

While port numbering for the circulators 506, 508 has been provided for clarity, the numbering is not intended to be limiting. A TDD signal may enter any port of the circulator and exit at the next port, as can be appreciated.

The use of circulators 506 and 508 typically provide about 16 to 25 dB of isolation and 0.2 to 1.0 dB of insertion loss (IL) as the signal passes through the circulator. The passband filters 528 and 518 can also provide some isolation, such as 0.5 dB to 3 dB for a typical passband filter. The variable attenuators 540 and 530 can be used to reduce the amplitude of the signals in the TDD UL path and TDD DL path.

In one example, a gain of 20 dB can be assumed per LNA (528, 538) and PA (542, 544). An additional loss of approximately 2 dB per passive component (i.e. 518, 528, 530, 540) provides for 8 dB of loss, for a total loop gain of 72 dB.

Each SDF 510, 512 can provide 30 to 50 dB of isolation. Each circulator 506, 508 can provide 16 dB of isolation. With 30 dB of isolation at each SDF, the total loop crossover isolation is 16+16+30+30=92 dB of isolation. Accordingly, in this example, the total loop crossover isolation is 20 dB greater than the total loop gain, which enables the repeater to operate without going into oscillation.

The actual isolation provided by each SDF 510, 512 can depend on the frequency bands that are filtered. When two cellular signals with relatively low bandgaps are filtered, the isolation of the SDF can be reduced. However, the overall system can be designed with a total loop gain that is less than a total loop crossover isolation. This will be discussed more fully in the proceeding paragraphs.

Software Defined Filters (SDF)

Software defined filters are digital processors configured to provide digital filtering of a TDD signal. A software-defined filtering module can include a digital signal processor (DSP) and digital baseband filters. A software-defined filtering module can receive an analog signal, convert the analog signal to a digital signal and perform digital processing at baseband on the digital signal. In one embodiment, the SDF can convert the digitally filtered signal from baseband back to an analog signal, such as the RF carrier frequency received at the input of the SDF. Alternatively, the SDF can output the digitally filtered signal without conversion to analog. In one embodiment, a software-defined filtering module can be configured to down convert a radio frequency (RF) analog cellular signal received at the SDF at an RF carrier frequency to baseband, digitize the baseband signal. Digital signal processing or digital filtering (e.g., Finite Impulse Response (FIR) filtering or Infinite Impulse Response (IIR) filtering) can then be applied to the digital signal at baseband. In one embodiment, the digital signal can then be converted to analog and upconverted to the same RF carrier frequency the signal was received at. The RF analog signal that is outputted from the software-defined filtering module can be considered a repeated analog signal. Additional amplification and filtering can be performed on the RF analog signal output from the SDF module. Alternatively, the digital signal can be communicated digitally to another SDF module that can then convert the digital signal to analog and upconvert to the RF carrier frequency. The SDF module can perform digital channelized filtering for repeaters that can be useful to address near-far problems associated with repeaters.

The use of software defined filters provides several advantages. The SDF can be configured to simultaneously filter signals in more than one channel or sub-band that are closely spaced in frequency. Using the SDFs, such as 510 and 512, the TDD repeater 500 can be used to perform filtering and amplification of sub-band half-duplex signals that include multiple sub-bands in a 3GPP E-UTRA TDD band or a 3GPP NR TDD band. The multiple sub-bands can each be separated by a guard band, as shown in FIG. 1c. Similarly, the time slots can be separated by a guard period. The guard band can enable the SDF to receive, and separately filter, amplify, and transmit each sub-band with a selected filter for a selected time slot period. The guard periods can enable the SDF time to change filters for each time slot or symbol, if necessary, such as when the time slot or filter changes between UL and DL.

The UL/DL configuration can be used to determine when to make a change in filtering based on the subframe in a 3GPP E-UTRA TDD configuration and the slot in a 3GPP NR TDD configuration. Table 7 compares time domain parameters of 3GPP E-UTRA and 3GPP NR.

TABLE 7

| Parameter | LTE | NR |
|---|---|---|
| Radio frame length | 10 ms | 10 ms |
| Subframe length | 1 ms | 1 ms |
| No. of OFDM symbols in a slot | 14 | 14 |
| No. of slots in a subframe | 2 | Numerology dependent |

In an NR configuration, the number of OFDM symbols per slot are fixed, with 14 symbols per slot for a normal cyclic prefix (CP) and 12 symbols per slot for an extended CP. In an E-UTRA configuration, the number of slots per subframe is fixed at 2 slots per subframe. However, in the NR configuration, the number of slots per subframe varies with the numerology. The number of slots per subframe increases with the subcarrier spacing (SCS). Accordingly, the duration of an OFDM symbol in the NR configuration is reduced with an increasing SCS. Since the number of OFDM symbols per slot are fixed, slot duration is reduced with an increased SCS. Since slot duration is reduced, while subframe duration is fixed, more sots can fit within a subframe. Table 8 shows the number of slots in a subframe/ frame in a NA configuration for each numerology for a normal CP.

TABLE 8

| μ | SCS | No. of slots per subframe = $2^\mu$ | No. of slots per radio frame = $10 * 2^\mu$ | slot duration (ms) |
|---|---|---|---|---|
| 0 | 15 kHz | 1 | 10 | 1 |
| 1 | 30 kHz | 2 | 20 | 0.5 |
| 2 | 60 kHz | 4 | 40 | 0.25 |
| 3 | 120 kHz | 8 | 80 | 0.125 |
| 4 | 240 kHz | 16 | 160 | 0.0625 |

In a configuration using TDD, a slot may not be configured to be fully used for downlink or for uplink. Similar to an E-UTRA TDD configuration, a guard period (gp) is used to allow time for transceiver switching from downlink to uplink and to allow for timing advance in the uplink.

As previously discussed, NR TDD uses a flexible slot configuration, with OFDM symbols in a slot classified as 'downlink', 'flexible', or 'uplink'. A flexible symbol can be configured either for uplink or for downlink transmissions. In addition, the flexible symbols within a slot can be used to provide the desired guard period in NR TDD. Accordingly, a flexible symbol can be used to provide a guard period between the UL symbols and the DL symbols. The 3GPP NR configuration has set a switching time from DL to UL (TX to RX) and UL to DL (RX to TX) for FR1 (bands n1-n95) and FR2 (bands n257-n262) as shown in Table 9, and defined in 3GPP TS 138 V. 15.3.0 (2018-10) table 7.1.2-2.

TABLE 9

| Transition time | FR1 | FR2 |
|---|---|---|
| Tx-Rx | 25600 | 13792 |
| Rx-Tx | 25600 | 13792 |

The values for FR1 and FR2 represent multiples of $T_c$, the NR basic time unit, as defined in 3GPP TS 38.211. The basic time unit $T_c$ is provided by the expression:

$$T_c = 1/(\Delta f_{max} \cdot N_f)$$

where $\Delta f_{max}$ is the subcarrier spacing (SCS) and $N_f$ is the Fast Fourier Transform (FFT) size. For μ=2, the SCS is 60 kHz. An example $N_f$ is 4096. This provides a $T_c$ of $1/(60,000*4096)=4.069\times10^{-9}$. Accordingly, the transition time for FR1 is $25600*4.069\times10^{-9}=1.04\times10^{-4}$ seconds, or about 104 microseconds. In this example, the software defined filter (SDF) can be configured to switch between an UL filter and a DL filter in a period that is less than 104 microseconds. The SDF can be configured to be able to switch between a filter for an UL symbol and a filter for a DL symbol for a desired NR band and SCS at a selected FFT size in less than or equal to 1 microsecond (uS). Switching between different filters during UL-to-DL slot transitions or between OFDM symbols within flexible slots can be done with switching times of 1 uS or less. This SDF filter switching speed can be accomplished by switching in/out pre-configured SDF filter blocks. The DL-to-UL switching times can be much longer because of the guard period that allows DL-to-UL switching and UE timing advance.

In one example, an UL filter can be a passband filter configured to pass a desired UL signal, or a stopband filter configured to substantially stop the transmission of an UL signal for the UL time slot for a desired band or sub-band. Similarly, a DL filter can be a passband filter configured to pass a desired DL signal, or a stopband filter configured to substantially stop the transmission of a DL signal for the DL time slot for a desired band or sub-band. The passband and stopband filters can be achieved using digital filtering to provide a passband or stopband filter with desired characteristics based on the signals to be received and transmitted by the repeater 500. The SDF can also enable a specific signal to be amplified or attenuated by a predetermined amount to output the signal from the SDF with a desired amplitude. The attenuation can be provided using the digital filtering. The SDF can be comprised of a single processor, such as an application specific integrated circuit (ASIC) or field programmable gate array (FPGA). The SDF can enable multiple signals to be simultaneously input, filtered, and output. For example, in the example of FIG. 5a, the SDFs 510, 512 can be comprised of a single FPGA or ASIC processor. Alternatively, each SDF can be a separate processor. In one example, an Analog Devices AD9371 integrated dual RF transceiver can be used as an SDF. The AD9371 can be used to perform filtering on two separate frequency bands or sub-bands simultaneously. The AD9371 can be used in each of the examples illustrated in FIGS. 5a, 6a, 7a, 7c, 8a, 9a, 9c, 9d, 10a, 11a, and throughout the application. This example is not intended to be limiting. Other types of FPGAs or ASIC processors can also be used for the SDF to perform the digital filtering, attenuation, and amplification, as described herein.

Figure 5B:
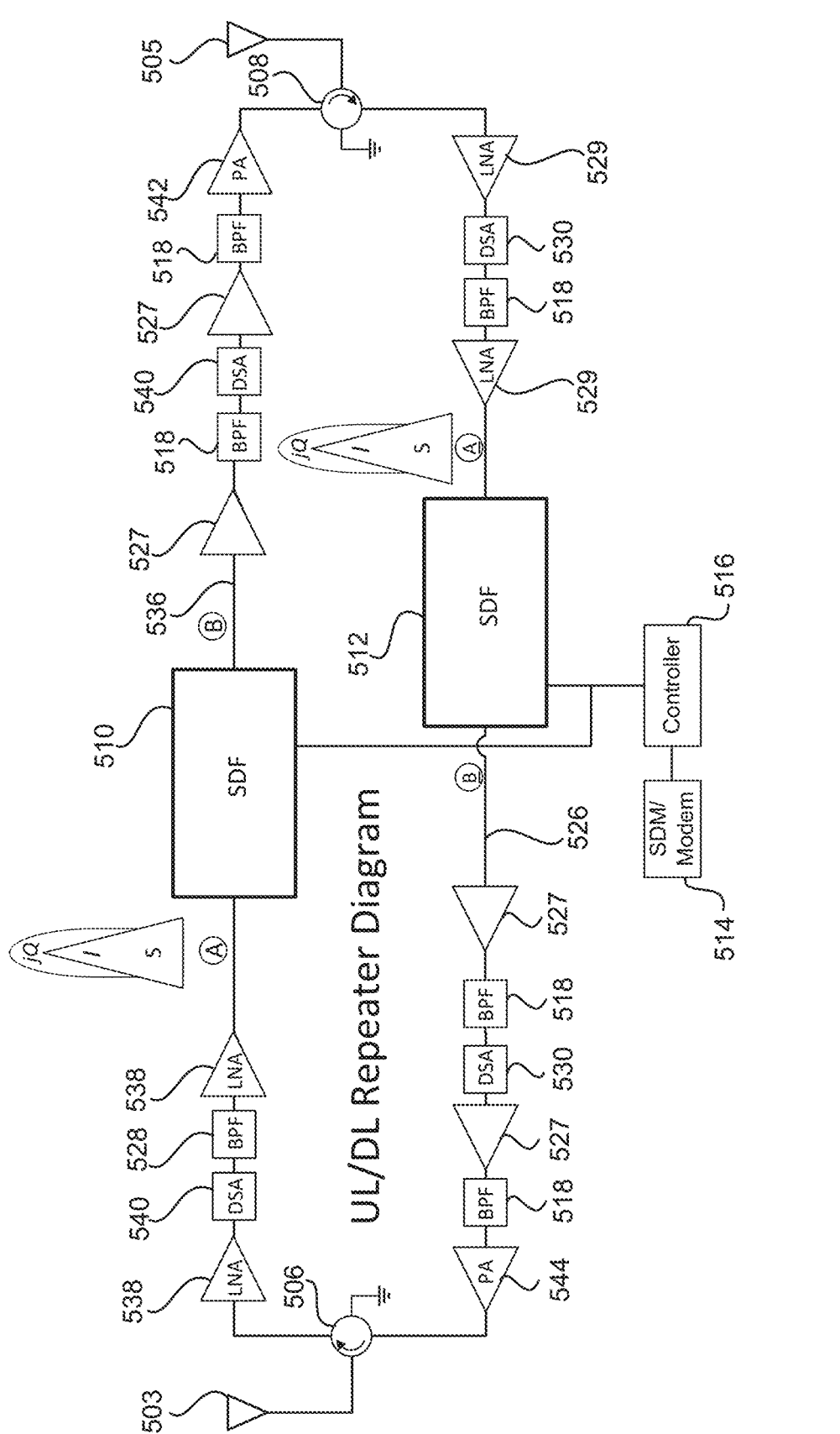
FIG. 5b illustrates another example embodiment of a TDD repeater with circulators in accordance with another example.

FIG. 5b provides another example embodiment of a bi-directional always-on TDD repeater 500. In this example, a first-direction signal, such as an uplink signal, can be received at a server antenna 503 and directed by circulator 506 to a first-direction amplification and filtering path 536. The uplink signal can be amplified by an LNA 538, attenuated by a digital signal attenuator 540, filtered with a bandpass filter 528 designed to pass the uplink signal, and sent to the input of the SDF 510. In this example, the input of the SDF is represented as input A. The uplink signal is shown as time varying signal S(t). In this example, the signal is quadrature modulated, with in-phase (I) and quadrature-phase (Q) components that are 90 degrees out of phase. The output of the signal from the SDF 510 is indicated at point B, where the signal is amplified 527, filtered with BPF 518, attenuated with DSA 540, further amplified 527, filtered with BPF 518, and amplified with a power amplifier (PA) 542. The power amplified uplink signal is then directed by circulator 508 to a donor antenna 505 for transmission to a base station (i.e. 230, FIG. 2). A similar amplification and filtering process can occur for a second-direction signal, such as a downlink signal, that can be received at donor antenna 505, directed to the second-direction amplification and filtering path 526 by the circulator 508, amplified and filtered as discussed with the first-direction amplification and filtering path 536, and directed by circulator 506 to the server antenna 503 for transmission to a user equipment (UE) such as a cellular telephone.

Figure 5C:
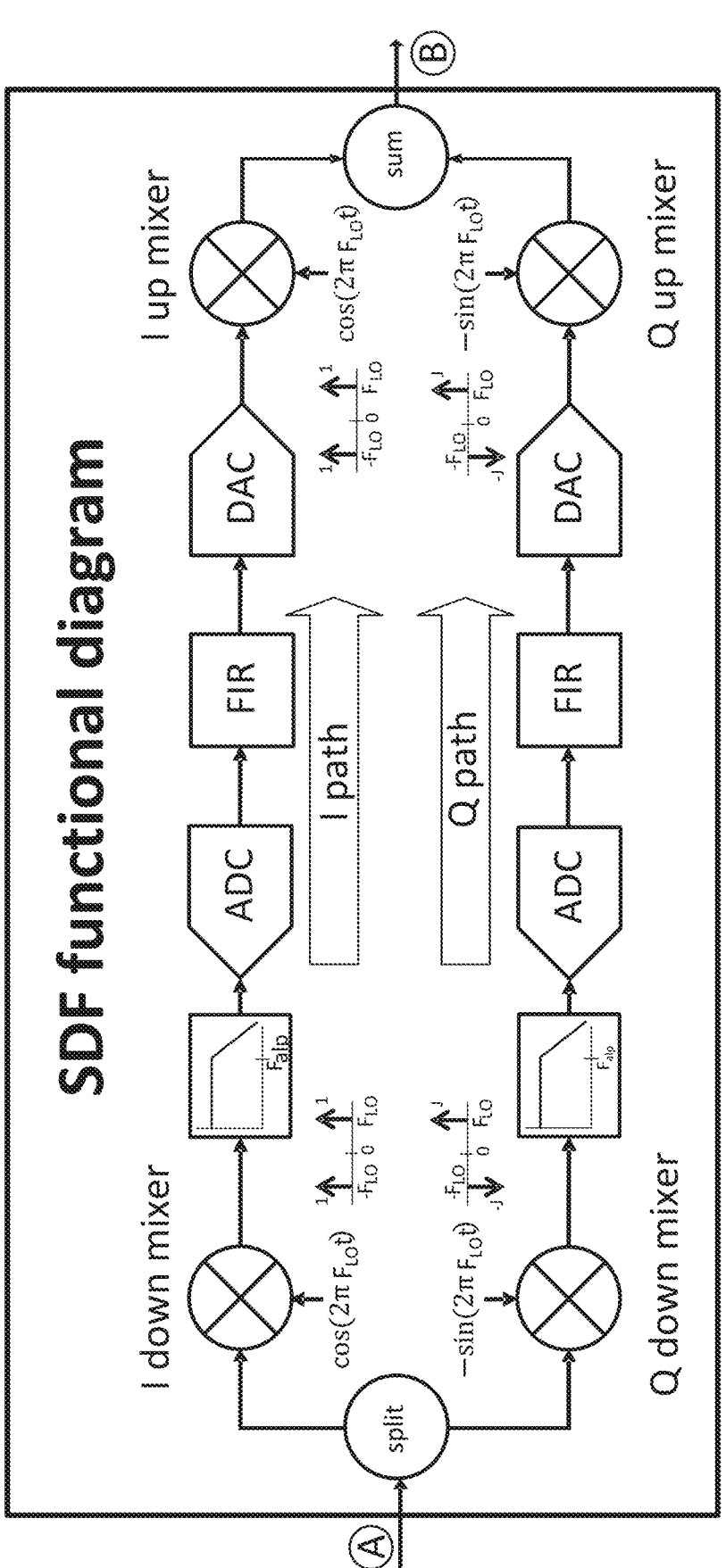
FIG. 5c illustrates a block diagram of a software defined filter (SDF) in accordance with an example.

FIG. 5c provides an example of an SDF functional diagram for a software defined filter, such as SDF 510 or 512. In this example, the complex RF modulated signal S(t) is input at point A into the SDF 510, 512 and split into an in-phase RF signal (I) and a quadrature phase RF signal (Q). A complex mixer can be used to downconvert the signal. In this example, the signal is downconverted to baseband (i.e. zero intermediate frequency (IF)). An in-phase local oscillator signal cosine($2\pi F_{LO}t$), where $F_{LO}$ is the frequency of the local oscillator and t is time, is used to downconvert the in-phase RF signal with an in-phase down mixer that outputs an in-phase baseband signal. The in-phase baseband analog signal is then passed through a lowpass filter and digitized with an analog to digital converter (ADC). The digitized in-phase signal is then filtered using, in this example, a finite impulse response (FIR) filter. The digitized, filtered in-phase signal is then output to a digital to analog converter (DAC) and mixed with an in-phase local oscillator signal at an in-phase up mixer to form an in-phase filtered RF signal. In one embodiment, the same LO signal can be used at both the in-phase down mixer and in-phase up mixer.

Similarly, a quadrature-phase local oscillator signal $-\sin(2\pi F_{LO}t)$, where $F_{LO}$ is the frequency of the local oscillator and t is time, is used at a quadrature-phase mixer to downconvert the quadrature-phase RF signal and output a quadrature phase baseband analog signal. The quadrature-phase baseband analog signal is then passed through a lowpass filter and digitized with an analog to digital converter (ADC). The digitized quadrature phase signal is then filtered using, in this example, a finite impulse response (FIR) filter. The digitized, filtered quadrature-phase signal is then output to a digital to analog converter (DAC) and mixed with a quadrature-phase local oscillator signal at a quadrature phase up mixer to form a quadrature-phase filtered RF signal. In one embodiment, the same LO signal can be used at both the in-phase down mixer and in-phase up mixer.

The in-phase filtered RF signal and the quadrature-phase filtered RF signal output from the in-phase up mixer and the quadrature-phase up mixer can be summed to form a complex RF filtered signal S(t) that is output at point B of the bi-directional always-on TDD repeater 500, as shown in FIG. 5b.

Figure 5D:
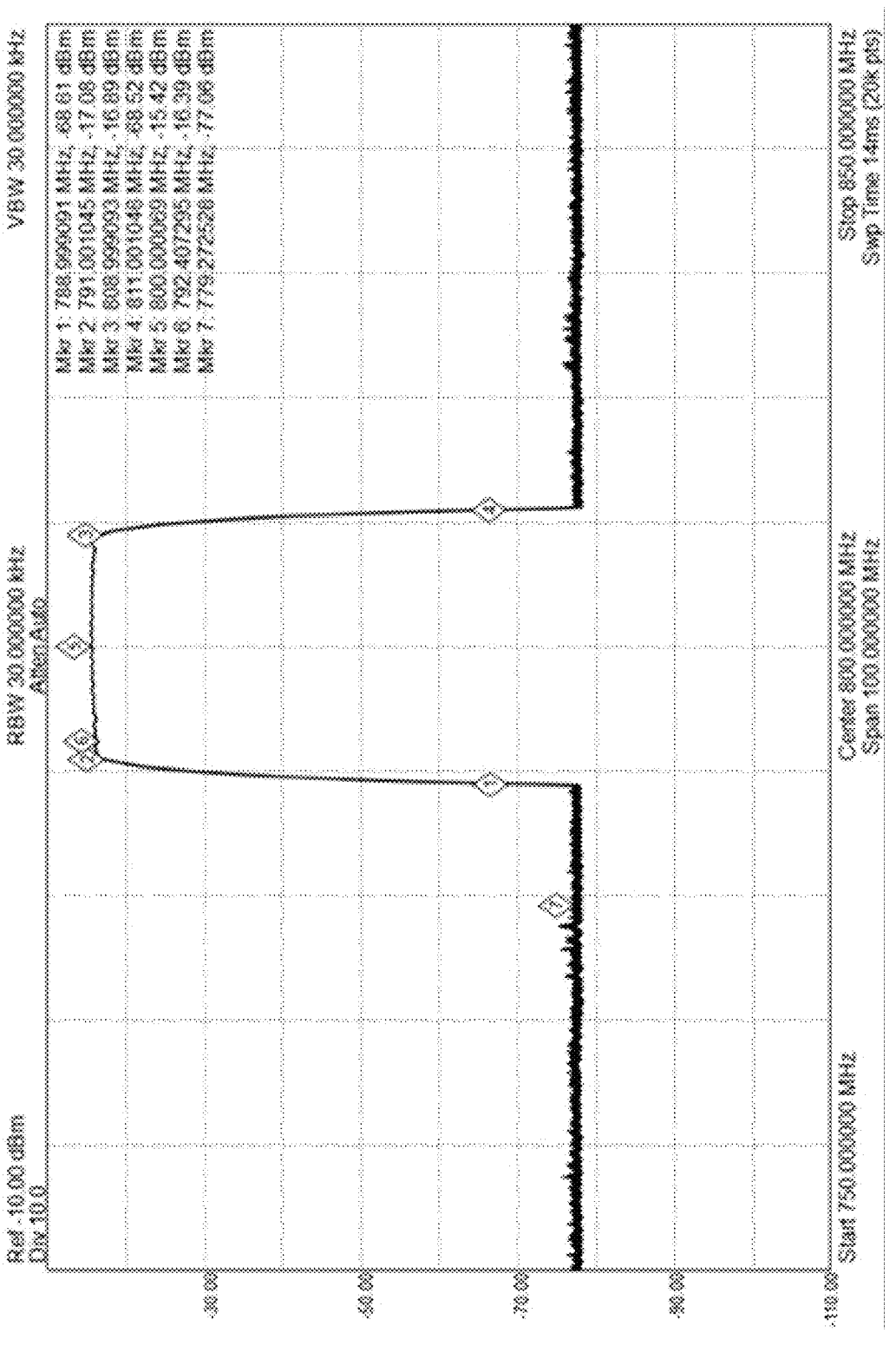
FIG. 5d illustrates an example bandpass filter produced by the SDF of FIG. 5c in accordance with an example.

FIG. 5d illustrates an example of a 20 MHz bandwidth passband filter that is implemented using the SDF illustrated in FIG. 5c. In this example, the center of the passband is noted at Marker (Mkr) 5, at approximately 800 MHz with a power level of −15.42 decibels relative to milliwatts (dBm). The edges of the bandpass filter are marked with Mkr 2 and 3 at 791 MHz and 809 MHz respectively, are at a power level that is approximately 1.5 to 1.6 dB below the marker at the center frequency. Mkr 1 and 4 are approximately 2 MHz from Mkr 2 and 3, with a power level that is approximately 51.5 dB lower. Accordingly, the filter illustrated in this example provides greater than 50 dB of isolation only 2 MHz from the edge of the filter. Accordingly, the passband filters formed using the SDF 510, 512 can provide over 50 dB of isolation for signals with band passes that are only 2 MHz apart.

Figure 5E:
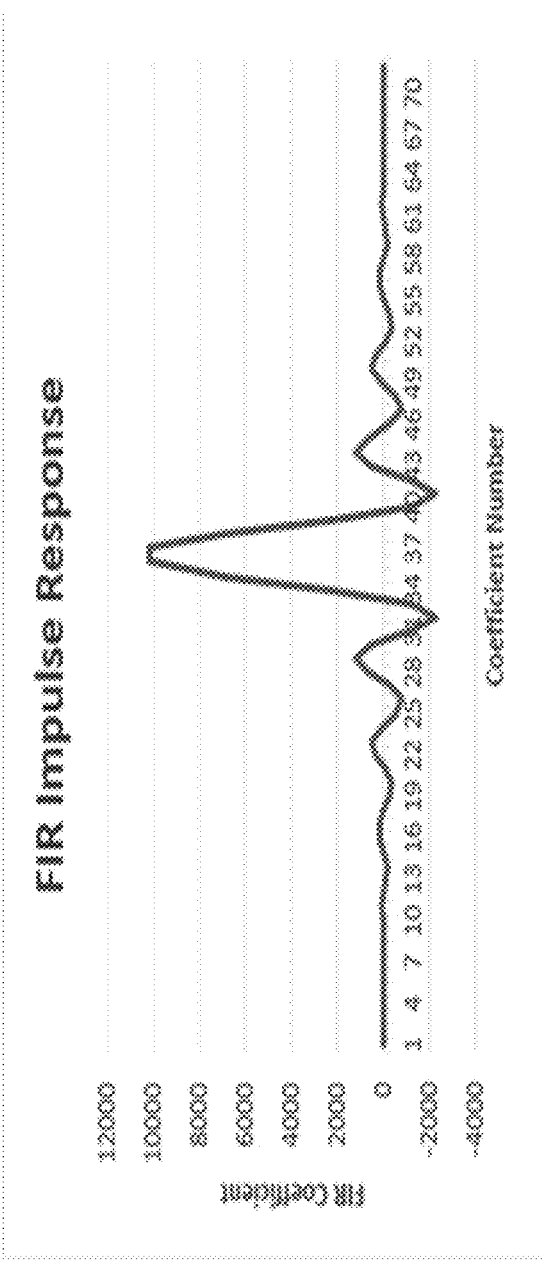
FIG. 5e illustrates an example of finite impulse response (FIR) coefficients used in the SDF to form the bandpass filter of FIG. 5d in accordance with an example.

In one embodiment, finite impulse response (FIR) coefficients that represent the impulse response of the filter can be selected to form a desired filter, such as a bandpass filter. The FIR coefficients define the filter's amplitude and phase/delay response to an input signal. The rate at which the coefficients are multiplied with the input signal dictate the time/frequency response of the filtered results. FIG. 5e provides an illustration of FIR coefficients selected to produce the 20 MHz passband filter illustrated in FIG. 5d. The coefficients can be communicated to the SDF to form the filter used to filter the signal S(t), which represents the uplink signal or downlink signal filtered by the SDF.

The example of the SDF 510, 512 illustrated in FIG. 5c is not intended to be limiting. For example, the SDF can incorporate a different front end. Rather than using an analog approach up to the ADC, the RF signal can be directly digitized and then downconverted and filtered, and then directly converted back to RF. In addition, the digital filtering can be accomplished without the use of a complex mixer and separate I and Q paths. However, the use of the complex mixer illustrated in the example of FIG. 5c enables a filter to be generated with twice the bandwidth by generating half the filter and then duplicating it in a mirror image. Accordingly, the complex SDF illustrated in FIG. 5c can be used to generate the broadband filters used in new radio 5G implementations.

TDD SDF Repeaters

Figures 6A, 6B, 6C:
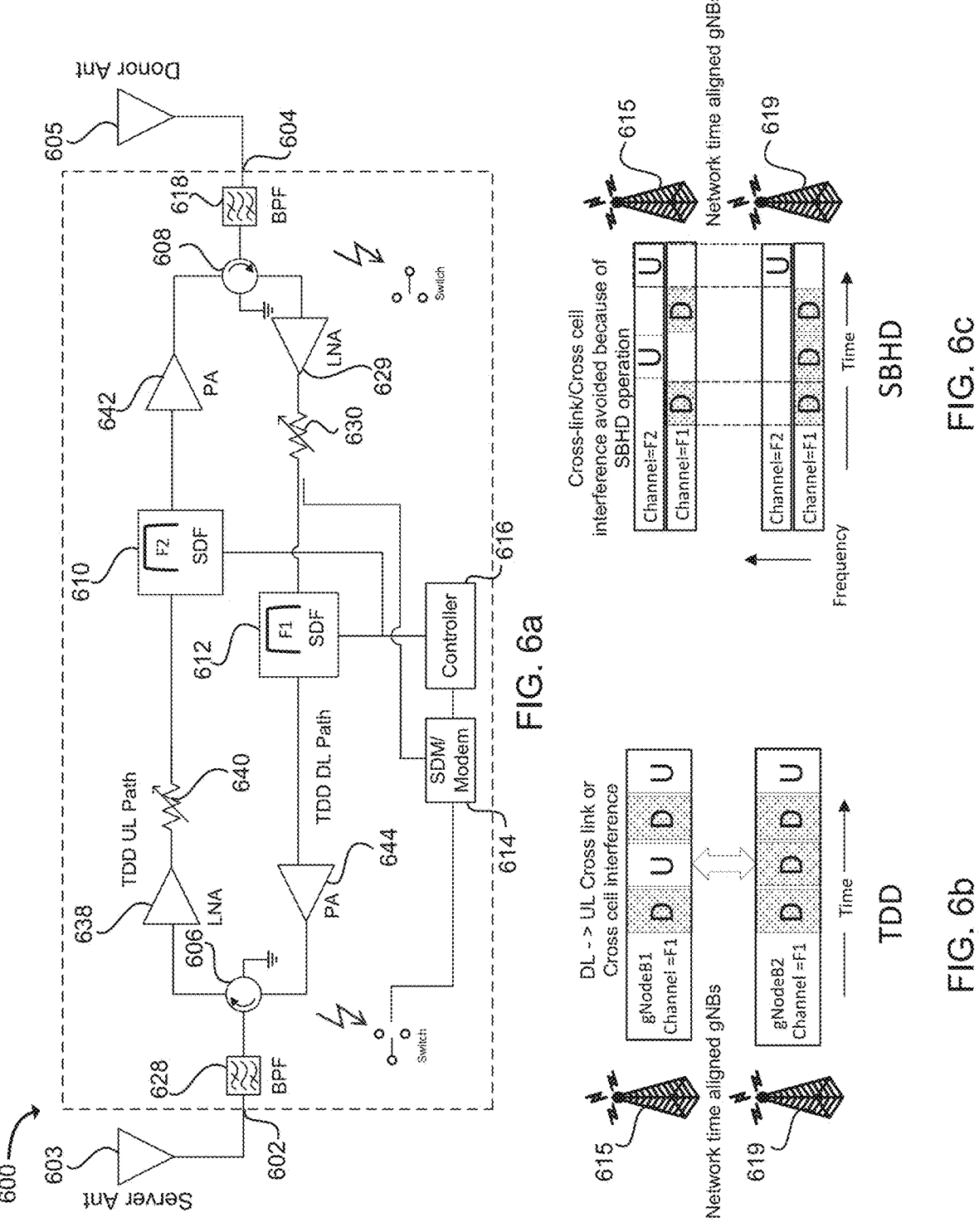
FIG. 6a illustrates a TDD repeater with circulators SDF with a first setting in accordance with an example.
FIG. 6b illustrates sub-band signals broadcast from network time aligned gNBs in accordance with an example.
FIG. 6c illustrates sub-band signals for sub-band half duplex (SBHD) communication using network time aligned gNBs in accordance with an example.

FIG. 6a provides an example of a TDD repeater 600 having a first circulator 606 and a second circulator 608. The repeater 600 also includes a first SDF 610 and a second SDF 612. The repeater 600 is configured to operate similar to the repeater 500 described in the example of FIG. 5a.

FIG. 6b provides an example of a cellular communication system, such as a cellular system configured for 5G NR, with a first gNB 615 and a second gNB 619. The first gNB 615 is configured to communicate using TDD Band 1 (B1) channel F1. B1, as used in the drawings of FIGS. 6b to 11b, is used to represent any band of TDD signal, such as TDD bands from the E-UTRA or 5G NR. The second gNB 619 is also configured to communicate using TDD Band 1 channel F1. F1, as used herein, is an arbitrary frequency band configured for TDD use in a 3GPP E-UTRA or 5G NR system. The gNBs 615, 619 are time aligned by the network so that they switch between UL symbols and DL symbols at substantially the same time to avoid interference. When gNB1 and gNB2 use the same UL/DL configuration, they can communicate within an overlapping range with minimal interference. However, if they use different UL/DL configurations, then cross link and cross cell interference can occur when one of the gNBs transmits an UL and the other transmits a DL during the same time slot.

One way to avoid cross link or cross cell interference is through the use of sub-band half duplex (SBHD) operation. As illustrated in FIG. 6c, the gNBs can be configure to transmit a portion of the signal on a first sub-band or channel within a TDD band, and a second portion of the signal on a second sub-band or channel within the TDD band. In this example, channel F1 is used to transmit DL time slots and channel F2 is used to transmit UL timeslots, or vice versa. Channel F2 is a different portion (i.e. a different channel or sub-band) of B1 than F1. Both gNBs 615 and 619 can be configured to transmit and receive both F1 and F2. Alternatively, one of gNB 615 or 619 can transmit and receive F1, and the other of gNB 615 or 619 can transmit and receive F2.

The gNBs 615 and 619 can be within a communication range of one or more UEs and the repeater 600, as in the example of FIG. 2.

The repeater 600 of FIG. 6a can be configured to receive, filter, amplify, and transmit the TDD SBHD signals in channel F1 and F2 of FIG. 6c. Both BPFs 618, 628 can be configured to pass the signals in channels F1 and F2 that are received and transmitted at the server antenna 603 and the donor antenna 605. In one example, the circulator 606 can direct the signals in channel F1 and F2 through the LNA 638 and variable attenuator 640 to the SDF 610.

The SDF 610 is configured to pass channel F2 while blocking (filtering) channel F1. The signal in channel F1 can be filtered to reduce the amplitude of the signal in channel F1 by a sufficient amount that the output at the donor antenna 605 does not cause oscillation in the repeater 600. For instance, the signal in channel F1 transmitted by the donor antenna 605 is sufficiently low in amplitude that it will not be received by the server antenna 603 and amplified to a higher amplitude at the next transmission by the donor antenna, causing a feedback loop that results in oscillation.

The SDF 610 can filter the UL signal in channel F2 and output the UL signal at a desired amplitude to direct the signal to the PA 642 for amplification. The power amplified signal in channel F2 is then directed through the circulator 608, through the bandpass filter 618 and out of port 604 for transmission by the donor antenna 605.

Similarly, the circulator 608 can direct the signals in channels F1 and F2 through the LNA 629 and variable attenuator 630 to the SDF 612. The SDF 612 can filter the DL signal in channel F1 and output the DL signal at a desired amplitude to direct the signal to the PA 644 for amplification. The power amplified signal in channel F1 is then directed through the circulator 606, through the bandpass filter 628 and out of port 602 for transmission by the server antenna 603.

The SDF 612 is configured to pass channel F1 while blocking (filtering) channel F2. The signal in channel F2 can be filtered to reduce the amplitude of the signal in channel F2 by a sufficient amount that the output at the server antenna 603 does not cause oscillation in the repeater 600. For instance, the signal in channel F2 transmitted by the server antenna 603 is sufficiently low in amplitude that it will not be received by the donor antenna 605 and amplified to a higher amplitude at the next transmission by the server antenna 603, causing a feedback loop that results in oscillation.

The donor antenna 605 and/or server antenna 603 may or may not be part of the repeater 600. The antennas 603, 605 can be sold separately or included with the repeater 600. In one embodiment, the server antenna 603 can be integrated with the repeater 600. Alternatively, the donor antenna can be separate from the repeater 600. The donor antenna 605 and server antenna 603 can be coupled to the repeater via an RF communication path such as a coaxial cable or a fiber optic line.

An SDM and/or modem 614 can be configured to receive the timing and UL/DL configuration for the signals in channel F1 and F2. This information can be conveyed to the controller 616. The controller can send the timing information for switching between UL and DL filters to the SDFs 610 and 612. However, in the embodiment in FIG. 6a, since SDF 610 is configured to only pass UL signals in channel F2, and SDF 612 is configured to only pass DL signals in channel F1, the timing of the UL/DL configuration may not be necessary. The TDD UL/DL configuration information and timing information may be used to provide additional filtering of other signals, if necessary. For example, when UL symbols are not passing through the TDD repeater 600, amplifiers 638, and/or 642, and/or other amplifiers in the TDD UL path can be turned off or have a reduced gain. In addition, the SDF 610 can also be configured to perform bandpass or bandstop filtering when UL symbols are not passing through the TDD repeater 600 to reduce noise transmitted by the TDD repeater 600. Similarly, when DL symbols are not passing through the TDD repeater 600, amplifiers 629, and/or 644, and/or other amplifiers in the TDDL DL path can be turned off or have a reduced gain. The SDF 612 can be configured to perform bandpass or bandstop filtering when DL symbols are not passing through the repeater 600.

In another embodiment, a single-pole double-throw (SPDT) switch can be used in place of each of the circulators 606, 608. The SPDT switch can be in communication with the controller 616. The controller can switch between sending the UL signal to the TDD UL path and the DL signal to the TDD DL signal path based on the UL/DL configuration information and timing information received by the SDM/ Modem 614. However, using the switches only allows the repeater to send one of the UL signal or the DL signal at a time for transmission at the server antenna 603 or the donor antenna 605. Using the circulators 606, 608 allows both antennas 603, 605 to transmit continuously.

Figures 7A, 7B:
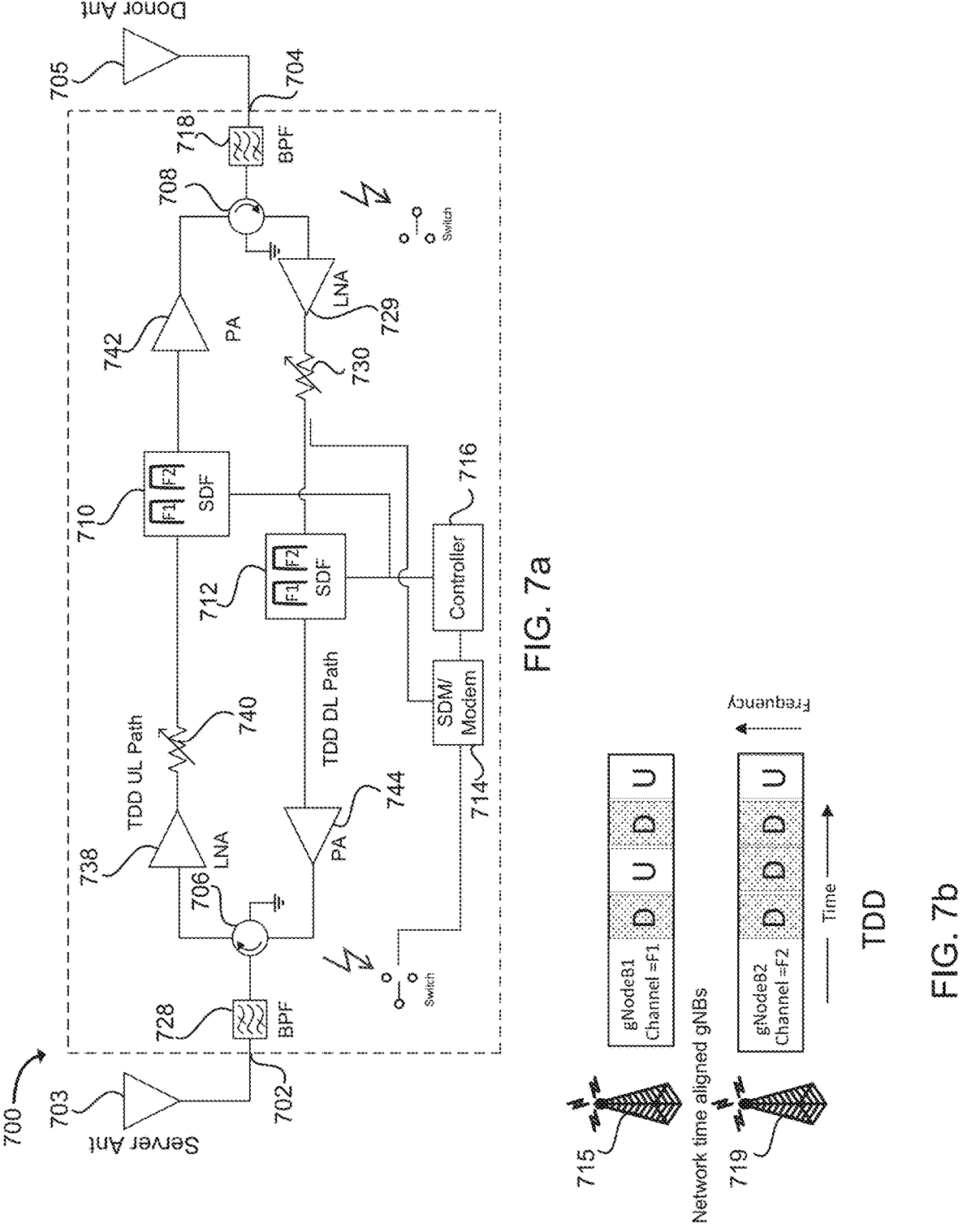
FIG. 7a illustrates a TDD repeater with circulators and software defined filters with another setting in accordance with an example.
FIG. 7b illustrates sub-band signals broadcast from network time aligned gNBs in accordance with an example.

FIG. 7a provides an example of a repeater 700 that is configured to repeat SBHD signals for a cellular system comprising a first gNB 715 that is configured to transmit DL signals and receive UL signals in a first channel F1 of a TDD band, and a second gNB 719 that is configured to transmit DL signals and receive UL signals in a second channel F2 of the TDD band. Accordingly, channels F1 and F2 are sub-bands of the TDD band. FIG. 7b illustrates the example of the cellular system with the first gNB 715 and the second gNB 719. The gNBs may be configured to send signals from the same operator or different operators.

The repeater 700 of FIG. 7a can be configured to receive, filter, amplify, and transmit the TDD SBHD signals in channel F1 and F2 of FIG. 7b. Both BPFs 718, 728 can be configured to pass the signals in channels F1 and F2 that are received and transmitted at the server antenna 703 and the donor antenna 705. In one example, the circulator 706 can direct the signals in channel F1 and F2 through the LNA 738 and variable attenuator 740 to the SDF 710. In another embodiment, separate antenna pairs can be used for separate UL and DL transmission. There is typically spatial isolation between the server antenna 703 and the donor antenna 705. For example, the donor antenna 705 is typically located outside a building, vehicle, or structure, and the server antenna is typically located within the structure and within proximity of a UE transmitting an UL signal. Accordingly, there will be some amplitude difference between DL signals received from the gNBs 715, 719 and the UL signals received from a UE (i.e. 210, FIG. 2). This applies to the examples in FIGS. 8a, 9a and 10a as well.

The SDF 710 is configured to pass the signals in channels F1 and F2 during the UL time slots using a bandpass filter while blocking (filtering) the signals in channels F1 and F2 during the DL time slots. The signals in channels F1 and F2 can be filtered during the DL time slots using a bandstop filter to reduce the amplitude of the signals in channels F1 and F2 during the DL time slots by a sufficient amount that the output at the donor antenna 705 does not cause oscillation in the repeater 700. For instance, the signals in channels F1 and F2 during the downlink timeslots that are transmitted by the donor antenna 705 are sufficiently low in amplitude that they will not be received by the server antenna 703 and amplified to a higher amplitude at the next transmission by the donor antenna 705, causing a feedback loop that results in oscillation.

The SDF 710 can filter the UL signals in channels F1 and F2 and output the UL signals at a desired amplitude to direct the signals to the PA 742 for amplification. The power amplified UL signals in channels F1 and F2 are then directed through the circulator 708, through the bandpass filter 718 and out of port 704 for transmission by the donor antenna 705.

Similarly, the circulator 708 can direct the signals in channels F1 and F2 through the LNA 729 and variable attenuator 730 to the SDF 712. The SDF 712 can filter the DL signals in channels F1 and F2 and output the DL signal at a desired amplitude to direct the signal to the PA 744 for amplification. The power amplified DL signals in channels F1 and F2 are then directed through the circulator 706, through the bandpass filter 728 and out of port 702 for transmission by the server antenna 703.

The SDF 712 is configured to pass the DL signals in channels F1 and F2 while blocking (filtering) the UL signals in channels F1 and F2. The UL signals in channels F1 and F2 can be filtered during the UL time slots using a bandstop filter to reduce the amplitude of the UL signals in channels F1 and F2 by a sufficient amount that the output at the server antenna 703 does not cause oscillation in the repeater 700. For instance, the UL signals in channels F1 and F2 that are transmitted by the server antenna 703 are sufficiently low in amplitude that they will not be received by the donor antenna 705 and amplified to a higher amplitude at the next transmission by the server antenna 703, causing a feedback loop that results in oscillation. Cross link and cross cell interference are avoided due to the SBHD operation of the different channels F1 and F2 in a TDD band.

Accordingly, SDF 710 is configured to pass the signals in channels F1 and F2 during the UL time slots and filter (bandstop) the signals in channels F1 and F2 during the DL time slots. Conversely, SDF 712 is configured to pass the signals in channels F1 and F2 during the DL time slots and filter the signals in channels F1 and F2 during the UL time slots. Channels F1 and F2 can be separated by a sufficient guard band (FIG. 1c) that the SDFs 710, 712 can filter the separate signals. The controller 716 can receive the UL/DL configuration information and signal timing for the signals in channels F1 and F2 from the SDM/modem 714.

Figure 7C:
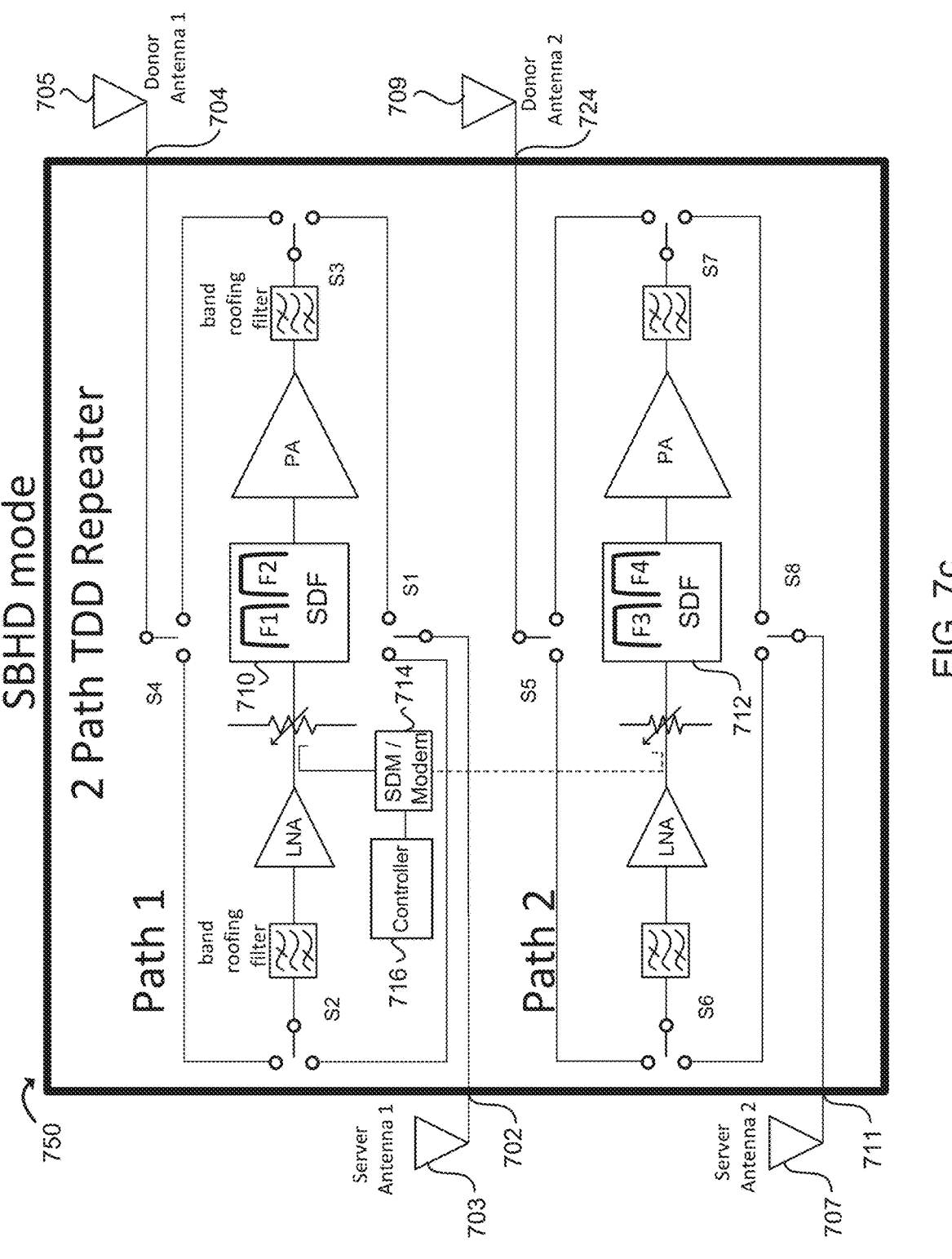
FIG. 7c illustrates a two path sub-band half duplex (SBHD) mode switchable TDD repeater configured to operate in an SBHD mode in accordance with an example.

FIG. 7c provides an example of a two path TDD repeater 750 that can be configured for a SBHD mode of communication. In this example, the two path TDD repeater 750 is configured to provide SBHD communication on Path 1 and Path 2. The repeater paths can receive signals from 2 gNBs that are network time aligned, but can have different UL/DL configurations. The gNBs can belong to the same or different network operator. Path 1 and Path 2 are typically time synchronous, but may not be DL/UL coincident. This can occur when the slot timing is synchronous on the cellular network, but the DL slot on one path may occur during a DL or UL slot on the other path, as shown in FIG. 7b. The SDM/modem 714 can receive a signal from either Path 1 or Path 2 and synchronize the UL/DL TDD switching timing for both paths. The switching can be performed using a controller 716 in communication with the SDM/modem 714, the switches, and the SDFs 710, 712.

In the example of FIG. 7c, a first gNB B1 (FIG. 7b) can transmit and receive SBHD signals F1 and F2. F1 and F2 are TDD sub-bands in a TDD frequency band, as in FIG. 7a. A second gNB B2 (FIG. 7b) can transmit and receive SBHD signals F3 and F4. F3 and F4 are TDD sub-bands in a TDD frequency band. The TDD frequency band for F3 and F4 may be the same or a different TDD frequency band from the TDD band that sub-bands F1 and F2 belong to. The gNBs can transmit and receive sub-bands that have different UL/DL configurations. The SDM/modem 714 can determine the network frame/slot timing and UL/DL configuration for F1, F2 and F3, F4. Alternatively, a first SDM/Modem can be used to determine the network frame/slot timing and UL/DL configuration for F1 and F2, and a second SDM/Modem can be used to determine the network frame/slot timing and UL/DL configuration for F3 and F4. The SDM/modem(s) 714 can couple to a single path or both paths of Path 1 and Path 2. The SDM/modem(s) 714 can communicate the signal timing and UL/DL configuration to a controller 716 that can communicate with the switches and the SDFs 710, 712. The SDF 710 in Path 1 is configured to filter and amplify UL and DL signals for sub-band F1 and sub-band F2. The SDF 712 in Path 2 is configured to filter and amplify UL and DL signals for sub-band F3 and sub-band F4.

In the example of FIG. 7c, Path 1 and Path 2 can both have parallel filtering channels F1/F2 and F3/F4 respectively. The SDFs 710, 712 can each be configured to filter two separate channels, F1/F2 and F3/F4, respectively. The SBHD frequency band F1 can equal F3 or F4 and F2 can equal F4 or F3. Alternatively, F1, F2, F3, and F4 can all be different sub-bands. F1, F2, F3 and F4 can have the same or different bandwidths.

In one example, a TDD SBHD F1 and/or F2 UL signal can be received at server antenna 1 703, directed to the two path TDD repeater 750 via a server antenna 1 port 702 in the repeater 750 and switched at S1 and S2 to be directed along Path 1. The TDD F1 and/or F2 UL signal can travel along Path 1, where the signal may be filtered, amplified, and attenuated prior to communication to SDF 710. The SDF 710 can digitally filter and amplify the F1 and/or F2 UL signal. Any TDD F1 or F2 DL signals in the TDD signal that are on a different frequency band can be blocked by the SDF 710. For example, DL signal(s) that are received at the server antenna 1 703 at the same time as the UL signal(s) will be blocked by the SDF as long as the DL signal(s) are on a different frequency band from the UL signal(s). The digitally filtered TDD F1 and/or F2 UL signal output from SDF 710 can then be amplified with a power amplifier, filtered, and switched through S3 and S4 and directed to donor antenna 1 port 704 for transmission from the donor antenna 1 705 to gNB B1 (FIG. 7b).

A TDD SBHD F1 and/or F2 DL signal can be received at donor antenna 1 705 from the gNB B1 (FIG. 7b), directed to the two path TDD repeater 750 via a donor antenna 1 port 704 and switched at S4 and S2 to be directed along Path 1. The TDD F1 and/or F2 DL signal can travel along path 1, where the signal may be filtered, amplified, and attenuated prior to communication to SDF 710. The SDF 710 can digitally filtered and amplify the F1 and/or F2 DL signal. Any TDD F1 or F2 UL signals in the TDD signal that are on a different frequency band can be blocked by the SDF 710. The digitally filtered TDD F1 and/or F2 DL signal output from SDF 710 can then be amplified with a power amplifier, filtered, and switched through S3 and S1 and directed to server antenna 1 port 702 for transmission from the server antenna 1 703 to a UE, such as the UE illustrated in FIG. 13.

A TDD SBHD F3 and/or F4 UL signal can be received at server antenna 2 707, directed to the two path TDD repeater 750 via a server antenna 2 port 711 in the repeater 750 and switched at S8 and S6 to be directed along Path 2. The TDD F3 and/or F4 UL signal can travel along path 2, where the signal may be filtered, amplified, and attenuated prior to communication to SDF 712. The SDF 712 can digitally filter and amplify the F3 and/or F4 UL signal. Any TDD F3 or F4 DL signals in the TDD signal that are on a different frequency band can be blocked by the SDF 712. The digitally filtered TDD F3 and/or F4 UL signal output from SDF 712 can then be amplified with a power amplifier, filtered, and switched through S7 and S5 and directed to donor antenna 2 port 724 for transmission from the donor antenna 2 709 to gNB B2 (FIG. 7b).

A TDD SBHD F1 and/or F2 DL signal can be received at donor antenna 1 705 from the gNB B1 (FIG. 7b), directed to the two path TDD repeater 750 via a donor antenna 1 port 704 in the repeater 750 and switched at S4 and S2 to be directed along Path 1. The TDD F1 or F2 DL signal can travel along path 1, where the signal may be filtered, amplified, and attenuated prior to communication to SDF 710. The SDF 710 can digitally filtered and amplify the F1 and/or F2 DL signal. Any TDD F1 or F2 UL signals in the TDD signal that are on a different frequency band can be blocked by the SDF 710. The digitally filtered TDD F1 and/or F2 DL signal output from SDF 710 can then be amplified with a power amplifier, filtered, and switched through S3 and S 1 and directed to server antenna 1 port 702 for transmission from the server antenna 1 703 to a UE, such as the UE illustrated in FIG. 13.

Figures 8A, 8B:
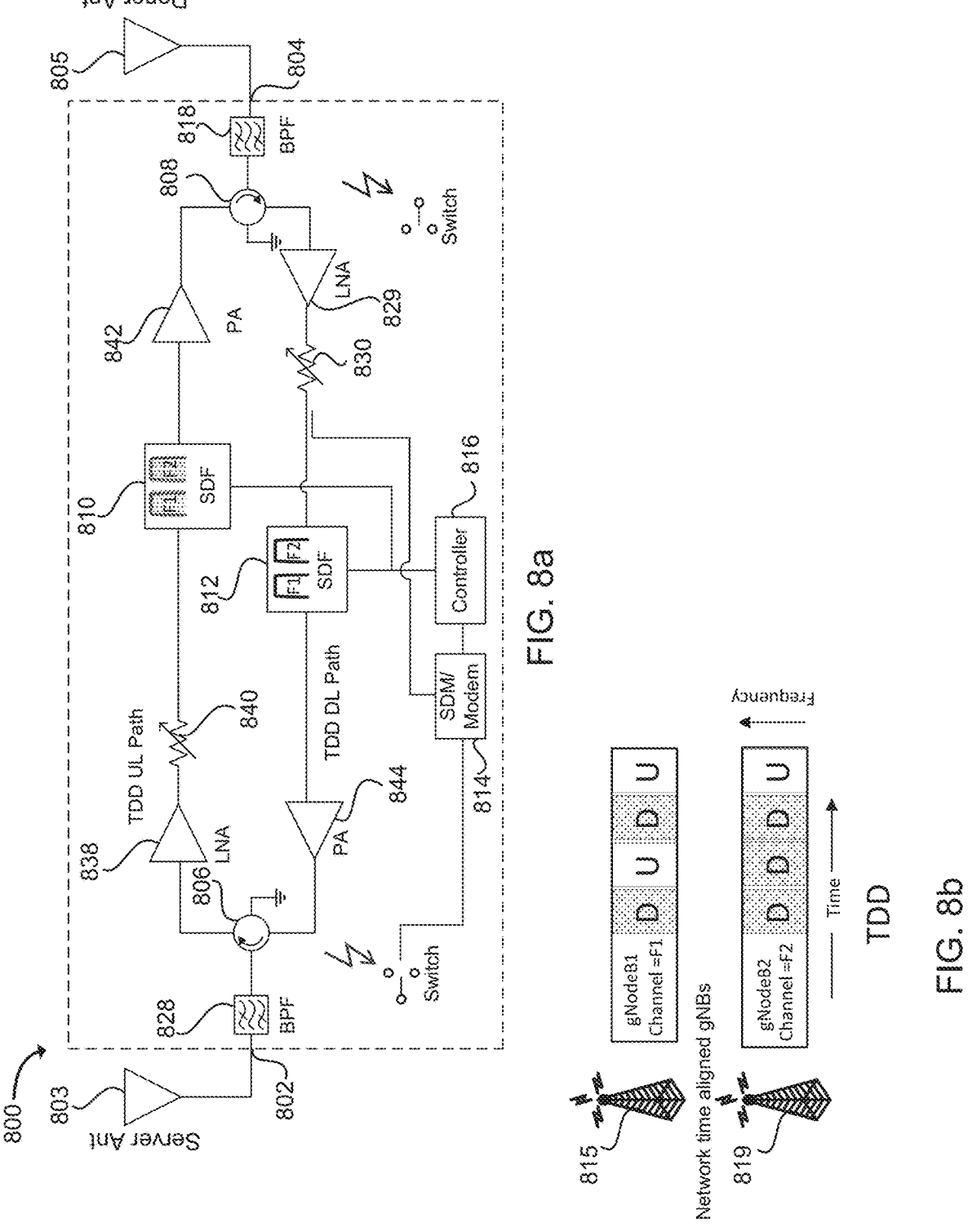
FIG. 8a illustrates a TDD repeater with circulators and software defined filters with another setting in accordance with an example.
FIG. 8b illustrates sub-band signals broadcast from network time aligned gNBs in accordance with an example.

FIG. 8a provides an example of a repeater 800 that is configured to repeat SBHD signals for a cellular system comprised of multiple gNBs that are owned by different operators. Because the gNBs are owned by different operators that may be transmitting different signals, sending amplified UL signals from the repeater to the multiple gNBs may not be possible since the different UL signals may both be received by gNBs, thereby causing Cross-cell interference at the gNBs. However, the DL signals from the gNBs can still be received, filtered, and amplified at the repeater and communicated to one or more UEs.

FIG. 8b provides an example of a cellular system with a gNB 815 that is owned by a first operator and configured to transmit DL signals and receive UL signals in a first channel F1 of a TDD band, and a second gNB 819 that is owned by a second operator different from the first operator and configured to transmit DL signals and receive UL signals in a second channel F2 of the TDD band. Accordingly, channels F1 and F2 are sub-bands of the TDD band. FIG. 8b illustrates the example of the cellular system with the first gNB 815 and the second gNB 819. The gNBs may be configured to send different DL signals from the different operators.

The repeater 800 of FIG. 8a can be configured to receive, filter, amplify, and transmit the DL TDD SBHD signals in channels F1 and F2 of FIG. 8b while blocking the UL TDD SBHD signals in channels F1 and F2. Both BPFs 818 and 828 can be configured to pass the signals in channels F1 and F2 that are received and transmitted at the server antenna 803 and the donor antenna 805. In one example, the circulator 806 can direct the signals in channel F1 and F2 through the LNA 838 and variable attenuator 840 to the SDF 810 on the TDD UL path.

The SDF 810 is configured to block the signals in channels F1 and F2 during both the DL time slots and the UL time slots using a bandstop filter. The signals in channels F1 and F2 can be filtered during the UL and DL time slots using a bandstop filter to reduce the amplitude of the signals in channels F1 and F2 during the UL and DL time slots by a sufficient amount that the output at the donor antenna 805 does not cause oscillation in the repeater 800. For instance, the signals in channels F1 and F2 during the UL and DL timeslots that are transmitted by the donor antenna 805 are sufficiently low in amplitude that they will not be received by the server antenna 803 and amplified to a higher amplitude at the next transmission by the donor antenna 805, causing a feedback loop that results in oscillation. The controller 816 can increase the attenuation of the signals at the variable attenuator 840 in channels F1 and F2 and decrease any amplification by the PA 842 to further reduce the amplitude of the signals during the UL and DL time slots.

The circulator 808 can direct the signals in channels F1 and F2 through the LNA 829 and variable attenuator 830 to the SDF 812. The SDF 812 can filter the DL signals in channels F1 and F2 and output the DL signal at a desired amplitude to direct the signal to the PA 844 for amplification. The power amplified DL signals in channels F1 and F2 are then directed through the circulator 806, through the bandpass filter 828 and out of port 802 for transmission by the server antenna 803.

The SDF 812 is configured to pass the DL signals in channels F1 and F2 using a bandpass filter while blocking (filtering) the UL signals in channels F1 and F2 using a bandstop filter. The UL signals in channels F1 and F2 can be filtered during the UL time slots using a bandstop filter to reduce the amplitude of the UL signals in channels F1 and F2 by a sufficient amount that the output at the server antenna 803 does not cause oscillation in the repeater 800. For instance, the UL signals in channels F1 and F2 that are transmitted by the server antenna 803 are sufficiently low in amplitude that they will not be received by the donor antenna 805 and amplified to a higher amplitude at the next transmission by the server antenna 803, causing a feedback loop that results in oscillation. Cross link and cross cell interference are avoided, even when there are different DL signals simultaneously transmitted by gNB 815 and 819 due to the SBHD operation of the different channels F1 and F2 in the TDD band.

Accordingly, SDF 810 is configured to filter (bandstop) the signals in channels F1 and F2 during the UL and DL time slots. SDF 812 is configured to pass the signals in channels F1 and F2 during the DL time slots and filter the signals in channels F1 and F2 during the UL time slots. Channels F1 and F2 can be separated by a sufficient guard band (FIG. 1c) that the SDFs 810, 812 can filter the separate signals. The controller 816 can receive the UL/DL configuration information and signal timing for the signals in channels F1 and F2 of the TDD band from the SDM/modem 814.

Figures 9A, 9B:
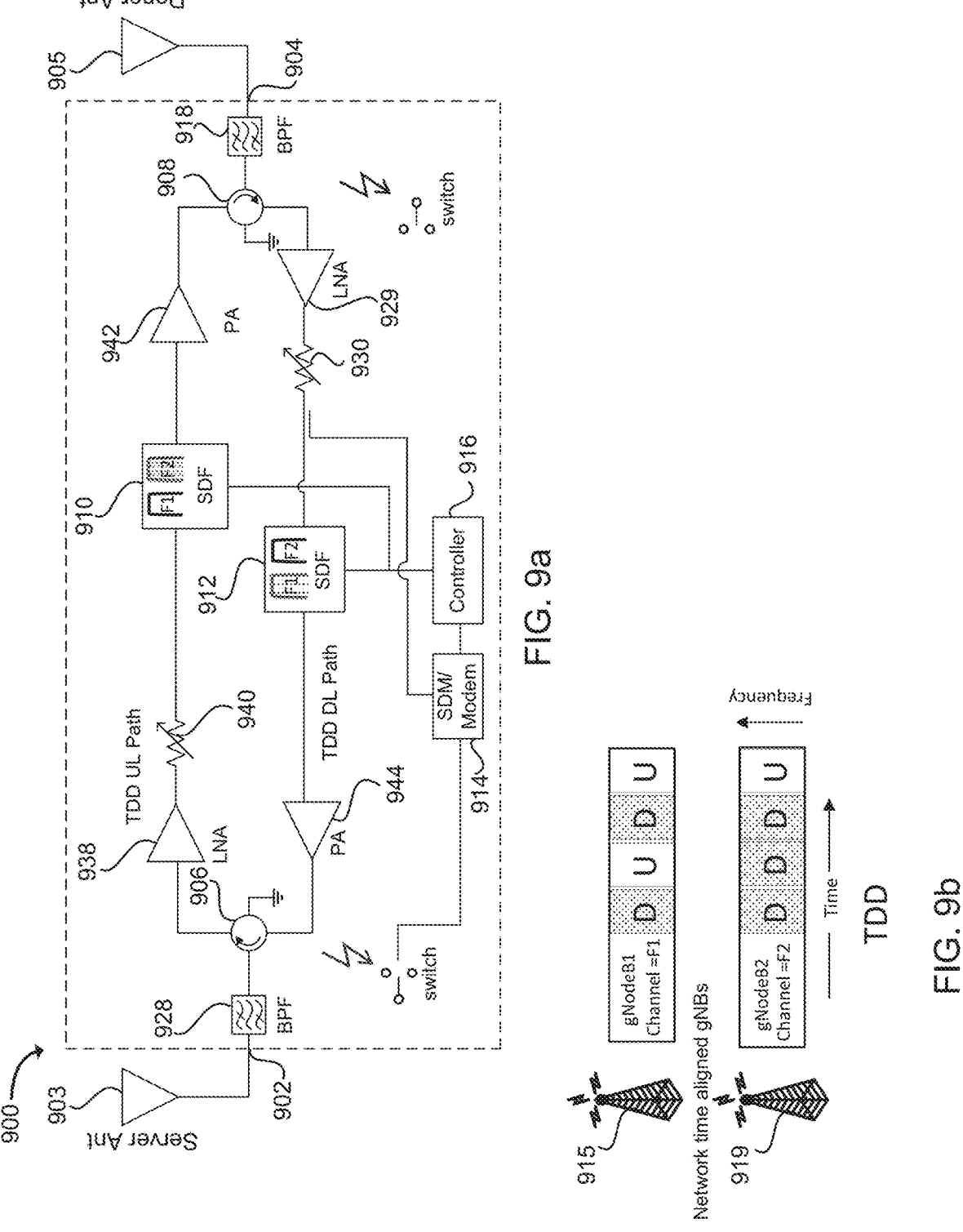
FIG. 9a illustrates a TDD repeater with circulators and software defined filters with another setting in accordance with an example.
FIG. 9b illustrates sub-band signals broadcast from network time aligned gNBs in accordance with an example.

FIG. 9a provides an example of a repeater 900 that is configured to repeat SBHD signals for a cellular system comprising a first gNB 915 that is configured to transmit DL signals and receive UL signals in a first channel F1 of a TDD band, and a second gNB 919 that is configured to transmit DL signals and receive UL signals in a second channel F2 of the TDD band. Accordingly, channels F1 and F2 are subbands of the TDD band. FIG. 9b illustrates the example of the cellular system with the first gNB 915 and the second gNB 919. The gNBs may be configured to send signals from different operators.

In the example of FIG. 9a, the SDF 910 can be configured to pass uplink signals in channel F1 during UL time slots and block UL signals (bandstop) in channel F2 during UL time slots. The SDF 912 can be configured to pass DL signals in channel F2 during DL time slots and block DL signals (bandstop) in channel F1 during DL time slots. This enables the repeater 900 to boost the SBHD TDD for channel F2 on DL and for channel F1 on UL in this embodiment.

Both BPFs 918, 928 in FIG. 9a can be configured to pass the signals in channels F1 and F2 that are received and transmitted at the server antenna 903 and the donor antenna 905. In one example, the circulator 906 can direct the signals in channel F1 and F2 through the LNA 938 and variable attenuator 940 to the SDF 910.

The SDF 910 is configured to pass the signal in channel F1 during the UL time slot using a bandpass filter while blocking (filtering) the signal in channel F2 during the UL timeslot and in channels F1 and F2 during the DL time slots. The UL signal in channel F1 and the DL signals in channels F1 and F2 can be filtered during the UL and DL time slots using bandstop filters to reduce the amplitude of the signals in channels F1 and F2 during the UL and DL time slots by a sufficient amount that the output at the donor antenna 905 does not cause oscillation in the repeater 900. For instance, the DL signals in channels F1 and F2 an during the downlink timeslots and the UL signal in channel F2 that are transmitted by the donor antenna 905 are sufficiently low in amplitude that they will not be received by the server antenna 903 and amplified to a higher amplitude at the next transmission by the donor antenna 905, causing a feedback loop that results in oscillation.

The SDF 910 can filter the UL signals in channels F1 and output the UL signals from channel F1 at a desired amplitude to direct the signals to the PA 942 for amplification. The power amplified UL signals in channel F1 is then directed through the circulator 908, through the bandpass filter 918 and out of port 904 for transmission by the donor antenna 905.

Similarly, the circulator 908 can direct the signals in channels F1 and F2 through the LNA 929 and variable attenuator 930 to the SDF 912. The SDF 912 can filter the DL signal in channel F2 and output the DL signal at a desired amplitude to direct the signal to the PA 944 for amplification. The power amplified DL signal in channel F2 is then directed through the circulator 906, through the bandpass filter 928 and out of port 902 for transmission by the server antenna 903.

The SDF 912 is configured to pass the DL signal in channel F2 while blocking (filtering) the DL signal in channel F1 and UL signals in channels F1 and F2. The downlink signal in channel F1 and the UL signals in channels F1 and F2 can be filtered during the UL and DL time slots using bandstop filters to reduce the amplitude of the DL signal in channel F1 and the UL signals in channels F1 and F2 by a sufficient amount that the output at the server antenna 903 does not cause oscillation in the repeater 900. For instance, the DL signal in channel F1 and the UL signals in channels F1 and F2 that are transmitted by the server antenna 903 are sufficiently low in amplitude that they will not be received by the donor antenna 905 and amplified to a higher amplitude at the next transmission by the server antenna 903, causing a feedback loop that results in oscillation. Cross link and cross cell interference are avoided due to the SBHD operation of the different channels F1 and F2 in a TDD band.

Accordingly, SDF 910 is configured to pass the UL signal in channel F1 during the UL time slots and filter (bandstop filter) the DL signals in channels F1 and F2 during the DL time slots and the UL signal in channel F2 during the UL time slot. Conversely, SDF 912 is configured to pass the signal in channel F2 during the DL time slots and block (bandstop filter) the signals in channels F1 and F2 during the UL time slots and the signal F1 during the DL time slots. Channels F1 and F2 can be separated by a sufficient guard band (FIG. 1c) that the SDFs 910, 912 can filter the separate signals. The controller 916 can receive the UL/DL configuration information and signal timing for the signals in channels F1 and F2 from the SDM/modem 914.

Figure 9C:
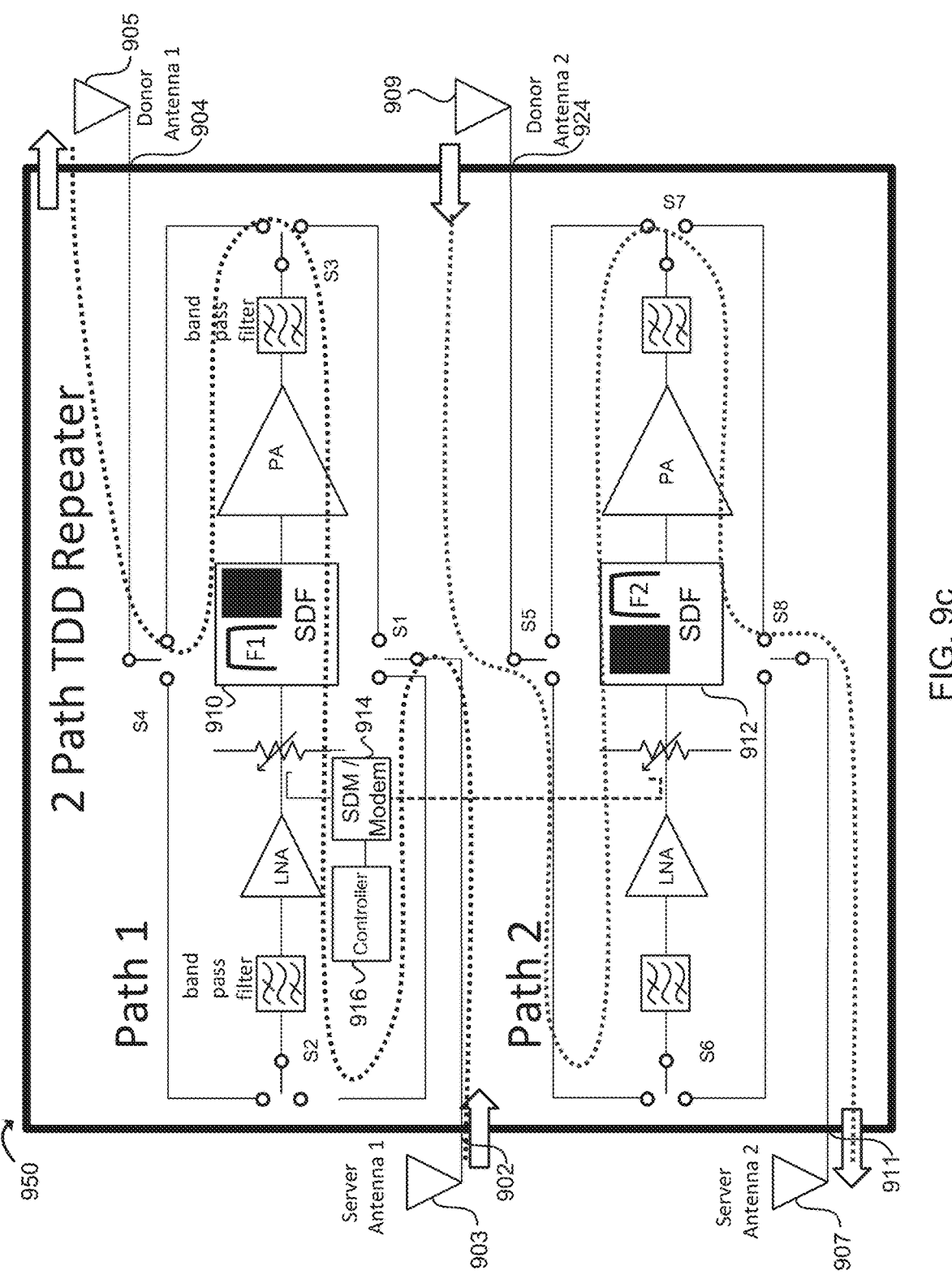
FIG. 9c illustrates another embodiment of a two path TDD repeater configured to operate in an SBHD mode in accordance with an example.

In another embodiment, FIG. 9c is an example illustration of a two path TDD repeater 950. In this example, each of Path 1 and Path 2 are capable of operation to repeat both UL signals and DL signals. The network frame/slot timing can be received at the SDM/modem 914. The network frame/slot timing can be coupled from the signals on Path 1 and/or Path 2. The gNB B1 and B2 can be time synchronized and on different SBHD frequencies, F1 and F2. F1 and F2 are TDD sub-bands in a TDD frequency band, as in FIG. 9a. The gNBs can transmit and receive sub-bands that have different UL/DL configurations. The SDM/modem 914 can determine the network frame/slot timing and UL/DL configuration for F1 and F2. The SDM/modem 914 can communicate the signal timing and UL/DL configuration to a controller 916 that can communicate with the switches and the SDFs 910, 912. The SDF 910 in Path 1 is configured to pass UL signals for sub-band F1 and block DL signals for sub-band F1. The SDF 912 in Path 2 is configured to pass DL signals for sub-band F2 and block UL signals for sub-band F2.

In one example, a TDD SBHD F1 UL signal can be received at server antenna 1 903, directed to the two path TDD repeater 950 via a server antenna 1 port 902 in the repeater 950 and switched at S1 and S2 to travel along path 1 for filtering, amplification, possible attenuation, and digital filtering and amplification in the SDF 910 during UL symbol periods in the TDD signal. Any TDD F1 DL symbols in the TDD signal can be blocked by the SDF 910. The digitally filtered TDD F1 UL signal can then be amplified with a power amplifier, filtered, and switched through S3 and S 4 and directed to donor antenna 1 port 904 for transmission from donor antenna 1 905 to gNB B1 (FIG. 9b).

Similarly, a TDD SBHD F2 DL signal transmitted from gNB B2 (FIG. 9b) can be received at donor antenna 2 909 in FIG. 9c, directed to the two path TDD repeater 950 via a donor antenna port 904 and switched through S5 and S6 to Path 2 in the two path TDD repeater 950. The TDD F2 DL signal may be filtered, amplified, and/or attenuated before being directed to SDF 912 for digital filtering and amplification of the TDD F2 DL symbols. SDF 912 can digitally filter and amplify the TDD F2 DL signal, and block any TDD F2 UL symbols using band stop filtering or deactivation of the SDF 912. The digitally filtered TDD F2 DL signal can then be amplified with a power amplifier, filtered, and switched through S7 and S8 and directed to server antenna port 2 911 for transmission from the server antenna 2 907 to a UE, such as the UE illustrated in FIG. 13.

Figure 9D:
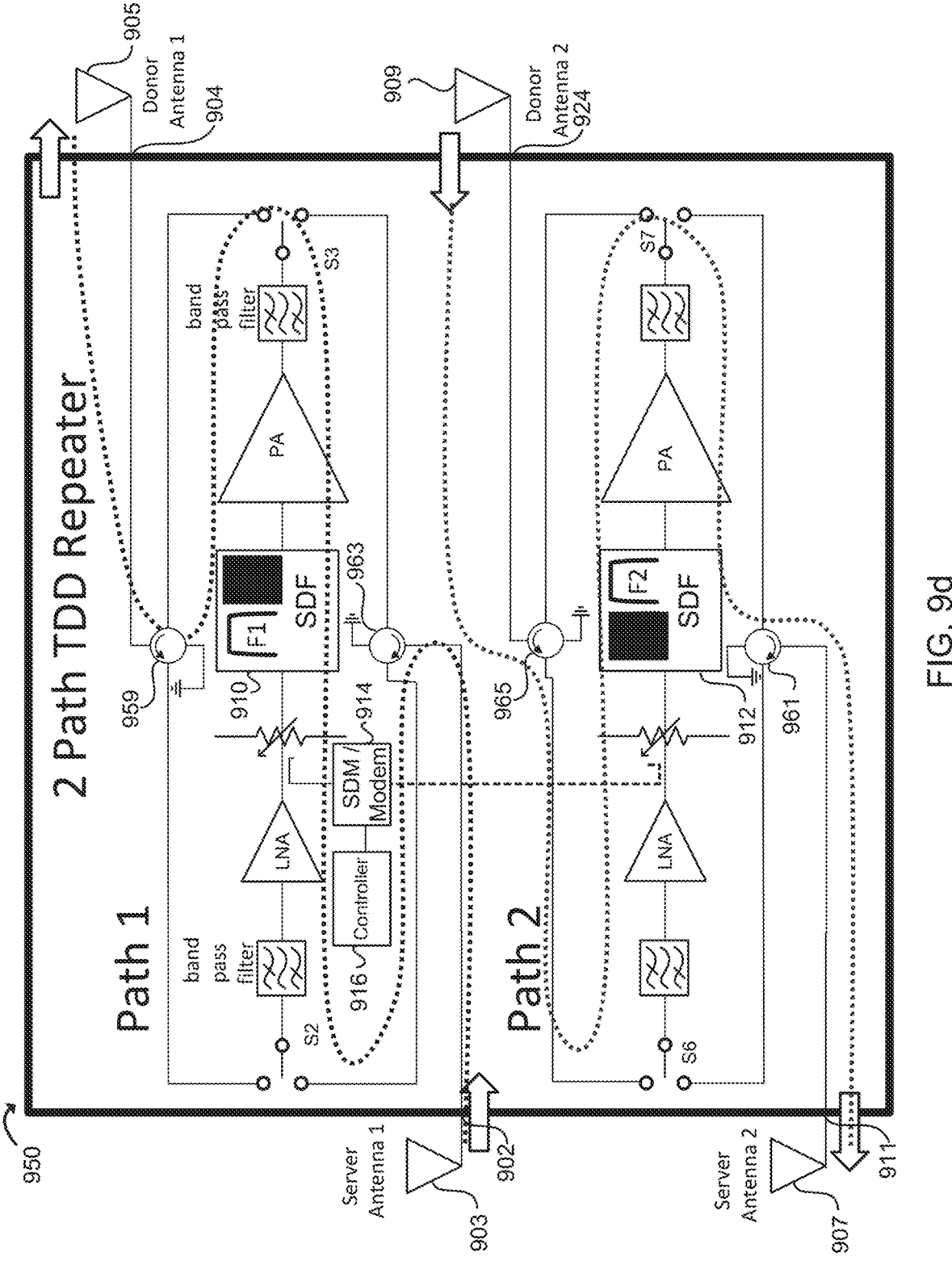
FIG. 9d illustrates another embodiment of a two path TDD repeater configured with circulators to operate in an SBHD mode in accordance with an example.

FIG. 9d illustrates another example of the two path TDD repeater of FIG. 9c, with a circulator 959 used in place of the S4, circulator 961 used in place of S8, circulator 963 used in place of S1, and circulator 965 used in place of S5. The circulators 959 961, 963 and 965 can pass the signals to and from the donor antenna 1 905 and the server antenna 2 907 without the need for switching or switching signals from the controller 916 or SDM 914.

In one embodiment, a dual path time division duplex (TDD) repeater 950 is disclosed. The dual path repeater 950 can comprise a first server antenna port 902 and a first donor antenna port 904. A first TDD amplification and filtering path (Path 1) can be coupled between the first server antenna port 902 and the first donor antenna port 904 or between the first donor antenna port 904 and the first server antenna port 902. The first TDD amplification and filtering path can comprise a first software defined filter (SDF) 910 that is configured to filter: at least a first TDD uplink (UL) signal of a first TDD frequency range within a first TDD band and output the first TDD UL signal with a predetermined gain; or at least a first TDD downlink (DL) signal of the first TDD frequency range within the first TDD band and output the first TDD DL signal with a predetermined gain.

The dual path repeater 950 can further comprise a second server antenna port 911 and a second donor antenna port 924. A second TDD amplification and filtering path (Path 2) can be coupled between the second server antenna port 911 and the second donor antenna port 924 or between the second donor antenna port 924 and the second server antenna port 911. The second TDD amplification and filtering path can comprise a second SDF configured to filter: at least a second TDD uplink (UL) signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain.

The dual path repeater 950 can further comprise a controller 916 configured to be coupled to provide a timing signal and an UL/DL configuration for one or more of the first TDD UL signal, the first TDD DL signal, the second TDD UL signal, and the second TDD DL signal.

The first amplification and filtering path (Path 1) can further comprise a first signal directing component 959 configured to couple to the first donor antenna port 904 to a second switch S2 and a third switch S3. The first signal directing component 959 can be a switch or a circulator. The second switch S2 is configured to couple an input of the first SDF 910 to the first signal directing component 959 or a second signal directing component 963. The second signal directing component 963 is configured to couple the first server antenna port 902 to the third switch S3 and the second switch S2. The third switch S3 is configured to couple an output of the first SDF 910 to the first signal directing component 959 to direct the first TDD UL signal output from the first SDF 910 to the first donor antenna port 904 for transmission at a first donor antenna 905. The third switch S3 is also configured to couple an output of the first SDF 910 to the second signal directing component 963 to direct the first TDD DL signal output from the first SDF to the first server antenna port 902 for transmission at a server antenna 903.

The second amplification and filtering path (Path 2) can further comprise a third signal directing component 961 configured to couple to the second server antenna port 911 to a sixth switch S6 or a seventh switch S7. The sixth switch S6 is configured to couple an input of the second SDF 912 to the third signal directing component 961 or a fourth signal directing component 965. The fourth signal directing component 965 is configured to couple the second donor antenna port 924 to the seventh switch S7 or the sixth switch S6. The seventh switch S7 is configured to: couple an output of the second SDF 912 to the third signal directing component 961 to direct the second TDD DL signal output from the second SDF 912 to the second server antenna port 911 for transmission at a second server antenna 907; and couple an output of the second SDF 912 to the fourth signal directing component 965 to direct the second TDD UL signal output from the second SDF 912 to the second donor antenna port 924 for transmission at a second donor antenna 909.

The dual path TDD repeater 950 can further comprise at least one TDD sync detection module (SDM) 914 configured to receive the timing signal and the UL/DL configuration and send it to the controller for the one or more of the first TDD UL signal and the first TDD DL signal and the second TDD UL signal and the second TDD DL signal. The SDM 914 can be coupled to one or more of the first amplification and filtering path (Path 1) or the second amplification and filtering path (Path 2).

The dual path TDD repeater 950 can further comprise at least one modem 914 configured to receive the timing signal and the UL/DL configuration and send it to the controller 916 for the one or more of the first TDD UL signal and the first TDD DL signal or the second TDD UL signal and the second TDD DL signal.

In one embodiment, the first TDD band and the second TDD band can be within a single third generation partnership project (3GPP) TDD band to enable SBHD communication. In another embodiment, the first TDD band and the second TDD band can be within separate 3GPP TDD bands.

In one embodiment, at least the first TDD UL signal of the first TDD frequency range can be comprised of two or more sub-band UL signals within a first single third generation partnership project (3GPP) TDD band; and the at least the first TDD DL signal of the first TDD frequency range is comprised of two or more DL sub-band signals within the first single 3GPP TDD band; or the at least the second TDD UL signal of the second TDD frequency range is comprised of two or more sub-band signals within a second single 3GPP TDD band; and the at least the second TDD DL signal of the second TDD frequency range is comprised of two or more sub-band signals within the second single 3GPP TDD band.

In another embodiment, the two or more sub-band UL signals of the first TDD frequency range filtered at the first SDF 910 are different from the two or more sub-band UL signals of the second TDD frequency range filtered at the second SDF 912; and the two or more sub-band DL signals of the first TDD frequency range filtered at the first SDF 910 are different from the two or more sub-band DL signals of the second TDD frequency range filtered at the second SDF 912 to enable the dual path TDD repeater 950 to operate as a multi-path repeater configured to operate in a sub-band half duplex (SBHD) mode.

In one embodiment, the dual path TDD repeater 950 can further comprise a first bandpass filter and a first low noise amplifier located: between the first server antenna port 902 and the input of the first SDF 910; or between the first donor antenna port 904 and the input of the first SDF 910 depending on the position of the second switch S2. A second bandpass filter and a second low noise amplifier can be located between the second server antenna port 911 and the input of the second SDF 912; or between the second donor antenna port 924 and the input of the second SDF 912, depending on the position of the third switch S6.

The dual path TDD repeater 950 can further comprise a first power amplifier and a third bandpass filter located: between an output of the first SDF 910 and the first server antenna port 902; or between the output of the first SDF 910 and the first donor antenna port 904 depending on the position of the third switch S3. The dual path TDD repeater 950 can further comprise a second power amplifier and a fourth bandpass filter located: between the output of the second SDF 912 and the second server antenna port 911; or between the output of the second SDF 912 and the second donor antenna port 924, depending on the position of the seventh switch S7.

In one embodiment, the first signal directing component 959 is a circulator or the first signal directing component is a switch. The second signal directing component 963 is a circulator or the second signal directing component is a switch. The third signal directing component 961 is a circulator or the third signal directing component is a switch. The fourth signal directing component 965 is a circulator or the fourth signal directing component is a switch.

In another embodiment, a time division duplex (TDD) repeater 950 is disclosed comprising: a first server antenna port 902 and a first donor antenna port 904. A first TDD amplification and filtering path (Path 1) is coupled between the first server antenna port 902 and the first donor antenna port 904 or between the first donor antenna port 904 and the first server antenna port 902. The first TDD amplification and filtering path (Path 1) comprises a shared first software defined filter (SDF) 910 configured to filter: at least a first TDD uplink (UL) signal of a first TDD frequency range within a first TDD band and output the first TDD UL signal with a predetermined gain; and at least a first TDD downlink (DL) signal of the first TDD frequency range within the first TDD band and output the first TDD DL signal with a predetermined gain. The TDD repeater 950 further comprises a first circulator 963 communicatively coupled between the first donor antenna port 902, an input to the first TDD amplification and filtering path (Path 1), and an output of the first amplification and filtering path. A second circulator 959 is communicatively coupled between the first donor antenna port 905, an input to the first TDD amplification and filtering path (Path 1), and an output of the first amplification and filtering path. The TDD repeater 950 further comprises a controller 916 configured to be coupled to provide a timing signal and an UL/DL configuration for one or more of the first TDD UL signal and the first TDD DL signal.

The TDD repeater 950 can further comprise a second server antenna port 911 and a second donor antenna port 924. A second TDD amplification and filtering path (Path 2) coupled between the second server antenna port 911 and the second donor antenna port 924 or between the second donor antenna port 924 and the second server antenna port 911, depending on the position of the sixth switch S6 and the seventh switch S7. The second TDD amplification and filtering path comprises a second SDF 912 configured to filter at least a second TDD uplink (UL) signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain.

The TDD repeater 950 further comprises a third circulator 961 communicatively coupled between the second server antenna port 911, an input to the second TDD amplification and filtering path (Path 2), and an output of the second amplification and filtering path. A fourth circulator 965 is communicatively coupled between the second donor antenna port 924, an input to the second TDD amplification and filtering path (Path 2), and an output of the second amplification and filtering path.

In one embodiment, the controller 916 is further configured to be coupled to provide a timing signal and an UL/DL configuration for one or more of the second TDD UL signal and the second TDD DL signal.

In one embodiment, the first amplification and filtering path (Path 1) further comprises: the first circulator 963 configured to couple the first server antenna port 902 to a second switch S2 and a third switch S3. The second switch S2 is configured to couple an input of the first SDF 910 to the first circulator 963 or the second circulator 959. The second circulator 959 is configured to couple the first donor antenna port 904 to the third switch S3 or the second switch S2. The third switch S3 is configured to: couple an output of the first SDF 910 to the first circulator 963 to direct the first TDD DL signal output from the first SDF 910 to the first server antenna port 902 for transmission at a first server antenna 903; and couple an output of the first SDF 910 to the second circulator 959 to direct the first TDD UL signal output from the first SDF 910 to the first donor antenna port 904 for transmission at a donor antenna 905.

In one embodiment, the second amplification and filtering path (Path 2) can further comprise the third circulator 961 configured to couple to the second server antenna port 911 to a sixth switch S6 or a seventh switch S7. The sixth switch S6 is configured to couple an input of the second SDF 912 to the third circulator 961 or the fourth circulator 965. The fourth circulator 965 is configured to couple the second donor antenna port 924 to the seventh switch S7 or the sixth switch S6. The seventh switch S7 is configured to: couple an output of the second SDF 912 to the third circulator 961 to direct the second TDD DL signal output from the second SDF 912 to the second server antenna port 911 for transmission at a second server antenna 907; and couple an output of the second SDF 912 to the fourth circulator 965 to direct the second TDD UL signal output from the second SDF 912 to the second donor antenna port 924 for transmission at a second donor antenna 909.

The TDD repeater 950 can further comprise at least one TDD sync detection module (SDM) 914 configured to receive the timing signal and the UL/DL configuration and send it to the controller 916 for the one or more of the first TDD UL signal and the first TDD DL signal and the second TDD UL signal and the second TDD DL signal. The SDM 914 can be coupled to one or more of the first amplification and filtering path (Path 1) or the second amplification and filtering path (Path 2).

The TDD repeater 950 can further comprise at least one modem 914 configured to receive the timing signal and the UL/DL configuration and send it to the controller 916 for the one or more of the first TDD UL signal and the first TDD DL signal and the second TDD UL signal and the second TDD DL signal.

In one embodiment, the first TDD band and the second TDD band are within a single third generation partnership project (3GPP) TDD band. In another embodiment, the first TDD band and the second TDD band are within separate third generation partnership project (3GPP) TDD bands.

In one embodiment, the at least the first TDD UL signal of the first TDD frequency range is comprised of two or more sub-band UL signals within a first single third generation partnership project (3GPP) TDD band; and the at least the first TDD DL signal of the first TDD frequency range is comprised of two or more DL sub-band signals within the first single 3GPP TDD band; or the at least the second TDD UL signal of the second TDD frequency range is comprised of two or more sub-band signals within a second single 3GPP TDD band; and the at least the second TDD DL signal of the second TDD frequency range is comprised of two or more sub-band signals within the second single 3GPP TDD band.

In one embodiment, the two or more sub-band UL signals of the first TDD frequency range filtered at the first SDF are different from the two or more sub-band UL signals of the second TDD frequency range filtered at the second SDF 912; and the two or more sub-band DL signals of the first TDD frequency range filtered at the first SDF 910 are different from the two or more sub-band DL signals of the second TDD frequency range filtered at the second SDF 912 to enable the dual path TDD repeater to operate as a multi-path repeater configured to operate in a sub-band half duplex (SBHD) mode.

The TDD repeater 950 can further comprise a first band-pass filter and a first low noise amplifier can be located: between the first server antenna port 902 and the input of the first SDF 910; or between the first donor antenna port 904 and the input of the first SDF 910. A second bandpass filter and a second low noise amplifier can be located: between the second server antenna port 911 and the input of the second SDF 912; or between the second donor antenna port 924 and the input of the second SDF 912. A first power amplifier and a third bandpass filter can be located: between the output of the first SDF 910 and the first server antenna port 902; or between the output of the first SDF 910 and the first donor antenna port 904. A second power amplifier and a fourth bandpass filter can be located: between the output of the second SDF 912 and the second server antenna port 911; or between the output of the second SDF 912 and the second donor antenna port 924.

FIGS. 7c, 9c, and 9d provide examples of a two path TDD repeater that are configured such that Path 1 shares all of the components for the UL and DL signal on Path 1, and Path 2 shares all of the components for the UL signal and DL signal on path 2. Sharing the components for the UL and DL paths can be helpful in reducing cost, current draw, component space, and increasing the robustness of the TDD repeater by reducing the number of components that can fail. However, the examples in FIGS. 7c, 9c, and 9d are not intended to be limiting. In other examples, selected components, such as one or more of the bandpass filters, LNAs, PAs, attenuators, SDFs, the SDM/modem, or even the controller can be separate, with a separate component used for DL signals on one of Path 1 or Path 2 and for UL signals on one of Path 1 or Path 2. For example, a separate SDF may be used for UL and DL signals on each of Path 1 and Path 2. Alternatively, the same SDF may be used for an UL and DL signal, but one or more separate filters, amplification chains (i.e. LNA or PA), or attenuators may be used for UL signals and DL signals on Path 1 or Path 2. In addition, a separate SDM/modem can be used, with one SDM/modem used to determine an UL/DL configuration and timing for the signal(s) on Path 1, and another separate SDM/modem used to determine an UL/DL configuration and timing for the signal(s) on Path 2. While donor and server antenna(s) are illustrated in the example drawings with the various configurations of the repeaters, the repeaters may be manufactured and/or sold without the donor and server antenna(s). An off the shelf antenna may be configured to be attached to an antenna port on the repeater.

Figures 10A, 10B:
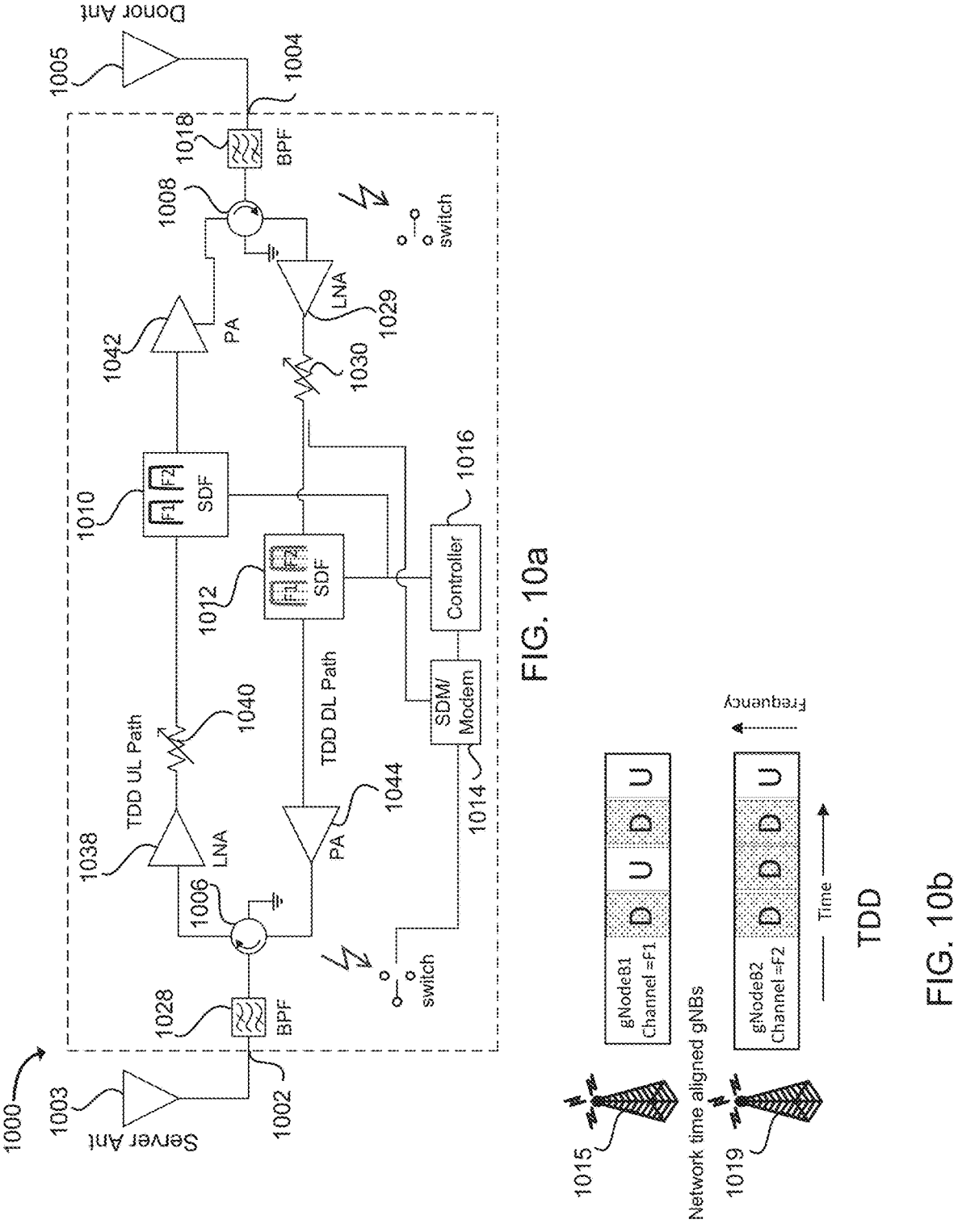
FIG. 10a illustrates a TDD repeater with circulators and software defined filters with another setting in accordance with an example.
FIG. 10b illustrates sub-band signals broadcast from network time aligned gNBs in accordance with an example.

FIG. 10a provides an example of a repeater 1000 that is configured to repeat SBHD signals for a cellular system comprising a first gNB 1015 that is configured to transmit DL signals and receive UL signals in a first channel F1 of a TDD band, and a second gNB 1019 that is configured to transmit DL signals and receive UL signals in a second channel F2 of the TDD band. Accordingly, channels F1 and F2 are sub-bands of the TDD band. FIG. 10b illustrates the example of the cellular system with the first gNB 1015 and the second gNB 1019. The gNBs may be configured to send signals from the same operator or different operators.

The repeater 1000 of FIG. 10a can be configured with SDFs to receive, filter, amplify, and transmit the TDD UL SBHD signals in channel F1 and F2 of FIG. 10b while blocking (filtering) the TDD DL SBHD signals in channels F1 and F2 of FIG. 10b. Both BPFs 1018, 1028 can be configured to pass the signals in channels F1 and F2 that are received and transmitted at the server antenna 1003 and the donor antenna 1005. In one example, the circulator 1006 can direct the signals in channel F1 and F2 through the LNA 1038 and variable attenuator 1040 to the SDF 1010. In another embodiment, separate antenna pairs can be used for separate UL and DL transmission.

The SDF 1010 is configured to pass the signals in channels F1 and F2 during the UL time slots using a bandpass filter while blocking (filtering) the signals in channels F1 and F2 during the DL time slots. The signals in channels F1 and F2 can be filtered during the DL time slots using a bandstop filter to reduce the amplitude of the signals in channels F1 and F2 during the DL time slots by a sufficient amount that the output at the donor antenna 1005 does not cause oscillation in the repeater 1000. For instance, the signals in channels F1 and F2 during the downlink timeslots that are transmitted by the donor antenna 1005 are sufficiently low in amplitude that they will not be received by the server antenna 1003 and amplified to a higher amplitude at the next transmission by the donor antenna 1005, causing a feedback loop that results in oscillation.

The SDF 1010 can filter the UL signals in channels F1 and F2 and output the UL signals at a desired amplitude to direct the signals to the PA 1042 for amplification. The power amplified UL signals in channels F1 and F2 are then directed through the circulator 1008, through the bandpass filter 1018 and out of port 1004 for transmission by the donor antenna 1005. Cross link and cross cell interference are avoided due to the SBHD operation of the different channels F1 and F2 in a TDD band.

The circulator 1008 can direct the signals in channels F1 and F2 through the LNA 1029 and variable attenuator 1030 to the SDF 1012. The SDF 1012 can block the DL signals in channels F1 and F2. The controller 1016 can further reduce the power of the DL signals in F1 and F2 by increasing the attenuation in the variable attenuator 1030 and reducing or turning off the power amplifier 1044.

The SDF 1012 is configured to block (filter) the DL signals in channels F1 and F2 while also blocking (filtering) the UL signals in channels F1 and F2. The UL signals and DL signals in channels F1 and F2 can be filtered by the SDF 1012 during the UL time slots and DL time slots using bandstop filters to reduce the amplitude of the UL signals and the DL signals in channels F1 and F2 by a sufficient amount that the output at the server antenna 1003 does not cause oscillation in the repeater 1000. For instance, the UL signals and the DL signals in channels F1 and F2 that are transmitted by the server antenna 1003 are sufficiently low in amplitude that they will not be received by the donor antenna 1005 and amplified to a higher amplitude at the next transmission by the server antenna 1003, causing a feedback loop that results in oscillation.

Accordingly, SDF 1010 is configured to pass the signals in channels F1 and F2 during the UL time slots and filter (bandstop) the signals in channels F1 and F2 during the DL time slots. SDF 1012 is configured to block (filter) the signals in channels F1 and F2 during the DL time slots and the UL timeslots. Channels F1 and F2 can be separated by a sufficient guard band (FIG. 1*c*) that the SDFs 1010, 1012 can filter the separate signals. The controller 1016 can receive the UL/DL configuration information and signal timing for the signals in channels F1 and F2 from the SDM/modem 1014.

The examples illustrated in FIGS. 5*a*-10*b* describe embodiments of TDD repeaters that are capable of receiving, filtering, amplifying, and transmitting sub-band half duplex (SBHD) TDD UL and DL signals, wherein each SBHD signal is transmitted on a different TDD sub-band (i.e. channel) frequency within a TDD band. The repeater can be configured to transmit and/or receive the UL and DL time slots for a sub-band based on the configuration of the SDF. The SDF can be a single processor, such as an FPGA or ASIC. Alternatively, multiple processors can be used. One or more SDMs or modems can be used to provide an UL/DL configuration and timing information for each sub-band TDD signal. This information can be sent to a controller. The controller can be coupled to the SDF(s) to setup the timing for switching filtering for each time slot, if necessary. The filter can be switched when a time slot changes from UL to DL or DL to UL. The SDF can be configured to switch filters faster than the minimum TX/RX or RX/TX switching time of a 3GPP 4G or 5G cellular communication system, as shown and described with respect to Table 9 for a 3GPP 5G NR system. A 4G system only switches UL/DL configuration on a frame by frame basis, or once every 10 milliseconds, which is well within switching time capability of the SDF.

Figures 11A, 11B:
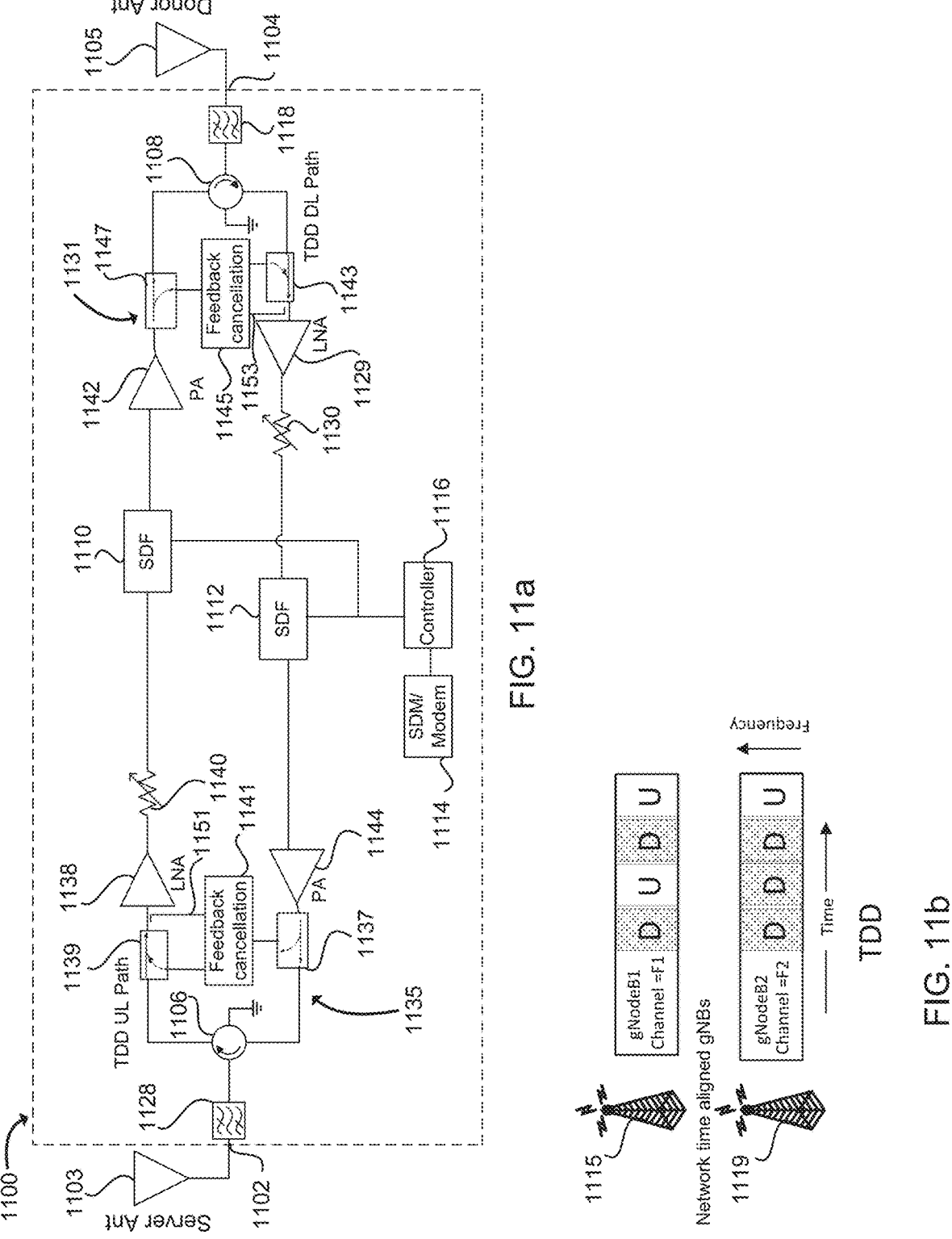
FIG. 11a illustrates a full duplex TDD repeater with circulators in accordance with an example.
FIG. 11b illustrates signals broadcast from network gNBs in accordance with an example.

FIG. 11*a* provides an example of a full duplex TDD repeater 1100. The full duplex TDD repeater 1100 is configured to both transmit and receive a TDD signal at the same time. Feedback that may occur between the TDD UL path and the TDD DL path can be substantially reduced using server side PA to LNA feedback cancellation interconnect 1135 and a donor side PA to LNA feedback cancellation interconnect 1131. The term interconnect is not intended to be limiting. The terms system or network could also be used to describe the PA to LNA feedback cancellation interconnect. The donor side and server side PA to LNA feedback cancellation interconnects 1131, 1135 can provide cancellation of undesired signals that is greater than the total loop gain in order to allow the signals in the TDD UL path and the signals in the TDD DL path to operate on the same frequencies, as occurs in the full duplex TDD repeater 1100.

The server side PA to LNA feedback cancellation interconnect 1135 is configured to minimize feedback from the TDD DL path that is in the TDD UL path. The server side PA to LNA feedback cancellation interconnect 1135 can comprise a first signal coupler 1137 that is configured to couple a selected portion of the signal in the TDD downlink path to a first feedback cancellation circuit 1141. The first feedback cancellation circuit 1141 can generate a server feedback cancellation signal that is approximately 180 degrees out of phase with the feedback signal from the TDD DL path that is in the TDD UL path and insert the server feedback cancellation signal into the TDD UL path via a second signal coupler 1139. A first feedback path 1151 can sample the output of the second signal coupler 1139 and send the sample signal back to the first feedback cancellation circuit 1141. The first feedback cancellation circuit 1141 can be configured to adjust the amplitude and/or phase of the server feedback cancellation signal based on the sample signal until the feedback from the TDD DL path is minimized in the TDD UL path.

The donor side PA to LNA feedback cancellation interconnect 1131 is configured to minimize feedback from the TDD UL path that is in the TDD DL path. The donor side PA to LNA feedback cancellation interconnect 1131 can comprise a third signal coupler 1147 that is configured to couple a selected portion of the signal in the TDD downlink path to a second feedback cancellation circuit 1145. The second feedback cancellation circuit 1145 can generate a donor feedback cancellation signal that is approximately 180 degrees out of phase with the feedback signal from the TDD UL path that is in the TDD DL path and insert the donor feedback cancellation signal into the TDD DL path via a fourth signal coupler 1143. A second feedback path 1153 can sample the output of the fourth signal coupler 1143 and send the sample signal back to the second feedback cancellation circuit 1145. The second feedback cancellation circuit 1145 can be configured to adjust the amplitude and/or phase of the donor feedback cancellation signal based on the sample signal until the feedback from the TDD UL path is minimized in the TDD DL path.

Figure 11C:
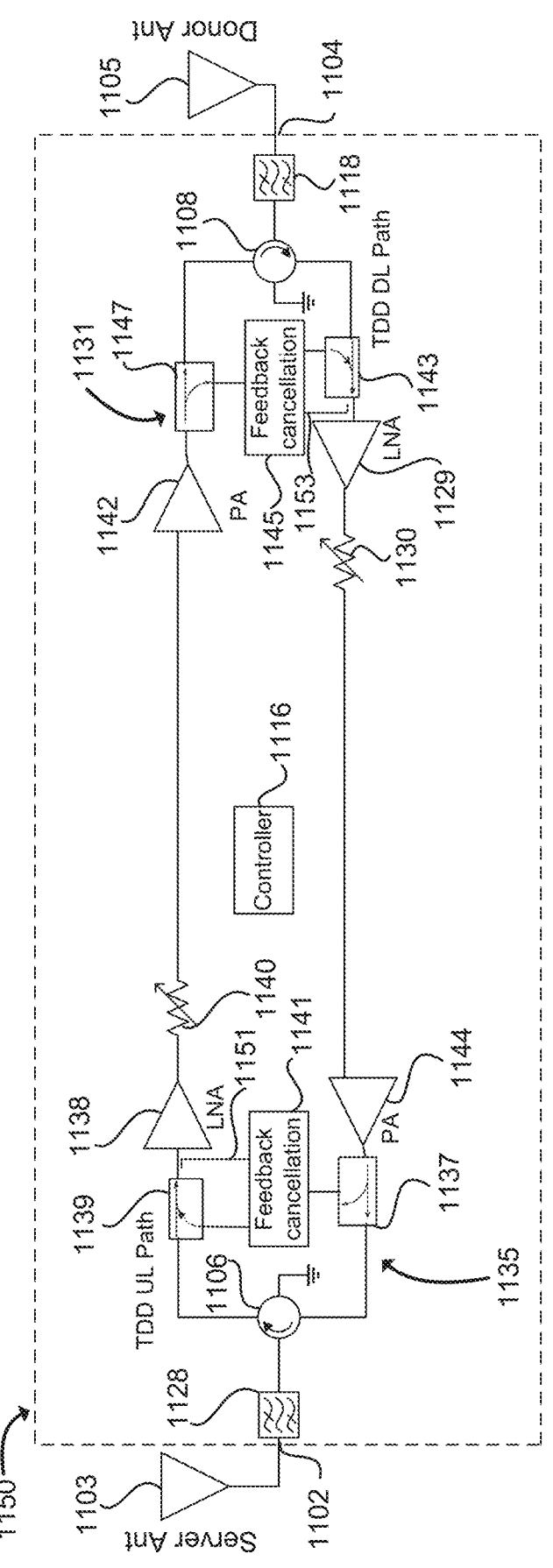
FIG. 11c illustrates a full duplex TDD repeater in accordance with another example.

The SDFs 1110 and 1112 in the full duplex TDD repeater 1100 are optional. FIG. 11*c* provides an example illustration of a full duplex TDD repeater 1150 without SDFs. Since the donor side and server side PA to LNA feedback cancellation interconnects 1131, 1135 are configured to substantially reduce the internal feedback loop between the TDD UL path and the TDD DL path, and feedback that may occur between the server antenna 1103 and donor antenna 1105 by an amount that is greater than the gain of the total loop gain of the repeater 1100, there may not be additional need for digital filtering using the SDF. The SDM/modem 1114 is also optional since the UL/DL configuration and timing may not be needed to control switching or SDF filtering, as shown in FIG. 11*c*.

However, an SDM/modem 1114 can be used in the full duplex TDD repeater 1100 to identify that a TDD signal communicated between an gNB and a UE is full duplex, as shown in FIG. 11*a*. The SDM/modem 1114 can also be used to detect the active TDD channels and control additional filtering that may be performed by the SDF on the active TDD channels. For example, the active TDD channels can be filtered as previously discussed. The SDM/modem 1114 can determine the UL/DL configuration and timing for the active TDD channels. The SDF 1110 can be configured to use a passband filter to pass UL signals during an UL time slot for the active TDD channels and filter (using a stop band filter) the DL signals in the TDD UL path during the DL time slot based on the UL/DL configuration and timing received from the SDM/modem 1114 via the controller 1116. Similarly, the SDF 1112 in the TDD DL path can be configured to pass DL signals during the DL time slot and filter, using a stop band filter, the UL signals in the TDD DL path during the UL time slot based on the UL/DL configuration and timing received from the SDM/modem 1114 via the controller 1116.

The circulators 1106 and 1108 typically provide about 20 dB of isolation as the signal passes through the circulator. The passband filters 1128 and 1118 can also provide some isolation, such as 0.5 dB to 3 dB for a typical passband filter. The variable attenuators 1140 and 1130 can be used to reduce the amplitude of the signals in the TDD UL path and TDD DL path. The filtering and isolation can be greater than the total loop gain provided by the gain in the TDD UL path provided by the LNA 1138, PA 1142, and possibly the SDF 1110, and the gain in the TDD DL path provided by the LNA 1129, PA 1144, and possibly the SDF 1112 in the TDD DL path. The total system gain can include the total loop gain plus the gain from the server antenna 1103 and the donor antenna 1105. In one embodiment, the donor side and server side PA to LNA feedback cancellation interconnects 1131, 1135 can provide a combined feedback cancellation in the full duplex TDD repeater 1100 that is greater than the system gain.

In one example, a TDD B1 signal can be received at the server port 1102 of the full duplex TDD repeater 1100 that is sent from a UE to the server antenna 1103. The TDD B1 signal can pass through the bandpass filter 1128 and be directed by the circulator 1128 to pass through the second coupler 1139 and be amplified by the LNA 1138, and attenuated by the variable attenuator 1140. The TDD B1 signal can be optionally filtered by the SDF 1110. Alternatively, the TDD B1 signal can pass through analog filters, such as a bandpass filter for the TDD B1 signal, and directed to the PA 1142 for amplification. The amplified signal can then pass through the third signal coupler 1147 and be directed by the circulator 1108 to pass through the bandpass filter 1118 and out the donor port 1104 of the repeater 1100. A donor antenna 1105 can be coupled to the donor port 1104 and used to transmit the TDD B1 signal to the gNB 1115, as shown in FIG. 11*b*.

In this example, the entire TDD signal, both UL and DL, are filtered, using a bandpass filter, and amplified by the TDD UL path. Alternatively, the SDF 1110 may be used to filter or block the TDD DL signal during TDD DL time slots using a band stop filter. In lieu of, or in addition to a band stop filter, an SDF, such as SDF 1110, can be turned off or deactivated to stop the passage of a signal during an UL or DL symbol. Thus, turning off or deactivation of the SDF can be used in place of or in addition to the use of a band stop filter throughout the present application. The SDF 1110 can filter the TDD UL signal during TDD UL time slots using a bandpass filter. The SDF 1110 can also be configured to filter the TDD UL signal using a step filter. For example, one signal (i.e. an UL symbol) could be passed without attenuation, another signal (i.e. an UL, DL, or S symbol) could be attenuated 5 dB, and another signal (i.e. a DL symbol) could be attenuated 50 dB.

The SDF 1110 can be coupled to the SDM/modem 1114 via the controller 1116. The SDM/modem can send UL/DL configuration information and timing information for the TDD B1 signal to the SDF 1110 to enable the SDF 1110 to switch between the TDD bandstop filter, the TDD bandpass filter, or the TDD stepped filter based on the UL/DL configuration information and the signal timing information.

The circulator 1108 can attenuate the TDD B1 signal from the TDD UL path by approximately 20 decibels (dB). However, a portion of the TDD B1 signal from the TDD UL path will leak into the TDD DL path. The donor side PA to LNA feedback cancellation interconnect 1131 can be used to substantially reduce the TDD B1 signal from the TDD UL path that leaks into the TDD DL path via the circulator or via other paths, such as server antenna 1103 to donor antenna 1105 interference. The process of substantially reducing TDD B1 signal from the TDD UL path that leaks into the TDD DL path was previously described.

In another example, the TDD B1 signal can be received at the donor port 1104 of the full duplex TDD repeater 1100 that is sent from a gNB, such as gNB 115 in FIG. 11*b*, to the donor antenna 1105. The TDD B1 signal can pass through the bandpass filter 1118 and be directed by the circulator 1108 to pass through the fourth coupler 1143 and be amplified by the LNA 1129, and attenuated by the variable attenuator 1130. The TDD B1 signal can be optionally filtered by the SDF 1112. Alternatively, the TDD B1 signal can pass through analog filters, such as a bandpass filter for the TDD B1 signal, and directed to the PA 1144 for amplification. The amplified signal can then pass through the first signal coupler 1137 and be directed by the circulator 1106 to pass through the bandpass filter 1102 and out the server port 1102 of the repeater 1100. A server antenna 1103 can be coupled to the server port 1102 and used to transmit the TDD B1 signal to the UE.

In this example, the entire TDD signal, both UL and DL, are filtered and amplified by the TDD DL path. Alternatively, the SDF 1112 may be used to filter or block the TDD UL signal during TDD UL time slots using a band stop filter or a stepped filter. The SDF 1112 can filter the TDD DL signal during TDD DL time slots using a bandpass filter. The SDF 1112 can be coupled to the SDM/modem 1114 via the controller 1116. The SDM/modem can send UL/DL configuration information and timing information for the TDD B1 signal to the SDF 1112 to enable the SDF 1112 to switch between the TDD bandstop filter, the TDD stepped filter, and the TDD bandpass filter based on the UL/DL configuration information and the signal timing information.

The circulator 1106 can attenuate the TDD B1 signal from the TDD DL path by approximately 20 decibels (dB). However, a portion of the TDD B1 signal from the TDD DL path will leak into the TDD UL path. The server side PA to LNA feedback cancellation interconnect 1135 can be used to substantially reduce the TDD B1 signal from the TDD DL path that leaks into the TDD UL path via the circulator 1106 or via other paths, such as server antenna 1103 to donor antenna 1105 interference. The process of substantially reducing the TDD B1 signal from the TDD DL path that leaks into the TDD UL path was previously described.

The feedback cancellation circuits 1141, 1145 can be configured using an ASIC, FGPA, or another desired processor. In one embodiment, a single ASIC or FPGA can be used for the feedback cancellation circuits 1141, 1145. Alternatively, separate ASICs or FGPAs can be used. In one embodiment, the same ASIC or FPGA used for the SDFs 1110, 1112 can be configured as the feedback cancellation circuits 1141 and 1145 as well. The same ASIC or FPGA can also be used to form the controller 1116 and/or SDM/Modem 1114 as is used for the SDFs 1110, 1112 and feedback cancellation circuits 1141 and 1145.

The full duplex TDD repeater 1100 is not limited to receiving a single TDD signal. The full duplex TDD repeater 1100 can be configured to receive multiple different signals in a single TDD band, such as channel F2 in B1 from gNode 1119 in FIG. 11*b*. In addition, the repeater 1100 can receive TDD signals in different bands, including the TDD bands listed in Table 1 and Table 2. The SDFs in the full duplex TDD repeater 1100 can be configured to filter signals in the sub-bands, channels, or TDD bands. An SDF having sufficient bandwidth to process multiple bands could be used. Alternatively, separate SDFs could be used for each separate band or channel based on the bandwidth each SDF can process (i.e. digitally filter).

Sync Detection Module

In one example, a single TDD SDM can be configured to determine: UL/DL configuration information for a first TDD signal in a first frequency range and UL/DL configuration information for a second TDD signal in a second frequency range. The first frequency range and second frequency range can be separate 3GPP operating bands that are configured for TDD communication. Alternatively, the first frequency range and second frequency range can be sub-bands within a single 3GPP TDD operating band. The single TDD sync detection module can be configured to: receive synchronization information for the first TDD signal and synchronization information for the second TDD signal. The single TDD sync detection module can be configured to: use the synchronization information for the first TDD signal and the UL/DL configuration information for the first TDD signal to switch between the first TDD UL signal and the first TDD DL signal; and use the synchronization information for the second TDD signal and the UL/DL configuration information for the second TDD signal to switch between the second TDD UL signal and the second TDD DL signal.

In one example, the TDD sync detection module can be a receiver configured to receive TDD signals from a BS, such as a gNB. The TDD sync detection module can be configure to synchronize the repeater, such as the repeaters illustrated in FIGS. 5*a*-11*a*, and send the UL/DL configuration information for the DL signal to the controller in the repeater.

In another example, the sync detection module can be a modem that is configured to receive the TDD signal including synchronization information for a first frequency range and uplink/downlink (UL/DL) configuration information for the first frequency range. The modem can be further configured to generate an UL/DL indication signal for the first frequency range of TDD signal from the synchronization information and the UL/DL configuration information. The modem can be further configured to send the UL/DL indication signal and synchronization timing to the controller in the repeater.

In another example, the modem can be configured to generate the UL/DL indication signal for a frequency range without using a subscriber identity module (SIM) or a SIM card. The modem may not register, connect, or attached to a particular network, which allows operation without a SIM. Operating a modem without a SIM card can enable the modem to receive the synchronization information and the UL/DL configuration information from multiple cellular carriers without having a contract with multiple cellular carriers or paying fees to each of the cellular carriers. Further, operating a modem without a SIM card can prevent security issues arising from unauthorized SIM card intrusions. Further, the hardware complexity of the modem can be reduced with a reduction in the number of components.

In another example, the repeater of FIGS. 5*a* to 11*a* can be in communication with a modem that includes a SIM card. The use of a SIM card can enable the modem to receive higher layer signaling that may be used to identify UL/DL configurations for dynamic changes in the UL/DL TDD configuration.

In one example, the modem can comprise one or more of a scanning receiver, an application specific integrated circuit (ASIC), a field-programmable gate array (FPGA), or the like. The control signal can be received by the modem from a UE or a node (e.g., a BS a small cell node, or a relay node).

In another example, the modem or scanning receiver can be configured to operate as a third generation partnership project (3GPP) layer-1 modem that can be configured to scan the one or more frequency bands and demodulate information in a downlink layer 1 signal without demodulating E-UTRA layer-2 or E-UTRA layer-3 signals that may require the use of a SIM card. The modem can further support E-UTRA layer-2 and E-UTRA layer-3 functionality. The layer-1 modem can scan the one or more frequency bands without receiving handshake information or communication back to the source of the transmission (e.g., base station). The terms modem and layer-1 modem are used interchangeably in this document.

In one example, the layer-1 modem can be configured to operate in an E-UTRA TDD repeater. The layer-1 modem can demodulate a downlink layer-1 signal from a node, such as a base station, and use the information to derive the cell's timing for synchronization purposes and the TDD UL/DL frame configuration to enable the TDD repeater to switch between UL subframes and DL subframes in a DL signal received from the base station, or in an UL signal transmitted from a UE. Layer 1 of the downlink LTE protocol stack, also known as the physical layer, contains all of the information needed to synchronize the repeater with the base station and determine the TDD UL/DL frame configuration.

The term "layer-1 modem" is a modem that can demodulate and decode physical channel signals present on layer 1 downlink signals from the base station to derive the TDD UL/DL frame configuration information and timing information. The modem can also modulate information. The scanning receiver can receive the same information as the layer-1 modem, but cannot modulate information. No additional higher-level (i.e. Layer 2 or above) communication from the base station or cellular system or exchange of signals (i.e. UL signals) with the base station is used to determine the TDD UL/DL configuration and timing information. The layer 1 physical channels can include the paging channel, the broadcast channel, the downlink shared channel, the multicast channel, the physical broadcast channel (PBCH), the physical downlink control channel (PDCCH), the physical downlink shared channel (PDSCH), and the physical multicast channel (PMCH).

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (i.e. cell's) TDD UL/DL frame configuration information is carried in the SIB1 message. The layer-1 modem can decode the SIB1 message to determine the TDD UL/DL frame configuration, and communicate this information to the TDD repeater.

The process of attaining timing and frequency synchronization and cell ID of a BS cell is accomplished in a cell search. During a cell search, the layer-1 modem can acquire basic information including cell ID, duplexing mode, timing, and frequency related to the BS and cell it is operating in.

The layer-1 modem can receive the primary synchronization signal (PSS) and the secondary synchronization signal (SSS) from the BS. The PSS and SSS can be used to obtain synchronization information to synchronize the layer-1 modem with the BS. As used herein, a valid sync is generated when the TDD repeater is synchronized to the timing received in the physical layer signal received from the BS that includes the PSS and SSS signals.

The layer-1 modem can receive the MIB in the PBCH. The MIB, PSS, and SSS all lie in the central 72 subcarriers (6 resource blocks RB) of the system bandwidth in the downlink signal and are broadcast as physical channels, allowing the layer-1 modem to initially demodulate just this central region.

Demodulating the PSS during the cell search provides the cell identity N(ID_2). The SSS can then be demodulated with the N(ID_2) to give the cell group identity N(ID_1). Given N(ID_1) and N(ID_2), the cell identity N(ID Cell) can be determined. The PSS is mapped to different orthogonal frequency division multiplexing (OFDM) symbols depending on which frame type is used. Frame type 1 is frequency division duplex (FDD), and frame type 2 is time division duplex (TDD). Observing the demodulated SSS scrambled sequences allows the layer-1 modem to estimate frame timing used for synchronization.

After the cell search and frequency/timing offset corrections are applied, the PBCH is decoded which drives BCH decoding and then MIB data generation. Note that both PBCH and BCH are both associated with Layer 1 signaling.

The MIB is used for SIB recovery and the following processes: the Physical Control Format Indicator Channel (PCFICH) demodulation, CFI decoding; the Downlink control information (DCI) is recovered to configure the PDSCH demodulator & decode the DL-SCH; the PDCCH decoding, the blind PDCCH search; and the SIB bits recovery from the PDSCH demodulation and DL-SCH decoding. Again, note that the physical channels referenced above that are used to recover the SIB are available on layer 1. Once the SIB is recovered (SIB CRC=0), the SIB1 message can be decoded to extract the cell's TDD configuration.

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (or cell's) TDD UL/DL frame configuration information is carried in the SIB1 message. The layer-1 modem can decode the SIB1 message to determine the TDD UL/DL frame configuration, and communicate this information to the TDD repeater. These processes will be described in more detail in the proceeding paragraphs.

Figure 12A:
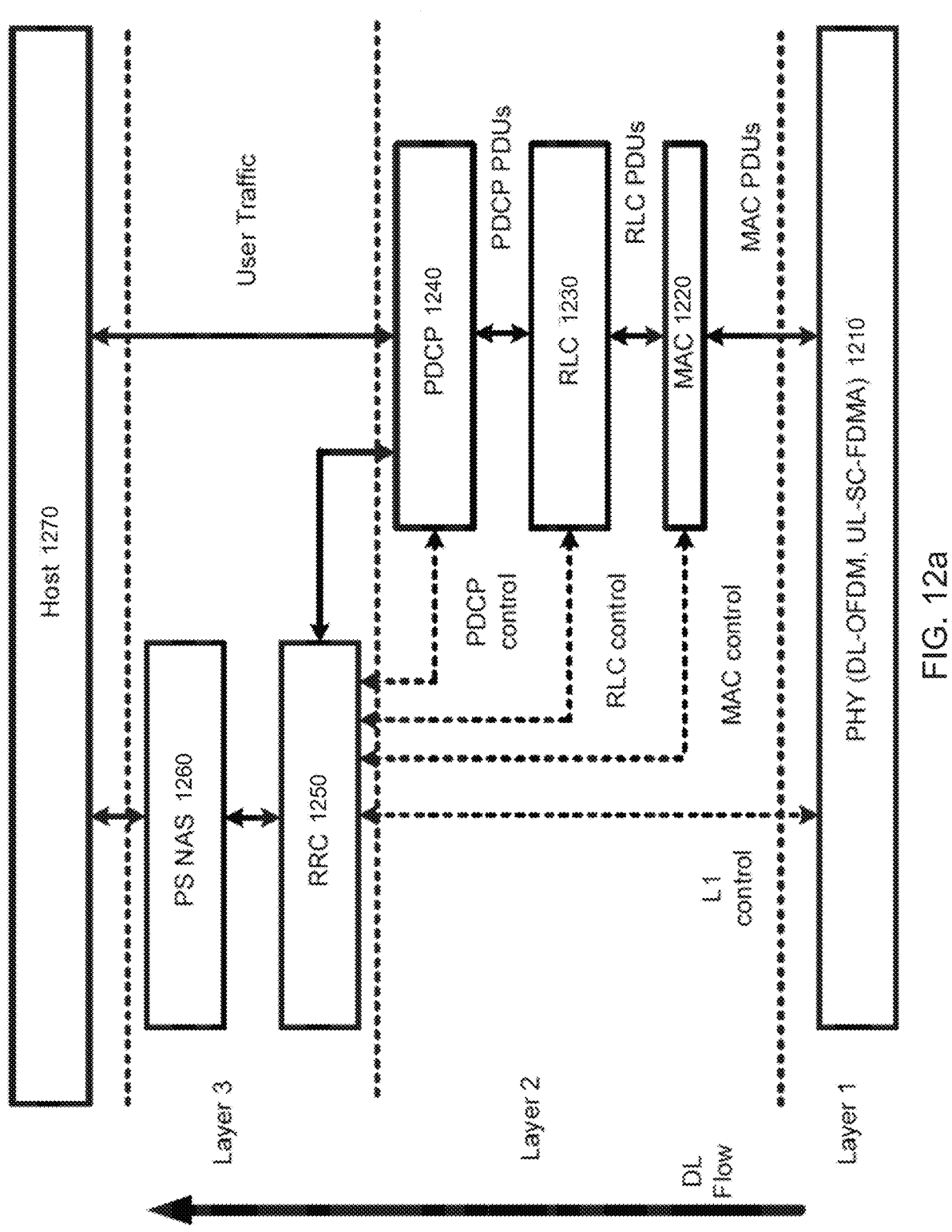
FIG. 12a illustrates an E-UTRA downlink radio protocol stack in accordance with an example.
Figure 12B:
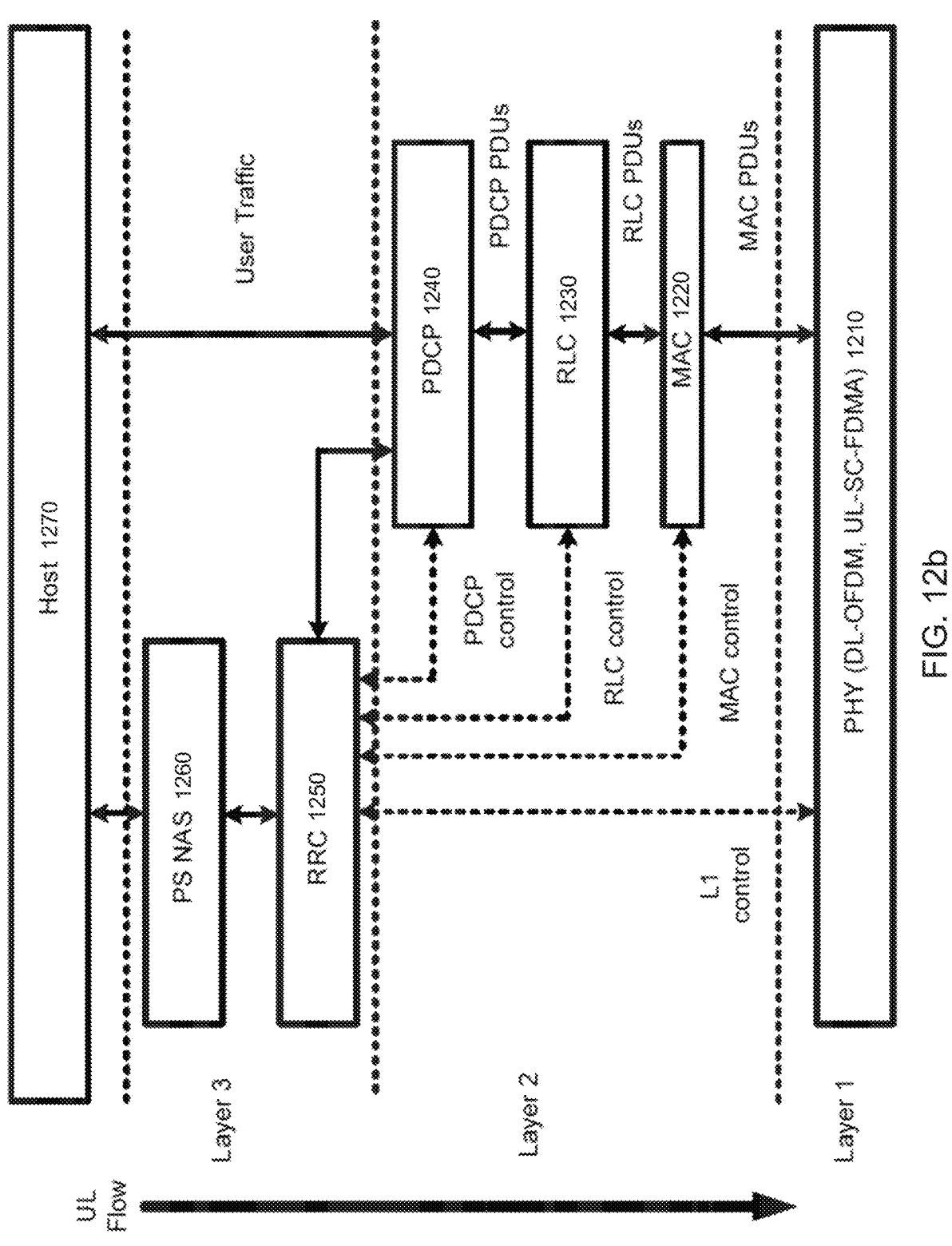
FIG. 12b illustrates an E-UTRA uplink radio protocol stack in accordance with an example.

In another example, as illustrated in FIGS. 12a and 12b, a downlink direction can progress from layer 1 to layer 3 and an uplink direction can progress from layer 3 to layer 1. In a DL direction, information can flow from the physical (PHY) layer 1210 to the medium-access control (MAC) layer 1220 to the radio link control (RLC) layer 1230, to the packet data convergence protocol (PDCP) layer 1240, and to the host 1270. Information can also flow from the physical layer 1210 to the radio resource control (RRC) layer 1250 to the non-access stratum (NAS) 1260, and to the host 1270. Control information can also flow from the PHY 1210, MAC 1220, RLC 1230, and PDCP 1240 to the RRC 1250. In an UL direction, information can flow in the opposite direction.

Layer 1 of the LTE stack can support: (i) DL and UL parameters (e.g. resource blocks, subcarriers per resource block, and subcarrier bandwidth), (ii) physical parameters (e.g., cyclic prefix (CP) length), (iii) 3GPP operation bands (e.g. FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the MAC layer, the RLC layer, and the PDCP layer. Layer 3 of the LTE stack can include the RRC layer and the NAS layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In one example, the modem (i.e. layer-1 modem) can be configured to receive the System Information Block 1 (SIB1) and/or Master Information Block (MIB) broadcast from the base station. The base station typically broadcasts the SIB and MIB information periodically. The layer-1 modem can also be configured to receive the Primary Synchronization Signal (PSS) and the Secondary Synchronization Signal (SSS).

The layer-1 modem can use the PSS to perform time synchronization of the TDD repeater with the base station that broadcast the PSS. The PSS can be used to enable the TDD repeater to perform radio frame, sub-frame, slot and symbol synchronization in the time domain, and enable the TDD repeater to determine a center of the channel bandwidth in the frequency domain. The PSS is broadcast by a 3GPP LTE base station twice in each radio frame. For TDD, the PSS is broadcast using the central 62 subcarriers belonging to the third symbol of time slot 2 (sub-frame 1) and the third symbol of time slot 12 (sub-frame 6) in each radio frame.

The layer-1 modem can receive the SSS, which can be used to perform frequency synchronization of the TDD repeater with the base station that broadcast the SSS. After the primary sync signal acquisition, the modem can be configured to detect the secondary synchronization signal. Secondary synchronization signals are one of 168 codes which are 62-bit sequences. The SSS is broadcast twice within every radio frame. The two transmissions of the SSS are different so the layer-1 modem can detect which is the first and which is the second. For TDD, the SSS is broadcast using the central 62 subcarriers belonging to the last symbol of time slot 1 (subframe 0) and the last symbol of time slot 11 (subframe 5) in each radio frame.

The SSS can be used by the layer-1 modem and TDD repeater to achieve radio frame synchronization and deduce a pointer towards 1 of 168 Physical layer Cell Identity (PCI) groups to determine the PCI of the transmitting base station. In one example, the PCI can be used to: determine a cell size for the base station based on the cell ID. The cell size can be used to determine a distance between the TDD repeater and the base station. In one embodiment, the timing of the TDD repeater can be synchronized with a timing of the base station when the Cell ID is within a valid Cell ID Group or Cell ID Sector.

In one example, the TDD repeater can be configured to receive and transmit broadband channels, such as 3GPP LTE TDD Channel 41. The Channel 41 has a band from 2496 MHz to 2690 MHz, with a bandwidth of 194 MHz. The band is further divided into channels. Certain channels are designated for TDD cellular communication. Other channels are designated for use in non-cellular communications, such as Multichannel Multipoint Distribution Service (MMDS) for the wireless communication of cable television. In one example embodiment, the TDD repeater can be configured to determine selected channels that are received at the TDD repeater to amplify. For instance, the TDD repeater may only amplify channels designated for cellular communications based on the cellular communications repeater standards. A TDD UL/DL configuration for each selected channel can be determined based on information received from the layer-1 modem. The TDD repeater can then perform amplification and/or filtering on the selected channels. In one embodiment, amplification and filtering may only be performed on channels having a same TDD UL/DL configuration and/or the selected channels that are synchronized.

In one example, the layer-1 modem can be configured to receive timing information (i.e. the PSS and SSS) and communicate the timing information to the TDD repeater to determine a valid synchronization of the TDD repeater relative to a base station transmitting downlink signals to the TDD repeater. The TDD repeater can use the timing information to switch from UL transmission at the TDD repeater to DL transmission at the TDD repeater. In one example, the switch from DL to UL transmission can occur at a beginning of a user equipment (UE) timing advance period or during the UE timing advance period.

In one example, there are two types of synchronization to be concerned with at the TDD repeater: cell signal synchronization and booster UL/DL switch timing synchronization. Cell signal synchronization is achieved and validated when the PSS and SSS signals from the eNodeB are detected and time-frequency correlated by layer-1 modem in the repeater.

Once the eNodeB cell signal is synchronized to the layer-1 modem, the access mode can be validated (FDD or TDD) at the repeater. If TDD is validated, the UL/DL subframe configuration can be established. From that UL/DL subframe configuration, the special subframe timing is established. The special subframe timing can be used as the source of the repeater's UL/DL switch timing synchronization.

In one example, the TDD repeater can be configured to determine selected channels that are received at the TDD repeater to amplify. For example, the repeater may be configured to receive and amplify selected TDD channels in the 3GPP LTE or NR list of channels. For each selected channel, the TDD repeater can determine a TDD UL/DL configuration, using the layer-1 modem. The TDD repeater can then perform amplification on the selected channels that have a same TDD UL/DL configuration, or perform amplification on the selected channels that are synchronized.

In one example, a weak downlink signal can be received on channels with a low threshold received signal strength indicator (RSSI). The TDD repeater can be configured so that it does not synchronize with the weak downlink signals because transmitting these signals from the TDD repeater would not interfere with the cellular network. Accordingly, the TDD repeater can be operated on the selected channels that have a DL RSSI less than a threshold.

In another example, the TDD can be further configured to measure a DL received signal strength indicator (RSSI) for each of the selected channels. The TDD repeater may only synchronize with selected channels that have a DL RSSI less than a selected threshold. For example, an RSSI with a threshold that is less than −60 dBm.

In another example, TDD repeater can be further configured to periodically receive, via the layer-1 modem, the PSS and the SSS for each of the selected channels. The TDD repeater can be configured to verify that it is synchronized in time with the selected channels based on the periodically received PSS and SSS, as previously discussed. For example, the TDD repeater can be configured to synchronize with information in the PSS ever time the PSS is received. Alternatively, the TDD repeater may be synchronized over a longer period, such as ever second, or every few seconds. In one example, when a consistent synchronization occurs over a set number of cycles, the periodic check can be extended over a longer period, such as once per minute.

In 5G new radio (NR), the MIB and SIB1 are known as Minimum System Information. The SIB1 alone can be referred as Remaining Minimum System Information or RMSI.

In one example, the layer-1 modem can be configured to receive a master information block (MIB). The MIB is typically broadcast on a physical broadcast channel (PBCH) by the base station in a 4G or 5G architecture. The MIB includes the necessary parameters used by the layer-1 modem to decode the System Information Block Type 1 (SIB1). The MIB is broadcast with a periodicity of about 80 ms (i.e. every 8 frames). Within the periodicity, repetitive transmission of a same MIB can occur. In 5G, the MIB is typically transmitted on OFDM symbols 1, 2 and 3. The MIB is broadcast using subcarrier numbers 0 to 239 on symbols 1 & 3, and subcarrier numbers 0 to 47 and 192 to 239 on subcarrier 2.

In 5G, the MIB typically includes the system frame number, the subcarrier spacing for the SIB1, the subcarrier signal block (SSB) subcarrier offset that indicates the frequency domain offset between the SSB and the overall resource block grid in the number of subcarriers.

An SSB-subcarrier Offset field can indicate a frequency domain offset between the SSB and the overall resource block grid in number of subcarriers. This field may indicate that this cell does not provide SIB1 and that there is hence no common CORESET. In this case, the field pdcch-ConfigSIB1 may indicate the frequency positions where the UE may (not) find a SS/PBCH with a control resource set and search space for SIB1.

The MIB can also include Cell Bar information that indicates whether the cell allows a UE associated with a signal received by the TDD repeater, to camp on the cell. An intra-frequency reselection is provided to identify if intra-frequency cell reselection is allowed or not allowed.

The MIB can also include a Control Resource Set (CORESET) that includes a common search space and selected physical downlink control channel (PDCCH) parameters. If the SSB-subcarrier offset field indicates that the SIB 1 is not present, then a field PDCCH-ConfigSIB1 can indicate the frequency positions where the layer-1 modem can find the subcarrier signal/physical broadcast channel block with SIB1.

The SIB1 block is cell-specific information that is only valid for a selected serving cell. The SIB1 is received at the layer-1 modem on a physical downlink shared channel (PDSCH) that can be located based on the information received in the MIB.

The SIB1 block includes a number of fields. The fields include, but are not limited to, cell selection information, cell access related information, Internet Protocol (IP) Multimedia Subsystem (IMS) emergency support information, eCall over IMS support information, timers and constraints for a selected user equipment, cell barring information to identify when a specific UE is barred from communicating with the cell, and Cell ID information to identify a cell within a public land mobile network (PLMN).

Figure 12C:
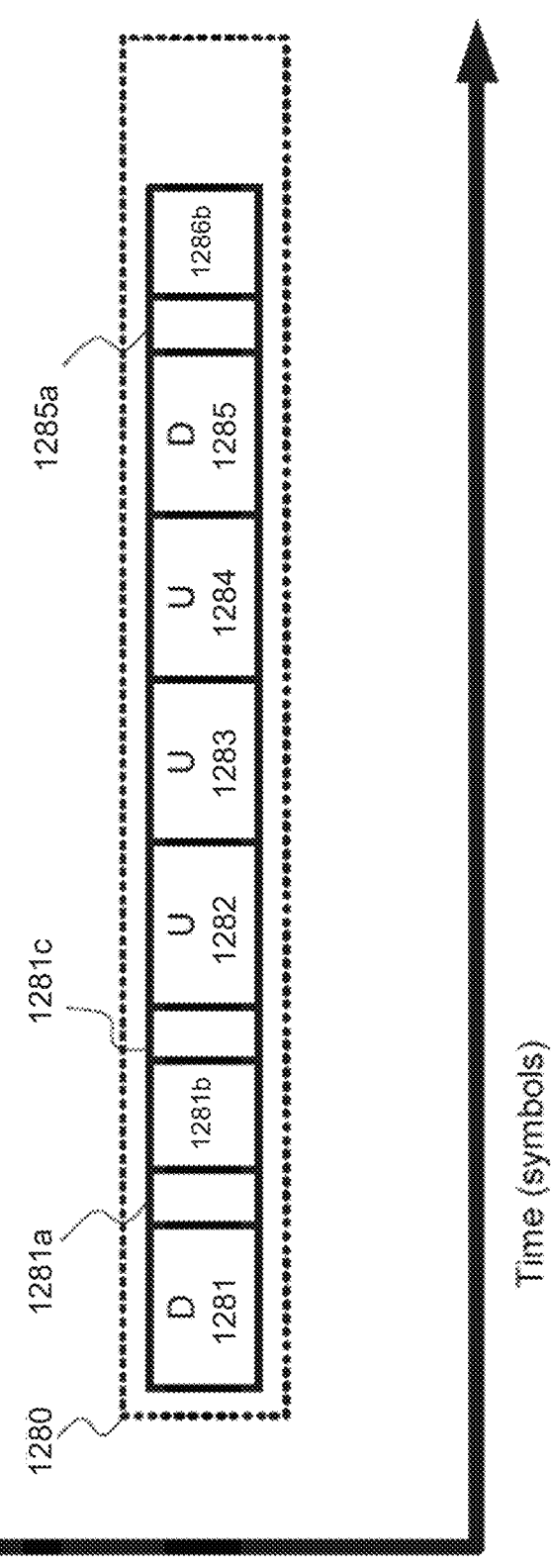
FIG. 12c illustrates an E-UTRA UL/DL TDD frame structure in accordance with an example.

The layer-1 modem can be configured to receive the TDD configuration for a selected signal. The TDD configuration and timing information can be used to determine a timing for the TDD repeater to switch from UL to DL. FIG. 12*c* illustrates an example TDD configuration 1280 for an LTE TDD frame structure 0. The frame structure includes time periods (sub-frames) for: downlink (D) 1282, special (S) 1281 comprised of 1281*a* (Downlink Pilot Training Symbol (DwPTS)), 1281*b* (Guard Period (GP)), and 1281*c* (Uplink Pilot Training Symbol (DwPTS), uplink (U) 1282, U 1283, U 1284, D 1285, 1286*a*, and 1286*b*.

In one example, the TDD repeater including the layer-1 modem, can be configured to receive, and communicate to the TDD repeater, a TDD UL/DL configuration or timing information to determine, at the TDD repeater, the timing of one or more of a guard period, a downlink period, an uplink period, a downlink pilot training symbol period, or an uplink pilot training symbol period for a TDD signal received at the TDD repeater.

In one example, the TDD repeater is configured to enable the DL transmission from the TDD repeater during the guard period, the downlink period, the downlink pilot training symbol period, and a user equipment (UE) timing advance period.

Figure 13:
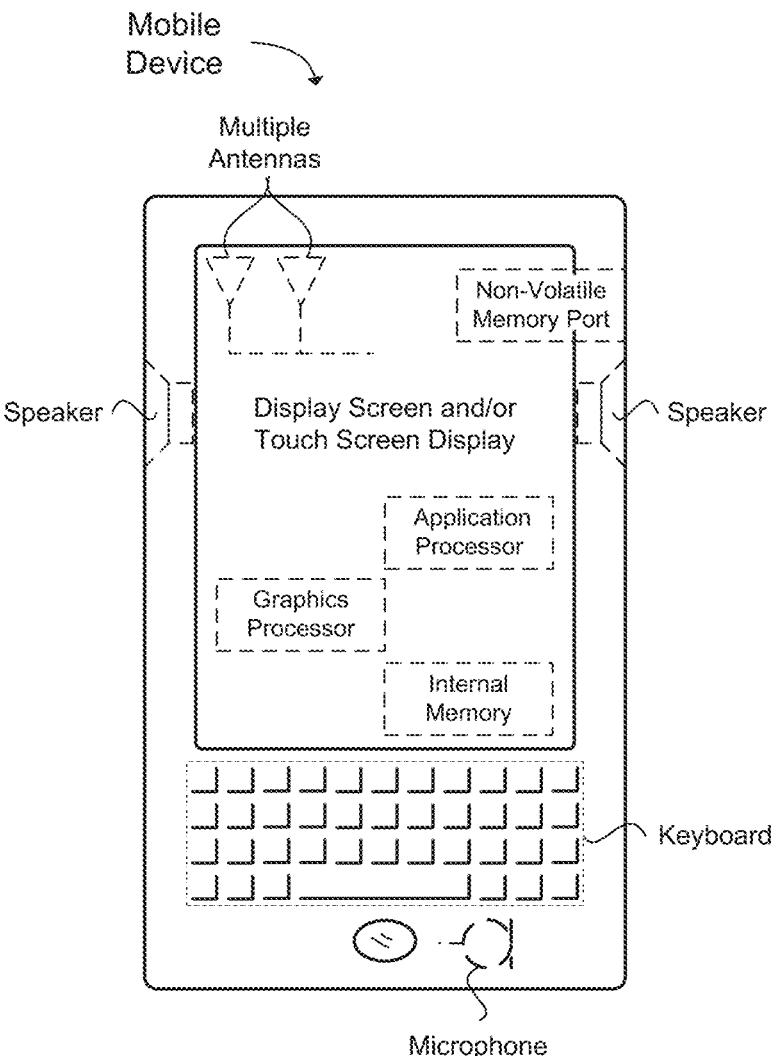
FIG. 13 illustrates a user equipment (UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a new radio node B (gNB) a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, 3GPP 5G, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a time division duplex (TDD) repeater comprising: a first port; a first circulator having a first circulator port communicatively coupled to the first port; a second port; a second circulator having a first circulator port communicatively coupled to the second port; a first amplification and filtering path coupled between a second circulator port of the first circulator and a fourth circulator port of the second circulator; a first software defined filter (SDF) in the first amplification and filtering path, the first SDF configured to filter at least a first TDD uplink (UL) signal of a first TDD frequency range within a TDD band and output the first TDD UL signal with a predetermined gain; a second amplification and filtering path coupled between a second circulator port of the second circulator and a fourth circulator port of the first circulator; and a second SDF in the second amplification and filtering path, the second SDF configured to filter at least a first TDD downlink (DL) signal in the first TDD frequency range, wherein the first circulator, the second circulator, the first SDF, and the second SDF allow simultaneous transmission of the first TDD UL signal and the first TDD DL signal.

Example 2 includes the TDD repeater of Example 1, wherein the first SDF is configured to filter a second TDD UL signal of a second TDD frequency range within the TDD band and output the second TDD UL signal with a predetermined gain.

Example 3 includes the TDD repeater of Example 2, wherein the second SDF is configured to filter a second TDD DL signal of the second TDD frequency range within the TDD band and output the second TDD DL signal with a predetermined gain.

Example 4 includes the TDD repeater of Example 2, wherein the first circulator and the second circulator allow simultaneous transmission of the first TDD UL signal, the first TDD DL signal, the second TDD UL signal, and the second TDD DL signal.

Example 5 includes the TDD repeater of Example 1, wherein the first SDF and the second SDF are implemented in a single processor or multiple processors.

Example 6 includes the TDD repeater of Example 1, wherein the first SDF, the second SDF, the first circulator, and the second circulator provide sufficient crossover isolation to enable a loop crossover isolation of the TDD repeater to be greater than a total loop gain of the repeater.

Example 7 includes the TDD repeater of Example 6, wherein the first SDF and the second SDF each provide greater than or equal to 50 decibels (dB) of crossover isolation.

Example 8 includes the TDD repeater of Example 6, wherein the first SDF and the second SDF each provide greater than or equal to 30 decibels (dB) of crossover isolation.

Example 9 includes the TDD repeater of Example 1, wherein the first SDF and the second SDF each comprise a complex down mixer and a complex up mixer to provide a separate in-phase and quadrature phase filter.

Example 10 includes the TDD repeater of Example 5, wherein the first SDF and the second SDF are implemented in one or more field programmable gate arrays or one or more application specific integrated circuits.

Example 11 includes the TDD repeater of Example 1, further comprising a TDD sync detection module (SDM) or a modem that is communicatively coupled to the first SDF and the second SDF, the TDD SDM or a modem configured to determine: first UL/DL configuration information and timing information for the first TDD UL signal and the first TDD DL signal.

Example 12 includes the TDD repeater of Example 1, wherein the modem is configured to use a subscriber identity module (SIM) card to enable the modem to determine dynamic changes in the first UL/DL configuration information and timing information.

Example 13 includes the TDD repeater of Example 11, further comprising a controller that is coupled to the TDD SDM or the modem and configured to receive the first UL/DL configuration information and timing information for the first TDD UL and the first TDD DL signal from the TDD SDM or from the modem and send the first UL/DL configuration information and the timing information to the first SDF and the second SDF.

Example 14 includes the TDD repeater of Example 13, wherein the first SDF is configured to filter time slots in the first TDD uplink (UL) signal based on the first UL/DL configuration information and the timing information.

Example 15 includes the TDD repeater of Example 14, wherein the SDF is configured to filter each time slot using one or more of a bandpass filter, a band stop filter, or a stepped filter.

Example 16 includes the TDD repeater of Example 14, wherein the SDF is configured to be deactivated or turned off to block a transmission of a selected UL symbol or a DL symbol based on the UL/DL configuration information and the timing information from the SDM or the modem.

Example 17 includes the TDD repeater of Example 15, wherein the SDF is configured to switch between the bandpass filter or the band stop filter or the stepped filter in a time period that is less than $25,600*Tc$ for a frequency range 1 (FR1) of a third generation partnership program (3GPP) fifth generation (5G) New Radio (NR) specification or $13,792*Tc$ for a frequency range 2 (FR2) of the 3GPP 5G NR specification, wherein where is a subcarrier spacing (SCS) of the first TDD UL signal and is a Fast Fourier Transform (FFT) size.

Example 18 includes the TDD repeater of Example 13, wherein the controller is further configured to receive second UL/DL configuration information and timing information for a second TDD UL signal and a second TDD DL signal from the TDD SDM or from the modem and send the second UL/DL configuration information and the timing information for the second TDD UL signal and the second TDD DL signal to the first SDF and the second SDF.

Example 19 includes the TDD repeater of Example 18, wherein the second TDD UL signal and the second TDD DL signal are in the TDD band of the first TDD UL signal and the first TDD DL signal.

Example 20 includes the TDD repeater of Example 18, wherein the second SDF is configured to filter time slots in the second TDD UL signal based on the second UL/DL configuration information and the timing information for the second TDD UL signal and the second TDD DL signal.

Example 21 includes the TDD repeater of Example 20, wherein the second SDF is configured to filter each time slot using one or more of a bandpass filter or a band stop filter or a stepped filter.

Example 22 includes the TDD repeater of Example 20, wherein the second SDF is configured to be deactivated or turned off to block a transmission of a selected UL symbol or a DL symbol based on the UL/DL configuration information and the timing information from the SDM or the modem.

Example 23 includes the TDD repeater of Example 21, wherein the second SDF is configured to switch between the bandpass filter or the band stop filter or the stepped filter in a time period that is less than $25,600*Tc$ for a frequency range 1 (FR1) of a third generation partnership program (3GPP) fifth generation (5G) New Radio (NR) specification or $13,792*Tc$ for a frequency range 2 (FR2) of the 3GPP 5G NR specification, wherein where is a subcarrier spacing (SCS) of the first TDD UL signal and is a Fast Fourier Transform (FFT) size.

Example 24 includes the TDD repeater of Example 1, further comprising a first bandpass filter to pass at least a frequency range of the first TDD UL signal, the first bandpass filter coupled between the first port and the first circulator port of the first circulator.

Example 25 includes the TDD repeater of Example 1, further comprising a first low noise amplifier (LNA) in the first amplification and filtering path, the first LNA coupled between the second circulator port of the first circulator and an input of the first SDF.

Example 26 includes the TDD repeater of Example 26, further comprising a first variable attenuator coupled between an output of the first LNA and the input of the first SDF.

Example 27 includes the TDD repeater of Example 1, further comprising a first power amplifier (PA) in the first amplification and filtering path, the first PA coupled between an output of the first SDF and a fourth circulator port of the second circulator.

Example 28 includes the TDD repeater of Example 1, further comprising a second bandpass filter to pass at least a frequency range of the first TDD DL signal, the second bandpass filter coupled between the second port and the first circulator port of the second circulator.

Example 29 includes the TDD repeater of Example 1, further comprising a second LNA in the second amplification and filtering path, the second LNA coupled between the second circulator port of the second circulator and an input of the second SDF.

Example 30 includes the TDD repeater of Example 29, further comprising a second variable attenuator coupled between an output of the second LNA and the input of the second SDF.

Example 31 includes the TDD repeater of Example 1, further comprising a second PA in the second amplification and filtering path, the second PA coupled between an output of the second SDF and a fourth circulator port of the first circulator.

Example 32 includes a full duplex time division duplex (TDD) repeater comprising: a first port; a first circulator having a first circulator port coupled to the first port; a second port; a second circulator having a first circulator port coupled to the second port; a first amplification and filtering path coupled between a second circulator port of the first circulator and a fourth circulator port of the second circulator; a first low noise amplifier (LNA) in the first amplification and filtering path, the first LNA coupled between the second circulator port of the first circulator and a fourth circulator port of the second circulator; a first power amplifier (PA) in the first amplification and filtering path, the first PA coupled between an output of the first LNA and the fourth circulator port of the second circulator; a second amplification and filtering path coupled between a second circulator port of the second circulator and a fourth circulator port of the first circulator; a second LNA in the second amplification and filtering path, the second LNA coupled between a second circulator port of the second circulator and a fourth circulator port of the first circulator; a second PA in the second amplification and filtering path, the second PA coupled between an output of the second LNA and a fourth circulator port of the first circulator; a first feedback cancellation interconnect coupled between an output of the second PA and an input of the first LNA; and a second feedback cancellation interconnect coupled between an output of the first PA and an input of the second LNA.

Example 33 includes the full duplex TDD repeater of Example 32, wherein the first feedback cancellation interconnect is configured to substantially attenuate a feedback signal from the second amplification and filtering path that is in the first amplification and filtering path.

Example 34 includes the full duplex TDD repeater of Example 32, wherein the second feedback cancellation interconnect is configured to substantially attenuate a second feedback signal from the first amplification and filtering path that is in the second amplification and filtering path.

Example 35 includes the full duplex TDD repeater of Example 32, wherein the first feedback cancellation interconnect comprises: a first feedback cancellation circuit; a first signal coupler configured to couple a selected portion of a signal from the second amplification and filtering path to the first feedback cancellation circuit to form a feedback cancellation signal; and a second signal coupler configured to couple the feedback cancellation circuit to the first amplification and filtering path; wherein the first feedback cancellation circuit is configured to insert the feedback cancellation signal into the first amplification and filtering path with an amplitude and a phase that causes the feedback cancellation signal to destructively interfere with a feedback signal in the first amplification and filtering path.

Example 36 includes the full duplex TDD repeater of Example 35, further comprising a feedback path to sample an output of the second signal coupler and send the sample to the first feedback cancellation circuit to enable the first feedback cancellation circuit to adjust the amplitude and the phase based on the sample of the signal to maximize the destructive interference of the feedback cancellation signal with the feedback signal in the first amplification and filtering path.

Example 37 includes the full duplex TDD repeater of Example 32, wherein the second feedback cancellation interconnect comprises: a second feedback cancellation circuit; a third signal coupler configured to couple a selected portion of a signal from the first amplification and filtering path to the second feedback cancellation circuit to form a second feedback cancellation signal; a fourth signal coupler configured to couple the feedback cancellation circuit to the second amplification and filtering path; wherein the second feedback cancellation circuit is configured to insert the second feedback cancellation signal into the second amplification and filtering path with an amplitude and a phase that causes the second feedback cancellation signal to destructively interfere with a second feedback signal in the second amplification and filtering path.

Example 38 includes the full duplex TDD repeater of Example 35, further comprising a second feedback path to sample an output of the fourth signal coupler and send the sample to the second feedback cancellation circuit to enable the second feedback cancellation circuit to adjust the amplitude and the phase of the second feedback cancellation signal to maximize the destructive interference of the second feedback cancellation signal with the second feedback signal in the second amplification and filtering path.

Example 39 includes the full duplex TDD repeater of Example 32, further comprising a first software defined filter (SDF) or a first radio frequency (RF) bandpass filter in the first amplification and filtering path, the first SDF or the first RF bandpass filter configured to amplify and filter at least a first TDD uplink (UL) signal of a TDD frequency range.

Example 40 includes the full duplex TDD repeater of Example 39, further comprising a second SDF or a second RF bandpass filter in the second amplification and filtering path, the second SDF configured to amplify and filter at least a first TDD downlink (DL) signal of the TDD frequency range.

Example 41 includes the TDD repeater of Example 40, further comprising a TDD sync detection module (SDM) communicatively coupled to the first SDF and the second SDF, the TDD SDM configured to determine: first UL/DL configuration information and timing information for the first TDD UL signal and the first TDD DL signal.

Example 42 includes the TDD repeater of Example 41, further comprising a controller configured to receive the first UL/DL configuration information and timing information for the first TDD UL signal and the first TDD DL signal and send the first UL/DL configuration information and timing information to a first SDF and a second SDF.

Example 43 includes the TDD repeater of Example 40, further comprising a first bandpass filter to pass the TDD frequency range, the first bandpass filter coupled between the first port and the first circulator port of the first circulator.

Example 44 includes the TDD repeater of Example 39, further comprising a first variable attenuator coupled between an output of the first LNA and an input of the first SDF.

Example 45 includes the TDD repeater of Example 40, further comprising a second bandpass filter to pass the TDD frequency range, the second bandpass filter coupled between the second port and the first circulator port of the second circulator.

Example 46 includes the TDD repeater of Example 40, further comprising a second variable attenuator coupled between an output of the second LNA and the input of the second SDF.

Example 47 includes a time division duplex (TDD) repeater comprising: a first port; a first circulator having a first circulator port communicatively coupled to the first port; a second port; a second circulator having a first circulator port communicatively coupled to the second port; a first amplification and filtering path coupled between the first and second circulators; a first software defined filter (SDF) in the first amplification and filtering path, the first SDF configured to filter at least a first TDD uplink (UL) signal of a first TDD frequency range within a TDD band and output the first TDD UL signal with a predetermined gain; a second amplification and filtering path coupled between the first and second circulator; and a second SDF in the second amplification and filtering path, the second SDF configured to filter at least a first TDD downlink (DL) signal in the first TDD frequency range.

Example 48 includes a full duplex time division duplex (TDD) repeater comprising: a first port; a first circulator coupled to the first port; a second port; a second circulator coupled to the second port; a first amplification and filtering path coupled between the first circulator and the second circulator; a first low noise amplifier (LNA) in the first amplification and filtering path, the first LNA coupled between the first circulator and second circulator; a first power amplifier (PA) in the first amplification and filtering path, the first PA coupled between an output of the first LNA and the second circulator; a second amplification and filtering path coupled between the second circulator and the first circulator; a second LNA in the second amplification and filtering path, the second LNA coupled between the second circulator and the first circulator; a second PA in the second amplification and filtering path, the second PA coupled between an output of the second LNA and the first circulator; a first feedback cancellation interconnect coupled between an output of the second PA and an input of the first LNA; and a second feedback cancellation interconnect coupled between an output of the first PA and an input of the second LNA.

Example 49 includes a dual path time division duplex (TDD) repeater comprising: a first amplification and filtering path comprising: a first server antenna port; a first signal directing component configured to couple to the first server antenna port to a second switch or a third switch; a first software defined filter (SDF) in the first amplification and filtering path, the first SDF configured to filter: at least a first TDD uplink (UL) signal of a first TDD frequency range within a first TDD band and output the first TDD UL signal with a predetermined gain; or at least a first TDD downlink (DL) signal of the first TDD frequency range within the first TDD band and output the first TDD DL signal with a predetermined gain; the second switch configured to couple an input of the first SDF to the first signal directing component or a fourth switch; a first donor antenna port; the fourth switch configured to couple the first donor antenna port to a third switch or the second switch; the third switch configured to: couple an output of the first SDF to the first signal directing component to direct the first TDD UL signal output from the first SDF to the first server antenna port for transmission at a first server antenna; and couple an output of the first SDF to the fourth switch to direct the first TDD DL signal output from the first SDF to the first donor antenna port for transmission at a donor server antenna; and a second amplification and filtering path comprising: a second server antenna port; an eighth signal directing component configured to couple to the second server antenna port to a sixth switch or a seventh switch; a second software defined filter (SDF) in the second amplification and filtering path, the second SDF configured to filter: at least a second TDD uplink (UL) signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain; the sixth switch configured to couple an input of the second SDF to the eighth signal directing component or a fifth switch; a second donor antenna port; the fifth switch configured to couple the second donor antenna port to a seventh switch or the sixth switch; the seventh switch configured to: couple an output of the second SDF to the eighth signal directing component to direct the second TDD UL signal output from the second SDF to the second server antenna port for transmission at a second server antenna; and couple an output of the second SDF to the fifth switch to direct the second TDD DL signal output from the second SDF to the second donor antenna port for transmission at a second server antenna; and a controller configured to be coupled to provide a timing signal and an UL/DL configuration for one or more of the first TDD UL signal, the first TDD DL signal, the second TDD UL signal, and the second TDD DL signal.

Example 50 includes the dual path TDD repeater of Example 49, further comprising at least one TDD sync detection module (SDM) configured to receive the timing signal and the UL/DL configuration and send it to the controller for the one or more of the first TDD UL signal and the first TDD DL signal or the second TDD UL signal and the second TDD DL signal.

Example 51 includes the dual path TDD repeater of Example 50, wherein the SDM is coupled to one or more of the first amplification and filtering path or the second amplification and filtering path.

Example 52 includes the dual path TDD repeater of Example 49, further comprising at least one modem configured to receive the timing signal and the UL/DL configuration and send it to the controller for the one or more of the first TDD UL signal and the first TDD DL signal or the second TDD UL signal and the second TDD DL signal.

Example 53 includes the dual path TDD repeater of Example 49, wherein the first TDD band and the second TDD band are within a single third generation partnership project (3GPP) TDD band.

Example 54 includes the dual path TDD repeater of Example 49, wherein the first TDD band and the second TDD band are within separate third generation partnership project (3GPP) TDD bands.

Example 55 includes the dual path TDD repeater of Example 49, wherein: the at least the first TDD UL signal of the first TDD frequency range is comprised of two or more sub-band UL signals within a single third generation partnership project (3GPP) TDD band; and the at least the first TDD DL signal of the first TDD frequency range is comprised of two or more DL sub-band signals within the single third generation partnership project (3GPP) TDD band; or the at least the second TDD UL signal of the second TDD frequency range is comprised of two or more sub-band signals within a single third generation partnership project (3GPP) TDD band; and the at least the second TDD DL signal of the second TDD frequency range is comprised of two or more sub-band signals within the single third generation partnership project (3GPP) TDD band.

Example 56 includes the dual path TDD repeater of Example 55, wherein: the two or more sub-band UL signals of the first TDD frequency range are different from the two or more sub-band UL signals of the second TDD frequency range.

Example 57 includes the dual path TDD repeater of Example 49, further comprising: a first bandpass filter and a first low noise amplifier located: between the first server antenna port and the input of the first SDF; or between the first donor antenna port and the input of the first SDF, depending on a position of S2; and a second bandpass filter and a second low noise amplifier located: between the second server antenna port and the input of the second SDF; or between the second donor antenna port and the input of the second SDF depending on the position of switch S6.

Example 58 includes the dual path TDD repeater of Example 49, further comprising: a first power amplifier and a third bandpass filter located: between the output of the first SDF and the first server antenna port; or between the output of the first SDF and the first donor antenna port; a second power amplifier and a fourth bandpass filter located: between the output of the second SDF and the second server antenna port; or between the output of the second SDF and the second donor antenna port.

Example 59 includes the dual path TDD repeater of Example 49, wherein the first signal directing component is one of a switch or a circulator and the eighth signal directing component is one of a switch or a circulator.

Example 60 includes a dual path time division duplex (TDD) repeater comprising: a first server antenna port; a first donor antenna port; a first TDD amplification and filtering path coupled between the first server antenna port and the first donor antenna port or between the first donor antenna port and the first server antenna port, the first TDD amplification and filtering path comprising: a first software defined filter (SDF) configured to filter: at least a first TDD uplink (UL) signal of a first TDD frequency range within a first TDD band and output the first TDD UL signal with a predetermined gain; or at least a first TDD downlink (DL) signal of the first TDD frequency range within the first TDD band and output the first TDD DL signal with a predetermined gain; a second server antenna port; a second donor antenna port; a second TDD amplification and filtering path coupled between the second server antenna port and the second donor antenna port or between the second donor antenna port and the second server antenna port, the second TDD amplification and filtering path comprising: a second SDF configured to filter: at least a second TDD uplink (UL)

signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain; and a controller configured to be coupled to provide a timing signal and an UL/DL configuration for one or more of the first TDD UL signal, the first TDD DL signal, the second TDD UL signal, and the second TDD DL signal.

Example 61 includes the dual path TDD repeater of Example 60, wherein the first amplification and filtering path further comprises: a first signal directing component configured to couple to the first donor antenna port to a second switch or a third switch; the second switch configured to couple an input of the first SDF to the first signal directing component or a second signal directing component; the second signal directing component configured to couple the first server antenna port to the third switch or the second switch; the third switch configured to: couple an output of the first SDF to the first signal directing component to direct the first TDD UL signal output from the first SDF to the first donor antenna port for transmission at a first donor antenna; and couple an output of the first SDF to the second signal directing component to direct the first TDD DL signal output from the first SDF to the first server antenna port for transmission at a server antenna.

Example 62 includes the dual path TDD repeater of Example 60, wherein the second amplification and filtering path further comprises: a third signal directing component configured to couple to the second server antenna port to a sixth switch or a seventh switch; the sixth switch configured to couple an input of the second SDF to the third signal directing component or a fourth signal directing component; the fourth signal directing component configured to couple the second donor antenna port to the seventh switch or the sixth switch; the seventh switch configured to: couple an output of the second SDF to the third signal directing component to direct the second TDD DL signal output from the second SDF to the second server antenna port for transmission at a second server antenna; and couple an output of the second SDF to the fourth signal directing component to direct the second TDD UL signal output from the second SDF to the second donor antenna port for transmission at a second donor antenna.

Example 63 includes the dual path TDD repeater of Example 60, further comprising at least one TDD sync detection module (SDM) configured to receive the timing signal and the UL/DL configuration and send it to the controller for the one or more of the first TDD UL signal and the first TDD DL signal or the second TDD UL signal and the second TDD DL signal.

Example 64 includes the dual path TDD repeater of Example 63, wherein the SDM is coupled to one or more of the first amplification and filtering path or the second amplification and filtering path.

Example 65 includes the dual path TDD repeater of Example 60, further comprising at least one modem configured to receive the timing signal and the UL/DL configuration and send it to the controller for the one or more of the first TDD UL signal and the first TDD DL signal or the second TDD UL signal and the second TDD DL signal.

Example 66 includes the dual path TDD repeater of Example 60, wherein the first TDD band and the second TDD band are within a single third generation partnership project (3GPP) TDD band.

Example 67 includes the dual path TDD repeater of Example 60, wherein the first TDD band and the second TDD band are within separate third generation partnership project (3GPP) TDD bands.

Example 68 includes the dual path TDD repeater of Example 60, wherein: the at least the first TDD UL signal of the first TDD frequency range is comprised of two or more sub-band UL signals within a first single third generation partnership project (3GPP) TDD band; and the at least the first TDD DL signal of the first TDD frequency range is comprised of two or more DL sub-band signals within the first single 3GPP TDD band; or the at least the second TDD UL signal of the second TDD frequency range is comprised of two or more sub-band signals within a second single 3GPP TDD band; and the at least the second TDD DL signal of the second TDD frequency range is comprised of two or more sub-band signals within the second single 3GPP TDD band.

Example 69 includes the dual path TDD repeater of Example 68, wherein: the two or more sub-band UL signals of the first TDD frequency range filtered at the first SDF are different from the two or more sub-band UL signals of the second TDD frequency range filtered at the second SDF; and the two or more sub-band DL signals of the first TDD frequency range filtered at the first SDF are different from the two or more sub-band DL signals of the second TDD frequency range filtered at the second SDF to enable the dual path TDD repeater to operate as a multi-path repeater configured to operate in a sub-band half duplex (SBHD) mode.

Example 70 includes the dual path TDD repeater of Example 61, further comprising: a first bandpass filter and a first low noise amplifier located: between the first server antenna port and the input of the first SDF or between the first donor antenna port and the input of the first SDF.

Example 71 includes the dual path TDD repeater of Example 62, further comprising: a second bandpass filter and a second low noise amplifier located: between the second server antenna port and the input of the second SDF or between the second donor antenna port and the input of the second SDF.

Example 72 includes the dual path TDD repeater of Example 61, further comprising: a first power amplifier and a third bandpass filter located: between the output of the first SDF and the first server antenna port; or between the output of the first SDF and the first donor antenna port.

Example 73 includes the dual path TDD repeater of Example 62, further comprising: a second power amplifier and a fourth bandpass filter located: between the output of the second SDF and the second server antenna port; and between the output of the second SDF and the second donor antenna port.

Example 74 includes the dual path TDD repeater of Example 61, wherein the first signal directing component is a circulator or the first signal directing component is a switch.

Example 75 includes the dual path TDD repeater of Example 62, wherein the third signal directing component is a circulator or the third signal directing component is a switch.

Example 76 includes the dual path TDD repeater of Example 61, wherein the second signal directing component is a circulator or the second signal directing component is a switch.

Example 77 includes the dual path TDD repeater of Example 62, wherein the fourth signal directing component is a circulator or the fourth signal directing component is a switch.

Example 78 includes a time division duplex (TDD) repeater comprising: a first server antenna port; a first donor antenna port; a first TDD amplification and filtering path coupled between the first server antenna port and the first donor antenna port or between the first donor antenna port and the first server antenna port, the first TDD amplification and filtering path comprising: a shared first software defined filter (SDF) configured to filter: at least a first TDD uplink (UL) signal of a first TDD frequency range within a first TDD band and output the first TDD UL signal with a predetermined gain; and at least a first TDD downlink (DL) signal of the first TDD frequency range within the first TDD band and output the first TDD DL signal with a predetermined gain; a first circulator communicatively coupled between the first server antenna port, an input to the first TDD amplification and filtering path, and an output of the first amplification and filtering path; a second circulator communicatively coupled between the first donor antenna port, an input to the first TDD amplification and filtering path, and an output of the first amplification and filtering path; and a controller configured to be coupled to provide a timing signal and an UL/DL configuration for one or more of the first TDD UL signal and the first TDD DL signal.

Example 79 includes the TDD repeater of Example 78, further comprising: a second server antenna port; a second donor antenna port; a second TDD amplification and filtering path coupled between the second server antenna port and the second donor antenna port or between the second donor antenna port and the second server antenna port, the second TDD amplification and filtering path comprising: a second SDF configured to filter: at least a second TDD uplink (UL) signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain; and a third circulator communicatively coupled between the second server antenna port, an input to the second TDD amplification and filtering path, and an output of the second amplification and filtering path; a fourth circulator communicatively coupled between the second donor antenna port, an input to the second TDD amplification and filtering path, and an output of the second amplification and filtering path; the controller configured to be coupled to provide a timing signal and an UL/DL configuration for one or more of the second TDD UL signal and the second TDD DL signal.

Example 80 includes the TDD repeater of Example 78, wherein the first amplification and filtering path further comprises: the first circulator configured to couple the first server antenna port to a second switch and a third switch; the second switch configured to couple an input of the first SDF to the first circulator or the second circulator; the second circulator configured to couple the first donor antenna port to the third switch or the second switch; the third switch configured to: couple an output of the first SDF to the first circulator to direct the first TDD DL signal output from the first SDF to the first server antenna port for transmission at a first server antenna; and couple an output of the first SDF to the second circulator to direct the first TDD UL signal output from the first SDF to the first donor antenna port for transmission at a donor antenna.

Example 81 includes the TDD repeater of Example 79, wherein the second amplification and filtering path further comprises: the third circulator configured to couple to the second server antenna port to a sixth switch or a seventh switch; the sixth switch configured to couple an input of the second SDF to the third circulator or the fourth circulator; the fourth circulator configured to couple the second donor antenna port to the seventh switch or the sixth switch; the seventh switch configured to: couple an output of the second SDF to the third circulator to direct the second TDD DL signal output from the second SDF to the second server antenna port for transmission at a second server antenna; and couple an output of the second SDF to the fourth circulator to direct the second TDD UL signal output from the second SDF to the second donor antenna port for transmission at a second donor antenna.

Example 82 includes the TDD repeater of Example 79, further comprising at least one TDD sync detection module (SDM) configured to receive the timing signal and the UL/DL configuration and send it to the controller for the one or more of the first TDD UL signal and the first TDD DL signal and the second TDD UL signal and the second TDD DL signal.

Example 83 includes the TDD repeater of Example 82, wherein the SDM is coupled to one or more of the first amplification and filtering path or the second amplification and filtering path.

Example 84 includes the TDD repeater of Example 79, further comprising at least one modem configured to receive the timing signal and the UL/DL configuration and send it to the controller for the one or more of the first TDD UL signal and the first TDD DL signal and the second TDD UL signal and the second TDD DL signal.

Example 85 includes the TDD repeater of Example 79, wherein the first TDD band and the second TDD band are within a single third generation partnership project (3GPP) TDD band.

Example 86 includes the TDD repeater of Example 79, wherein the first TDD band and the second TDD band are within separate third generation partnership project (3GPP) TDD bands.

Example 87 includes the TDD repeater of Example 79, wherein: the at least the first TDD UL signal of the first TDD frequency range is comprised of two or more sub-band UL signals within a first single third generation partnership project (3GPP) TDD band; and the at least the first TDD DL signal of the first TDD frequency range is comprised of two or more DL sub-band signals within the first single 3GPP TDD band; or the at least the second TDD UL signal of the second TDD frequency range is comprised of two or more sub-band signals within a second single 3GPP TDD band; and the at least the second TDD DL signal of the second TDD frequency range is comprised of two or more sub-band signals within the second single 3GPP TDD band.

Example 88 includes the TDD repeater of Example 87, wherein: the two or more sub-band UL signals of the first TDD frequency range filtered at the first SDF are different from the two or more sub-band UL signals of the second TDD frequency range filtered at the second SDF; and the two or more sub-band DL signals of the first TDD frequency range filtered at the first SDF are different from the two or more sub-band DL signals of the second TDD frequency range filtered at the second SDF to enable the dual path TDD repeater to operate as a multi-path repeater configured to operate in a sub-band half duplex (SBHD) mode.

Example 89 includes the TDD repeater of Example 79, further comprising: a first bandpass filter and a first low noise amplifier located: between the first server antenna port and the input of the first SDF and between the first donor antenna port and the input of the first SDF.

Example 90 includes the dual path TDD repeater of Example 79, further comprising: a second bandpass filter and a second low noise amplifier located: between the second server antenna port and the input of the second SDF and between the second donor antenna port and the input of the second SDF.

Example 91 includes the dual path TDD repeater of Example 78, further comprising: a first power amplifier and a third bandpass filter located: between the output of the first SDF and the first server antenna port; and between the output of the first SDF and the first donor antenna port.

Example 92 includes the dual path TDD repeater of Example 79, further comprising: a second power amplifier and a fourth bandpass filter located: between the output of the second SDF and the second server antenna port; and between the output of the second SDF and the second donor antenna port.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A time division duplex (TDD) repeater comprising:
a first port;
a first circulator having a first circulator port communicatively coupled to the first port;
a second port;
a second circulator having a first circulator port communicatively coupled to the second port;
a first amplification and filtering path coupled between a second circulator port of the first circulator and a fourth circulator port of the second circulator;
a first software defined filter (SDF) in the first amplification and filtering path, the first SDF configured to filter at least a first TDD uplink (UL) signal of a first TDD frequency range within a TDD band and output the first TDD UL signal with a predetermined gain;
a second amplification and filtering path coupled between a second circulator port of the second circulator and a fourth circulator port of the first circulator; and
a second SDF in the second amplification and filtering path, the second SDF configured to filter at least a first TDD downlink (DL) signal in the first TDD frequency range,
wherein the first circulator, the second circulator, the first SDF, and the second SDF allow simultaneous transmission of the first TDD UL signal and the first TDD DL signal.

2. The TDD repeater of claim 1, wherein the first SDF is configured to filter a second TDD UL signal of a second TDD frequency range within the TDD band and output the second TDD UL signal with a predetermined gain.

3. The TDD repeater of claim 2, wherein the second SDF is configured to filter a second TDD DL signal of the second TDD frequency range within the TDD band and output the second TDD DL signal with a predetermined gain.

4. The TDD repeater of claim 2, wherein the first circulator and the second circulator allow simultaneous transmission of the first TDD UL signal, the first TDD DL signal, the second TDD UL signal, and the second TDD DL signal.

5. The TDD repeater of claim 1, wherein the first SDF and the second SDF are implemented in a single processor or multiple processors.

6. The TDD repeater of claim 5, wherein the first SDF and the second SDF are implemented in one or more field programmable gate arrays or one or more application specific integrated circuits.

7. The TDD repeater of claim 1, wherein the first SDF, the second SDF, the first circulator, and the second circulator provide sufficient crossover isolation to enable a loop cross-over isolation of the TDD repeater to be greater than a total loop gain of the repeater.

8. The TDD repeater of claim 7, wherein the first SDF and the second SDF each provide greater than or equal to 50 decibels (dB) of crossover isolation.

9. The TDD repeater of claim 7, wherein the first SDF and the second SDF each provide greater than or equal to 30 decibels (dB) of crossover isolation.

10. The TDD repeater of claim 1, wherein the first SDF and the second SDF each comprise a complex down mixer and a complex up mixer to provide a separate in-phase and quadrature phase filter.

11. The TDD repeater of claim 1, further comprising a TDD sync detection module (SDM) or a modem that is communicatively coupled to the first SDF and the second SDF, the TDD SDM or a modem configured to determine:

first UL/DL configuration information and timing information for the first TDD UL signal and the first TDD DL signal.

12. The TDD repeater of claim 11, wherein the modem is configured to use a subscriber identity module (SIM) card to enable the modem to determine dynamic changes in the first UL/DL configuration information and timing information.

13. The TDD repeater of claim 11, further comprising a controller that is coupled to the TDD SDM or the modem and configured to receive the first UL/DL configuration information and timing information for the first TDD UL and the first TDD DL signal from the TDD SDM or from the modem and send the first UL/DL configuration information and the timing information to the first SDF and the second SDF.

14. The TDD repeater of claim 13, wherein the first SDF is configured to filter time slots in the first TDD uplink (UL) signal based on the first UL/DL configuration information and the timing information.

15. The TDD repeater of claim 14, wherein the SDF is configured to filter each time slot using one or more of a bandpass filter, a band stop filter, or a stepped filter.

16. The TDD repeater of claim 15, wherein the SDF is configured to switch between the bandpass filter or the band stop filter or the stepped filter in a time period that is less than $25,600*T_c$ for a frequency range 1 (FR1) of a third generation partnership program (3GPP) fifth generation (5G) New Radio (NR) specification or $13,792*T_c$ for a frequency range 2 (FR2) of the 3GPP 5G NR specification, wherein $T_c=1/(\Delta f_{max} \cdot N_f)$ where $\Delta f_{max}$ is a subcarrier spacing (SCS) of the first TDD UL signal and $N_f$ is a Fast Fourier Transform (FFT) size.

17. The TDD repeater of claim 14, wherein the SDF is configured to be deactivated or turned off to block a transmission of a selected UL symbol or a DL symbol based on the UL/DL configuration information and the timing information from the SDM or the modem.

18. The TDD repeater of claim 13, wherein the controller is further configured to receive second UL/DL configuration information and timing information for a second TDD UL signal and a second TDD DL signal from the TDD SDM or from the modem and send the second UL/DL configuration information and the timing information for the second TDD UL signal and the second TDD DL signal to the first SDF and the second SDF.

19. The TDD repeater of claim 18, wherein the second TDD UL signal and the second TDD DL signal are in the TDD band of the first TDD UL signal and the first TDD DL signal.

20. The TDD repeater of claim 18, wherein the second SDF is configured to filter time slots in the second TDD UL signal based on the second UL/DL configuration information and the timing information for the second TDD UL signal and the second TDD DL signal.

21. The TDD repeater of claim 20, wherein the second SDF is configured to filter each time slot using one or more of a bandpass filter or a band stop filter or a stepped filter.

22. The TDD repeater of claim 21, wherein the second SDF is configured to switch between the bandpass filter or the band stop filter or the stepped filter in a time period that is less than $25,600*T_c$ for a frequency range 1 (FR1) of a third generation partnership program (3GPP) fifth generation (5G) New Radio (NR) specification or $13,792*T_c$ for a frequency range 2 (FR2) of the 3GPP 5G NR specification, wherein $T_c=1/(\Delta f_{max} \cdot N_f)$ where $\Delta f_{max}$ is a subcarrier spacing (SCS) of the first TDD UL signal and $N_f$ is a Fast Fourier Transform (FFT) size.

23. The TDD repeater of claim 20, wherein the second SDF is configured to be deactivated or turned off to block a transmission of a selected UL symbol or a DL symbol based on the UL/DL configuration information and the timing information from the SDM or the modem.

24. The TDD repeater of claim 1, further comprising a first bandpass filter to pass at least a frequency range of the first TDD UL signal, the first bandpass filter coupled between the first port and the first circulator port of the first circulator.

25. The TDD repeater of claim 1, further comprising a first low noise amplifier (LNA) in the first amplification and filtering path, the first LNA coupled between the second circulator port of the first circulator and an input of the first SDF.

26. The TDD repeater of claim 25, further comprising a first variable attenuator coupled between an output of the first LNA and the input of the first SDF.

27. The TDD repeater of claim 1, further comprising a first power amplifier (PA) in the first amplification and filtering path, the first PA coupled between an output of the first SDF and a fourth circulator port of the second circulator.

28. The TDD repeater of claim 1, further comprising a second bandpass filter to pass at least a frequency range of the first TDD DL signal, the second bandpass filter coupled between the second port and the first circulator port of the second circulator.

29. The TDD repeater of claim 1, further comprising a second LNA in the second amplification and filtering path, the second LNA coupled between the second circulator port of the second circulator and an input of the second SDF.

30. The TDD repeater of claim 29, further comprising a second variable attenuator coupled between an output of the second LNA and the input of the second SDF.

31. The TDD repeater of claim 1, further comprising a second PA in the second amplification and filtering path, the second PA coupled between an output of the second SDF and a fourth circulator port of the first circulator.

32. A time division duplex (TDD) repeater comprising:
a first port;
a first circulator having a first circulator port communicatively coupled to the first port;
a second port;
a second circulator having a first circulator port communicatively coupled to the second port;
a first amplification and filtering path coupled between a second circulator port of the first circulator and a fourth circulator port of the second circulator;

a first software defined filter (SDF) in the first amplification and filtering path, the first SDF configured to filter at least a first TDD uplink (UL) signal of a first TDD frequency range within a TDD band and output the first TDD UL signal with a predetermined gain;

a second amplification and filtering path coupled between a second circulator port of the second circulator and a fourth circulator port of the first circulator; and a second SDF in the second amplification and filtering path, the second SDF configured to filter at least a first TDD downlink (DL) signal in the first TDD frequency range, wherein the first SDF, the second SDF, the first circulator, and the second circulator provide sufficient crossover isolation to enable a loop crossover isolation of the TDD repeater to be greater than a total loop gain of the repeater.

33. The TDD repeater of claim 32, wherein the first circulator, the second circulator, the first SDF, and the second SDF allow simultaneous transmission of the first TDD UL signal and the first TDD DL signal.

34. A time division duplex (TDD) repeater comprising:

a first port;

a first circulator having a first circulator port communicatively coupled to the first port;

a second port;

a second circulator having a first circulator port communicatively coupled to the second port;

a first amplification and filtering path coupled between a second circulator port of the first circulator and a fourth circulator port of the second circulator;

a first software defined filter (SDF) in the first amplification and filtering path, the first SDF configured to filter:

at least a first TDD uplink (UL) signal of a first TDD frequency range within a TDD band and output the first TDD UL signal with a predetermined gain; and at least a second TDD UL signal of a second TDD frequency range within the TDD band and output the second TDD UL signal with a predetermined gain;

a second amplification and filtering path coupled between a second circulator port of the second circulator and a fourth circulator port of the first circulator; and a second SDF in the second amplification and filtering path, the second SDF configured to filter:

at least a first TDD downlink (DL) signal in the first TDD frequency range; and a second TDD DL signal of the second TDD frequency range within the TDD band and output the second TDD DL signal with a predetermined gain; and wherein the first circulator, the second circulator, the first SDF, and the second SDF allow simultaneous transmission of the first TDD UL signal and the first TDD DL signal and the second TDD UL signal and the second TDD DL signal.

35. The TDD repeater of claim 34, wherein the first SDF, the second SDF, the first circulator, and the second circulator provide sufficient crossover isolation to enable a loop crossover isolation of the TDD repeater to be greater than a total loop gain of the repeater.

* * * * *